United States Patent [19]
Doi

[11] Patent Number: 5,712,674
[45] Date of Patent: Jan. 27, 1998

[54] EXPOSURE DEVICE UTILIZING DIFFERENTLY COLORED LIGHT EMITTING ELEMENTS

[75] Inventor: Atsuhiro Doi, Kanagawa, Japan

[73] Assignee: Fuji Photo Film Co., Ltd., Kanagawa, Japan

[21] Appl. No.: 429,554

[22] Filed: Apr. 27, 1995

[30] Foreign Application Priority Data

May 2, 1994 [JP] Japan ................................ 6-093421
May 10, 1994 [JP] Japan ................................ 6-096628

[51] Int. Cl.$^6$ ................ G03B 27/32; G03B 27/50
[52] U.S. Cl. ............ 347/238; 347/232; 347/115; 355/53; 355/70; 355/71; 358/296
[58] Field of Search ............... 358/296, 298; 355/53, 50, 67, 71, 70; 347/115, 118, 232, 238

[56] References Cited

U.S. PATENT DOCUMENTS

| | | | |
|---|---|---|---|
| 4,928,122 | 5/1990 | Doi et al. | 346/160 |
| 4,975,729 | 12/1990 | Gordon | 355/1 |
| 5,105,281 | 4/1992 | Kusaka | 358/302 |
| 5,126,995 | 6/1992 | Nishizawa | 369/118 |
| 5,335,082 | 8/1994 | Sable | 358/350 |
| 5,382,966 | 1/1995 | Doi | 346/107 |
| 5,402,436 | 3/1995 | Paoli | 372/50 |
| 5,488,404 | 1/1996 | Fleck et al. | 347/238 |
| 5,515,156 | 5/1996 | Nishio et al. | 347/232 |
| 5,543,830 | 8/1996 | Lea | 347/238 |
| 5,576,752 | 11/1996 | Kovacs et al. | 347/238 |
| 5,638,153 | 6/1997 | Zahn et al. | 355/71 |
| 5,642,149 | 6/1997 | Palum | 347/238 |

FOREIGN PATENT DOCUMENTS

| | | | |
|---|---|---|---|
| 6143736 | 3/1986 | Japan | G03B 33/00 |
| 61-294966 | 12/1986 | Japan | H04N 1/23 |
| 6392161 | 4/1988 | Japan | H04N 1/23 |
| 63-148233 | 6/1988 | Japan | G02F 1/133 |
| 2250040 | 10/1990 | Japan | G02F 1/20 |

*Primary Examiner*—Peter S. Wong
*Assistant Examiner*—Derek J. Jardieu
*Attorney, Agent, or Firm*—Sughrue, Mion, Zinn, Macpeak & Seas, PLLC

[57] ABSTRACT

An exposure device includes: at least three light-emitting elements for respectively emitting light of mutually different colors and forming a slit beam; an optical shutter array in which a plurality of optical shutter elements for allowing the slit beam incident thereupon to be transmitted therethrough or shut off as the optical shutter elements are opened or closed, and being provided in a number corresponding to the number of pixels constituting a row of pixels in a scanning line of the photosensitive material along a direction corresponding to the cross-sectionally longitudinal direction of the slit beam; and a control member for controlling the light-emitting elements and the optical shutter array such that an amount of exposure applied to a predetermined pixel on the photosensitive material becomes substantially equal to an amount of exposure of a corresponding pixel of color image data. Since the light-emitting elements and the optical shutter array are controlled by the control member such that the amount of exposure applied to a predetermined pixel on the photosensitive material becomes substantially equal to the amount of exposure of a corresponding pixel of the color image data, it is unnecessary to provide a movable portion such as a filter cylinder for converting the white light into R light, G light, and B light.

23 Claims, 35 Drawing Sheets

EXPOSURE DEVICE UTILIZING DIFFERENTLY COLORED LIGHT EMITTING ELEMENTS

BACKGROUND OF THE INVENTION

1. Field of the Invention

The present invention relates to an exposure device for imagewise exposing a photosensitive material by relatively moving at least one of a slit beam and the photosensitive material to which the slit beam is applied.

2. Description of the Related Art

Conventionally, a device for forming an image by exposing a photosensitive material has been proposed which comprises: a linear light source accommodated in an elliptical cylindrical mirror so as to emit a linear light beam; a light-restricting member upon which the linear light beam is made incident and which allows only parallel rays of light to be transmitted therethrough; a liquid-crystal optical shutter array using a liquid crystal which undergoes a change from a light shutting-off state to a light transmitting state on application of a voltage to electrodes corresponding to a one-line portion of pixels on the photosensitive material; a filter cylinder in which a blue filter, a green filter, a red filter, and a mask are attached to a peripheral surface of a transparent cylinder; a stepping motor for rotating the filter cylinder by means of a belt as a pulley is rotated; self-focusing optical fibers affixed to the interior of the filter cylinder, and a stepping motor for feeding a color photosensitive material intermittently in pitches as transport rollers are rotated (Japanese Patent Application Laid-Open No. 61-294966). In this device, the filter cylinder is rotated by the stepping motor, and the linear light beam (parallel rays of light) is consecutively transmitted through the blue filter, the green filter, and the red filter, so as to convert white light into blue light, green light, and red light and make the light incident upon the self-focusing optical fibers. Subsequently, the light of the respective colors made consecutively incident upon the self-focusing optical fibers exposes the color photosensitive material as spot light. Upon completion of exposure of one line, the photosensitive material is transported intermittently by another one-line portion, and the above-described processing is repeated.

Also, a device has been proposed which comprises: a light source such as a halogen lamp; a liquid-crystal optical shutter array arrayed in the form of a line and including a plurality of liquid-crystal cells corresponding to respective pixels of one line on the photosensitive material as the liquid-crystal cells are closed to shut off the light from the light source when a voltage is applied thereto, and are opened to allow the light from the light source to be transmitted therethrough when the voltage is not applied thereto; a color-separation filter including red, green, and blue filters rotated by a stepping motor, neutral-density (ND) filters for controlling the amount of exposure in correspondence with these color filters, and a mask; and a SELFOC lens array (trade name; produced by Nippon Electric Company and Nippon Sheet Glass Company) (Japanese Patent Application Laid-Open No. 63-92161). In this device, the color-separation filter is rotated by the stepping motor, and the light from the light source is transmitted through the red, green, and blue filters, the SELFOC lens array, and the ND filters corresponding to the respective color filters, so as to allow the photosensitive material to be exposed by a one-line portion consecutively with the R light, the G light, and the B light. Upon completion of the exposure of one line, the photosensitive material is transported intermittently by another one-line portion, and the above-described processing is repeated.

However, in both devices described above, since a white light source is used as the light source, it is necessary to color-separate the white light into the R, G, and B light in order to form a color image. For this reason, in the former device, the filter cylinder to which the red, green, and blue filters are attached is rotated by the stepping motor, and the white light is transmitted through the red, green, and blue filters so as to be color-separated into the R, G, and B light. Accordingly, since the filter cylinder is rotated by the stepping motor, such a device inevitably becomes large in size and high in manufacturing cost.

SUMMARY OF THE INVENTION

In view of the above-described circumstances, it is an object of the present invention to provide a compact and low-cost exposure device.

To this end, in accordance with a first aspect of the present invention, there is provided an exposure device comprising: a light source system having at least three light-emitting elements for respectively emitting light of mutually different colors and adapted to form the light emitted from the light-emitting elements into a slit beam; moving members for moving at least one of the slit beam and a photosensitive material in a direction substantially perpendicular to a cross-sectionally longitudinal direction of the slit beam; an optical shutter array which is disposed between the light source system and the photosensitive material, and in which a plurality of optical shutter elements for allowing the slit beam incident thereupon from the light source system to be transmitted therethrough or shut off as the optical shutter elements are opened or closed are provided in a number corresponding to the number of pixels constituting a row of pixels in a scanning line of the photosensitive material along a direction corresponding to the cross-sectionally longitudinal direction of the slit beam; and a control member for controlling at least one of an array of the light-emitting elements and the optical shutter array such that an amount of exposure to the slit beam transmitted through the optical shutter array and applied to a predetermined pixel on the photosensitive material becomes substantially equal to an amount of exposure of a corresponding pixel of color image data.

In accordance with a second aspect of the present invention, in the exposure device according to the first aspect of the present invention, the control member controls at least one of the array of the light-emitting elements and the optical shutter array such that the slit beam of respective colors from the light source system is intermittently radiated a plurality of times.

In accordance with a third aspect of the present invention, in the exposure device according to the first aspect of the present invention, the at least three light-emitting elements are juxtaposed in proximity to each other such that their light-emitting phases in a direction in which the at least three light-emitting elements are arrayed become substantially the same so as to form a group of light-emitting elements, and a plurality of the groups of light-emitting elements are provided at a predetermined pitch.

In accordance with a fourth aspect of the present invention, in the exposure device according to the first aspect of the present invention, the light source system comprises an optical waveguide which is formed in an elongated shape and at an end of which the light-emitting elements are arrayed, so as to transmit the light emitted from the light-emitting elements; and a light emergent portion which is disposed in the optical waveguide so as to scatter the light after being transmitted through the optical waveguide, form the light into the slit beam, and make the slit beam emergent therefrom.

In accordance with a fifth aspect of the present invention, the exposure device according to the first aspect of the present invention further comprises: an exposure adjusting member disposed in a vicinity of the photosensitive material on a light source system side thereof so as to adjust a quantity of light applied to the photosensitive material such that integral values over time of illuminance of the light applied to the photosensitive material become uniform over respective cross-sectionally longitudinal portions of the slit beam.

In accordance with a sixth aspect of the present invention, in the exposure device according to the fifth aspect of the present invention, the exposure adjusting member is an exposure correcting plate provided with an aperture having a configuration corresponding to an array pitch by which the at least three light-emitting elements are arrayed.

In accordance with a seventh aspect of the present invention, there is provided an exposure device comprising: a light source system having at least three light-emitting elements for respectively emitting light of mutually different colors and adapted to form the light emitted from the light-emitting elements into a slit beam, wherein the at least three light-emitting elements are juxtaposed in proximity to each other such that their light-emitting phases in a direction in which the at least three light-emitting elements are arrayed become substantially the same so as to form a group of light-emitting elements, and a plurality of the groups of light-emitting elements are provided at a predetermined pitch; moving members for moving at least one of the slit beam and a photosensitive material in a direction substantially perpendicular to a cross-sectionally longitudinal direction of the slit beam; a liquid-crystal optical shutter array which is disposed between the light source system and the photosensitive material, and in which a plurality of liquid-crystal cells for allowing the slit beam incident thereupon from the light source system to be transmitted therethrough or shut off as the liquid-crystal elements are opened or closed are provided in a number corresponding to the number of pixels constituting a row of pixels in a scanning line of the photosensitive material along a direction corresponding to the cross-sectionally longitudinal direction of the slit beam, the liquid-crystal optical shutter array having one row of the plurality of liquid-crystal cells; and a control member for controlling at least one of an array of the light-emitting elements and the liquid-crystal optical shutter array such that an amount of exposure to the slit beam transmitted through the liquid-crystal optical shutter array and applied to a predetermined pixel on the photosensitive material becomes substantially equal to an amount of exposure of a corresponding pixel of color image data.

In accordance with an eighth aspect of the present invention, there is provided an exposure device comprising: a light source system having at least three light-emitting elements for respectively emitting light of mutually different colors and adapted to form the light emitted from the light-emitting elements into a slit beam, wherein the at least three light-emitting elements are juxtaposed in proximity to each other such that their light-emitting phases in a direction in which the at least three light-emitting elements are arrayed become substantially the same so as to form a group of light-emitting elements, and a plurality of the groups of light-emitting elements are provided at a predetermined pitch; moving members for moving at least one of the slit beam and a photosensitive material in a direction substantially perpendicular to a cross-sectionally longitudinal direction of the slit beam; a liquid-crystal optical shutter array which is disposed between the light source system and the photosensitive material, and in which a plurality of liquid-crystal cells for allowing the slit beam incident thereupon from the light source system to be transmitted therethrough or shut off as the liquid-crystal elements are opened or closed are provided in a number corresponding to the number of pixels constituting a row of pixels in a scanning line of the photosensitive material along a direction corresponding to the cross-sectionally longitudinal direction of the slit beam, wherein the liquid-crystal optical shutter array has a plurality of rows of liquid-crystal cells, each of the rows of the liquid-crystal cells being formed by the plurality of liquid-crystal cells, the rows of the liquid-crystal cells being arrayed in a direction substantially perpendicular to the cross-sectionally longitudinal direction of the slit beam; and a control member for controlling an array of the light-emitting elements and the liquid-crystal optical shutter array such that an amount of exposure to the slit beam transmitted through the liquid-crystal optical shutter array and applied to a predetermined pixel on the photosensitive material becomes substantially equal to an amount of exposure of a corresponding pixel of color image data, wherein the light source system forms the light emitted from the light-emitting elements into the slit beam having a predetermined width so that the slit beam is applied to the plurality of rows of liquid-crystal cells as a whole.

In accordance with the first aspect of the present invention, the light source system having at least three light-emitting elements emits light of mutually different colors from the respective light-emitting elements, and applies the emitted light after converting the same into a slit beam. The moving members relatively move at least one of the slit beam and the photosensitive material in a direction substantially perpendicular to a cross-sectionally longitudinal direction of the slit beam.

Here, the optical shutter array is disposed between the light source system and the photosensitive material. In the optical shutter array, a plurality of optical shutter elements, which allow the slit beam incident from the light source system to be transmitted therethrough or shut off as the optical shutter elements are opened or closed, are provided in a number corresponding to the number of pixels constituting a row of pixels on the photosensitive material along a direction corresponding to the cross-sectionally longitudinal direction of the slit beam. The control member controls at least one of an array of the light-emitting elements and the optical shutter elements such that the amount of exposure of the portions of the photosensitive material corresponding to the pixels to the slit beam transmitted through the optical shutter elements becomes substantially equal to the amount of exposure of corresponding pixels of color image data.

Thus, since the light source system is provided with at least three light-emitting elements for emitting light of mutually different colors, and at least one of the array of light-emitting elements and the optical shutter elements to ensure that the amount of exposure of the portions of the photosensitive material corresponding to the pixels becomes substantially equal to the amount of exposure of corresponding pixels of color image data, it is unnecessary to provide a movable portion such as a filter cylinder for converting white light into R light, G light, and B light, thereby making it possible to provide a compact and low-cost exposure device.

In accordance with the second aspect of the present invention, in the exposure device according to the first aspect of the present invention, control is provided such that the slit beam of respective colors from the light source system is intermittently radiated a plurality of times.

Thus, since the slit beam of the respective colors is intermittently radiated a plurality of times, the amount of exposure of the portions of the photosensitive material corresponding to the pixels can be made equal to the amount of exposure of corresponding pixels of color image data with high accuracy.

It should be noted that the photosensitive material according to the first or second aspect of the present invention may be brought into close contact with the optical shutter array. If the photosensitive material is brought into close contact with the optical shutter array, the slit beam transmitted through the optical shutter array can be aligned with the canning line on the photosensitive material with high accuracy.

In addition, the exposure device according to the first or second aspect of the present invention may further comprise a self-focusing fiber array serving as an image-forming optical member for allowing the slit beam transmitted through the optical shutter elements to form an image on the photosensitive material. As the self-focusing fiber array causes the slit beam transmitted through the optical shutter elements to form an image on the photosensitive material, the slit beam transmitted through the optical shutter array can be aligned with the scanning line on the photosensitive material with high accuracy.

Further, the exposure device according to the first or second aspect of the present invention may further comprise a diffusing member disposed in the vicinity of the optical shutter array on the light source system side thereof so as to diffuse the slit beam emitted from the light source system. As the slit beam is thus diffused by the diffusing member and is applied to the optical shutter array, the slit beam can be effectively utilized.

In accordance with the third aspect of the present invention, in the exposure device according to the first aspect of the present invention, the at least three light-emitting elements in the groups of light-emitting elements arrayed at a predetermined pitch emit light of mutually different colors. The emitted light is radiated in the form of a slit beam in which their light-emitting phases in a direction in which the three light-emitting elements are arrayed become substantially the same, such that the cross-sectionally longitudinal direction of the slit beam coincides with the direction in which the groups of the light-emitting elements are arrayed.

Thus, since the light emitted from the at least three light-emitting elements is radiated in the form of a slit beam in which their light-emitting phases in a direction in which the three light-emitting elements are arrayed become substantially the same, such that the cross-sectionally longitudinal direction of the slit beam coincides with the direction in which the groups of the light-emitting elements are arrayed, it is possible to prevent the irregularity in color corresponding to the array pitch, which can otherwise occur in a case where the light-emitting elements are arrayed merely linearly and are made to emit light.

In accordance with the fourth aspect of the present invention, in the exposure device according to the first aspect of the present invention, the optical waveguide formed in an elongated shape and having the light-emitting elements arrayed at an end thereof transmit the light emitted from the light-emitting elements. The light emergent portion disposed in the optical waveguide scatters the light after being transmitted through the optical waveguide, forms the light into the slit beam, and makes the slit beam emergent therefrom.

Thus, since the light transmitted through the optical waveguide is scattered by the light emergent portion, and is radiated in the form of the slit beam, the slit beam is provided with a quantity of light which is uniform in the cross-sectionally longitudinal direction of the slit beam, thereby making it possible to eliminate the irregularity in the quantity of the slit beam and the irregularity in color with respect to the photosensitive material.

In accordance with the fifth aspect of the present invention, in the exposure device according to the first aspect of the present invention, the exposure adjusting member disposed in a vicinity of the photosensitive material on the light-source side thereof adjusts the quantity of light applied to the photosensitive material such that integral values over time of illuminance of the light applied to the photosensitive material become uniform over respective cross-sectionally longitudinal portions of the slit beam.

Thus, if the quantity of light applied to the photosensitive material is adjusted by the exposure adjusting member such that integral values over time of illuminance of the light applied to the photosensitive material become uniform over respective cross-sectionally longitudinal portions of the slit beam, it is possible to eliminate the irregularity in the quantity of the slit beam incident upon the photosensitive material.

In accordance with the sixth aspect of the present invention, in the exposure device according to the fifth aspect of the present invention, the slit beam transmitted through the optical shutter elements is transmitted through the exposure correcting plate provided with an aperture having a configuration corresponding to an array pitch by which the light-emitting elements are arrayed, so as to irradiate the photosensitive material.

Since the exposure correcting plate is provided with the aperture having a configuration corresponding to the array pitch by which the light-emitting elements are arrayed, when the slit beam is transmitted through the optical shutter array to irradiate the photosensitive material, the aperture is capable of eliminating the irregularity in the quantity of light corresponding to the array pitch of the light-emitting elements.

At least one of the slit beam and the photosensitive material may be relatively moved for each line on the photosensitive material by the moving members in accordance with any one of the first to sixth aspects of the present invention. If at least one of the slit beam and the photosensitive material is relatively moved for each line on the photosensitive material, the slit beam transmitted through the optical shutter array can be aligned with the scanning line on the photosensitive material with high accuracy.

Alternatively, at least one of the slit beam and the photosensitive material may be relatively moved continuously by the moving members in accordance with any one of the first to sixth aspects of the present invention. If at least one of the slit beam and the photosensitive material is relatively moved continuously, the photosensitive material can be exposed at high speed. Here, in a case where at least one of the slit beam and the photosensitive material is relatively moved continuously, it is possible to provide a slit-beam moving member for moving at least one of the slit beam transmitted through the optical shutter elements and the photosensitive material for each line on the photosensitive material in a direction substantially identical to the direction in which the slit beam and the photosensitive material are relatively moved continuously and at a speed substantially identical to the moving speed. Since at least one of the slit beam transmitted through the optical shutter elements and the photosensitive material is moved for each line on the photosensitive material in a direction substantially identical to the direction in which the slit beam and the photosensitive material are relatively moved continuously and at a speed substantially identical to the moving speed, it is possible to expose the photosensitive material at high speed, and to align the slit beam with each scanning line on the photosensitive material with high accuracy.

In accordance with the seventh aspect of the present invention, since at least three light-emitting elements for respectively emitting light of mutually different colors are provided as the light source system, and at least one of the array of the light-emitting elements and the array of the liquid-crystal cells is controlled to ensure that the amount of exposure of the portions of the photosensitive material corresponding to the pixels becomes substantially equal to the amount of exposure of corresponding pixels of color image data, it is unnecessary to provide a movable portion such as a filter cylinder for converting white light into R light, G light, and B light, thereby making it possible to provide a compact and low-cost exposure device. Further, since the slit beam of the various colors is intermittently emitted a plurality of times under control by the control member, the amount of exposure of the portions of the photosensitive material corresponding to the pixels can be made equal to the amount of exposure of corresponding pixels of color image data with high accuracy.

In accordance with the eighth aspect of the present invention, the light source system having at least three light-emitting elements for respectively emitting light of mutually different colors converts the light emitted from the light-emitting elements into a slit beam having a predetermined width. The moving members move at least one of the slit beam and the photosensitive material.

Here, in the present invention, a liquid-crystal optical shutter array is disposed between the light source system and the photosensitive material so as to allow part of the slit beam emitted from the light source system to be transmitted therethrough or shut off as the liquid-crystal optical shutter array is opened or closed. This liquid-crystal optical shutter array is arranged such that a plurality of rows of liquid-crystal cells are arrayed in the direction in which at least one of the slit beam and the photosensitive material is relatively moved, each of the rows of the liquid-crystal cells being formed such that a plurality of liquid-crystal cells are arrayed at intervals corresponding to those between adjacent pixels in a direction substantially perpendicular to that moving direction. That is, the liquid-crystal optical shutter array may be arranged such that, for example, the liquid-crystal cells are arrayed in a matrix form, the direction of the column in the matrix being made to correspond to the aforementioned moving direction and the direction of the row in the matrix being made to correspond to a direction substantially perpendicular to that moving direction. In addition, the liquid-crystal optical shutter array may be alternatively arranged such that liquid-crystal cells are arrayed as one row at intervals corresponding to those between adjacent pixels in the row in a direction substantially perpendicular to the moving direction, and rows of liquid-crystal cells are arrayed in the moving direction, such that adjacent ones of the rows of the optical shutter elements are offset from each other by a predetermined pitch. This predetermined pitch may be made shorter than the arraying pitch of the liquid-crystal cells of the rows of liquid-crystal cells arrayed in the moving direction.

Thus, since the light source system is provided with at least three light-emitting elements for respectively emitting light of mutually different colors, and the emission of the light-emitting elements and the opening and closing of the plurality of rows of liquid-crystal cells are simultaneously controlled such that the amount of exposure of the photosensitive material to the slit beam transmitted through the liquid-crystal optical shutter array becomes equal to the amount of exposure determined by the color image data, it is unnecessary to provide a movable portion such as a filter cylinder for converting white light into R light, G light, and B light, thereby making it possible to provide a compact and low-cost exposure device. In addition, since the liquid-crystal optical shutter array is arranged such that a plurality of rows of liquid-crystal cells are arrayed in the direction in which at least one of the slit beam and the photosensitive material is relatively moved, each of the rows of the liquid-crystal cells being formed such that a plurality of liquid-crystal cells are arrayed at intervals corresponding to those between adjacent pixels in a direction substantially perpendicular to that moving direction, the slit beam with a predetermined width from the light source system can be effectively utilized, and the efficiency of utilizing the light can be improved. In addition, since the emission of the light-emitting elements and the opening and closing of the rows of liquid-crystal cells are simultaneously controlled, the photosensitive material can be exposed by a one-line portion by the plurality of rows of liquid-crystal cells whose opening and closing are controlled, and at least one of the slit beam and the photosensitive material can be relatively moved at high speed, thereby making it possible to shorten the overall exposure time.

Here, in the eighth aspect of the present invention, while the slit beam and the photosensitive material are relatively moving a predetermined distance, the control member may control at least one of the emission of the light-emitting elements and the array of the liquid-crystal cells such that the amount of exposure of the photosensitive material to the slit beam transmitted through the row of liquid-crystal cells becomes equal to the amount of exposure determined by the color image data.

That is, for instance, while the slit beam and the photosensitive material are being relatively moved a predetermined distance, the quantity of each slit beam transmitted through the rows of liquid-crystal cells arrayed in the moving direction may be varied to ensure that the amount of exposure of the photosensitive material becomes equal to the amount of exposure determined by the color image data.

Further, a row of pixels in at least one line on the photosensitive material is exposed to the slit beam transmitted through the plurality of liquid-crystal cells, the pattern of opening (opening pattern) of the exposed liquid-crystal cells is applied to a plurality of liquid-crystal cells corresponding to the exposed line on the photosensitive material which has been moved relative to the slit beam, and the application of the opening pattern is effected a plurality of times in correspondence with the relative movement of the photosensitive material and the slit beam. On the basis of the opening patterns, the opening of the liquid-crystal cells corresponding to the exposed lines is controlled to ensure that the amount of exposure for each pixel in each line on the photosensitive material becomes a targeted amount of exposure for each pixel in each line which is determined by the color image data. Incidentally, in this case, while the slit beam and the photosensitive material are relatively moved a predetermined distance, the quantity of each beam applied to one pixel on the photosensitive material by the slit beam transmitted through the rows of liquid-crystal cells which are arrayed in the moving direction is fixed.

Thus, since the arrangement provided is such that, while the slit beam and the photosensitive material are being relatively moved a predetermined distance, the amount of exposure of the photosensitive material to the slit beam transmitted through the rows of liquid-crystal cells becomes equal to the amount of exposure determined by the color image data, if a comparison is made with a case where one line on the photosensitive material is exposed and the photosensitive material is transported intermittently by a one-line portion, the moving speed at which the slit beam and the photosensitive material are relatively moved can be made large, thereby making it possible to shorten the overall exposure time.

It should be noted that the third to sixth aspects of the present invention can also be applied to the eighth aspect of the invention, in which case it is possible to obtain advantages similar to those of the first aspect of the present invention.

The above and other objects, features and advantages of the present invention will become more apparent from the following detailed description of the invention when read in conjunction with the accompanying drawings.

DESCRIPTION OF THE PREFERRED EMBODIMENTS

Figure 1:
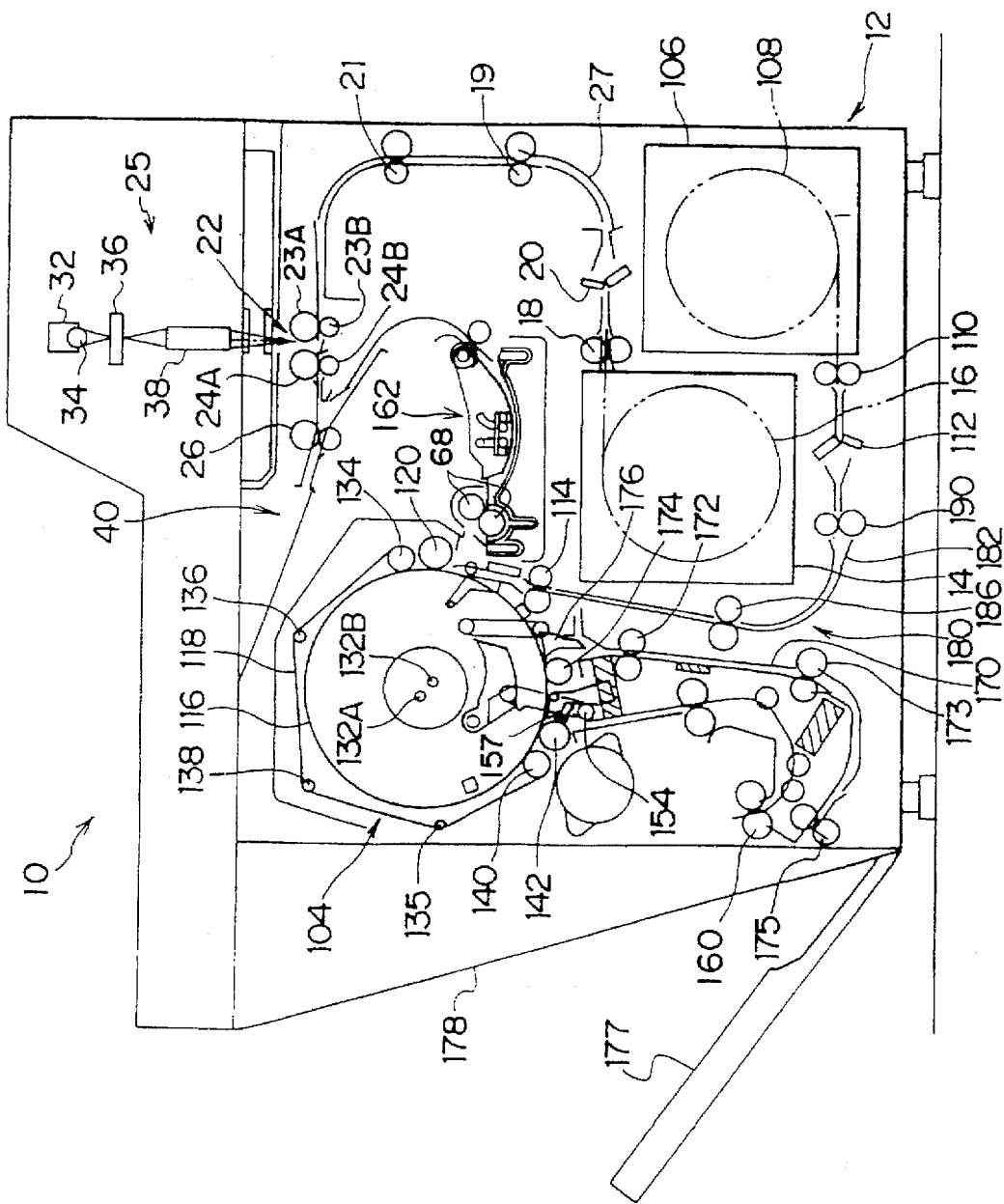
FIG. 1 is an overall schematic diagram of an image recording apparatus.

Referring now to the accompanying drawings, a description will be given of a first embodiment of the present invention. FIG. 1 shows an overall schematic diagram of an image recording apparatus 10. In the image recording apparatus 10, an exposure device 25 in accordance with this embodiment is used as a device for imagewise exposing a heat-developable photosensitive material and forming an image on an image receiving material by heat-development transfer.

The image recording apparatus 10 as a whole is structured in a box shape, and has a machine stand 12 provided with an unillustrated front door and an unillustrated side door. If the doors are opened, the interior of the machine stand 12 can be exposed. An operation panel is disposed on the upper surface of the machine stand 12.

As shown in FIG. 1, a photosensitive material magazine 14 is disposed within the machine stand 12 of the image recording apparatus 10, and a photosensitive material 16 is accommodated therein after being taken up in the form of a roll. This photosensitive material 16 is taken up with its photosensitive (exposure) surface facing a takeup shaft (not shown) for taking up the photosensitive material 16.

A pair of nip rollers 18 and a cutter 20 are disposed in the vicinity of a photosensitive material paying-out port of the photosensitive material magazine 14 so that the photosensitive material 16 can be cut after a predetermined length thereof has been paid out from the photosensitive material magazine 14.

A plurality of transport rollers 19, 21, 23A, 23B, 24A, 24B, and 26 and a guide plate 27, which serve as moving members of the present invention, are disposed downstream of the cutter 20 along a transport passage, so that the photosensitive material 16 cut to a predetermined length can be transported to an exposure section 22.

The exposure section 22 is located between the transport rollers 23A, 24B and the transport rollers 24A, 24B so as to form an exposure portion (i.e., exposure point) which is located between the two pairs of transport rollers and through which the photosensitive material 16 passes.

Figure 2:
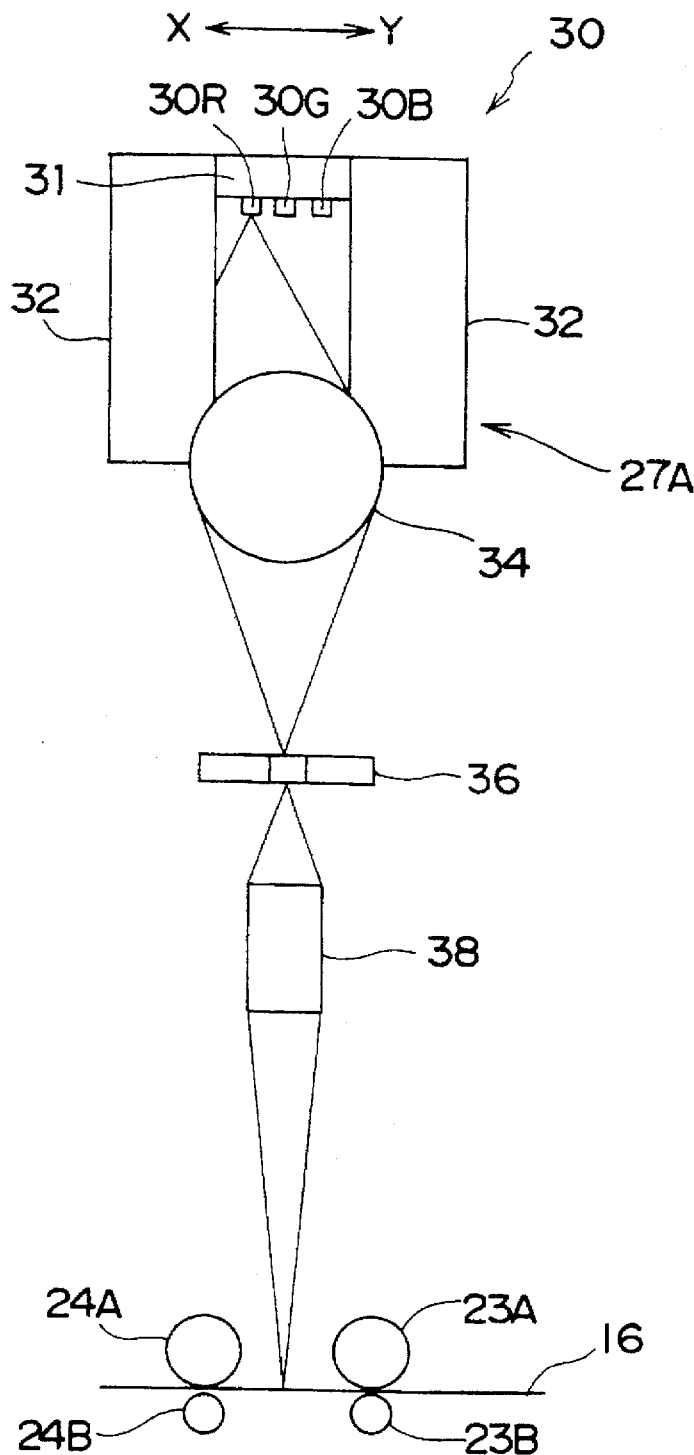
FIG. 2 is an overall schematic diagram of an exposure device in accordance with an embodiment of the present invention.

The exposure device 25 is disposed in a space above the exposure section 22 in the image recording apparatus 10. As shown in FIG. 2, the exposure device 25 is provided with a light source system 27A. In the light source system 27A, a pair of members 32 are disposed in face-to-face relationship with each other by being spaced apart in the horizontal direction (i.e., in the X-Y direction). An upper end of a hollow portion formed between the pair of members 32 is closed by a support member 31 clamped by the pair of members 32. The longitudinal direction of the support member 31 (i.e., a direction substantially perpendicular to the X-Y direction or a direction substantially perpendicular to the plane of the drawing) corresponds to the direction of one line on the photosensitive material 16.

Figure 3:
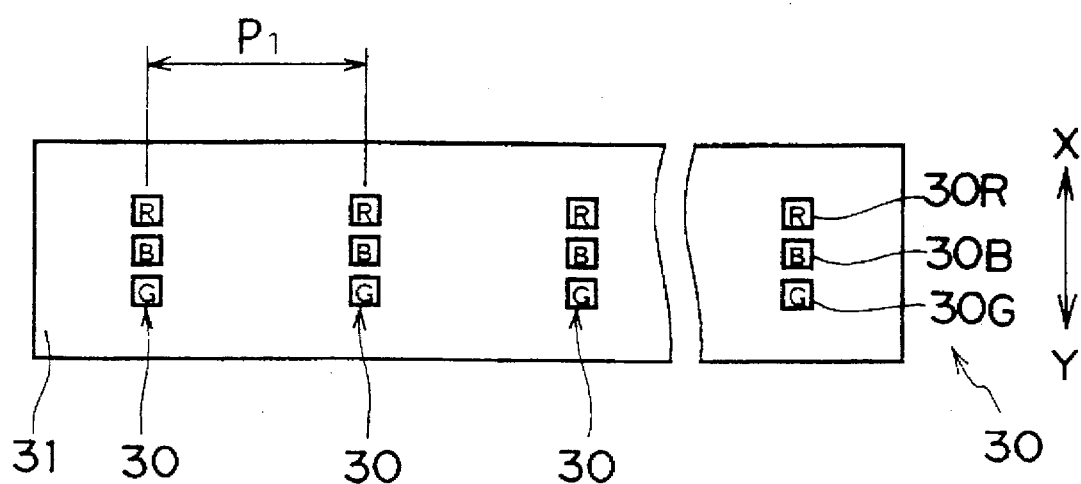
FIG. 3 is a diagram illustrating the layout of LEDs.

A plurality of light-emitting diodes (hereafter referred to as LEDs) 30R, 30G, and 30B serving as light-emitting elements in accordance with the present invention are disposed on the underside of the support member 31. As shown in FIG. 3, the LED 30R for emitting red light (R light), the LED 30B for emitting blue light (B light), and the LED 30G for emitting green light (G light) are juxtaposed in proximity to each other along a direction substantially perpendicular to the direction of one line on the photosensitive material 16, i.e., in the X-Y direction, and constitute one of groups of light-emitting elements 30. These groups of light-emitting elements 30 are arrayed along the direction of one line on the photosensitive material 16 at a predetermined pitch $P_1$ (normally, approximately 3 mm or thereabouts). Accordingly, the light-emitting phases of the LEDs 30R, LEDs 30B, and LEDs 30G in the direction in which the groups of light-emitting elements 30 are arrayed are the same.

A cylindrical lens 34 is attached to a lower end of the aforementioned hollow portion (see FIG. 2). The cylindrical lens 34 has its axial direction arranged substantially parallel to the longitudinal direction of the support member 31 (i.e., the direction of one line on the photosensitive material 16), and causes each light emitted from the LEDs 30R, LEDs 30G, and LEDs 30B to be formed into a slit beam arranged in a direction corresponding to the direction of one line on the photosensitive material 16.

Figure 4A:
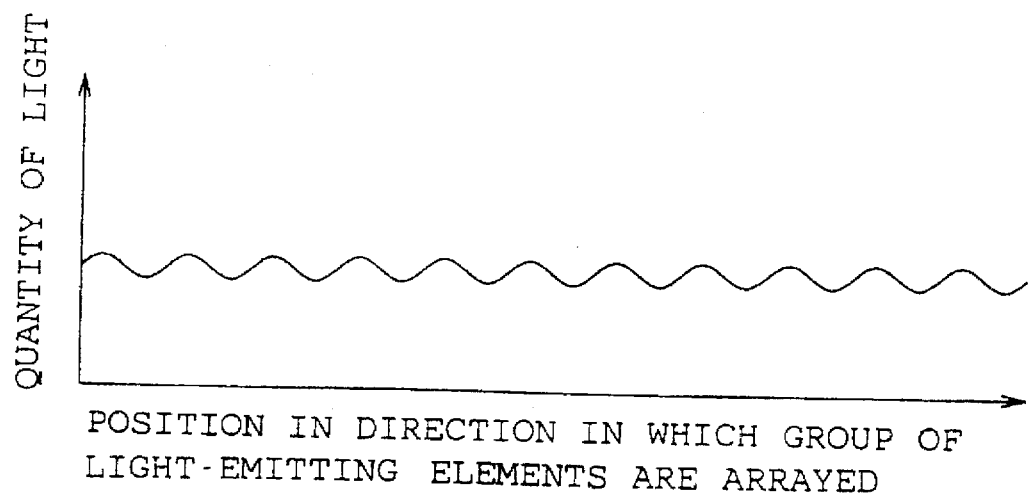
FIG. 4A is a diagram illustrating the irregularity in the quantity of light.
Figure 4B:
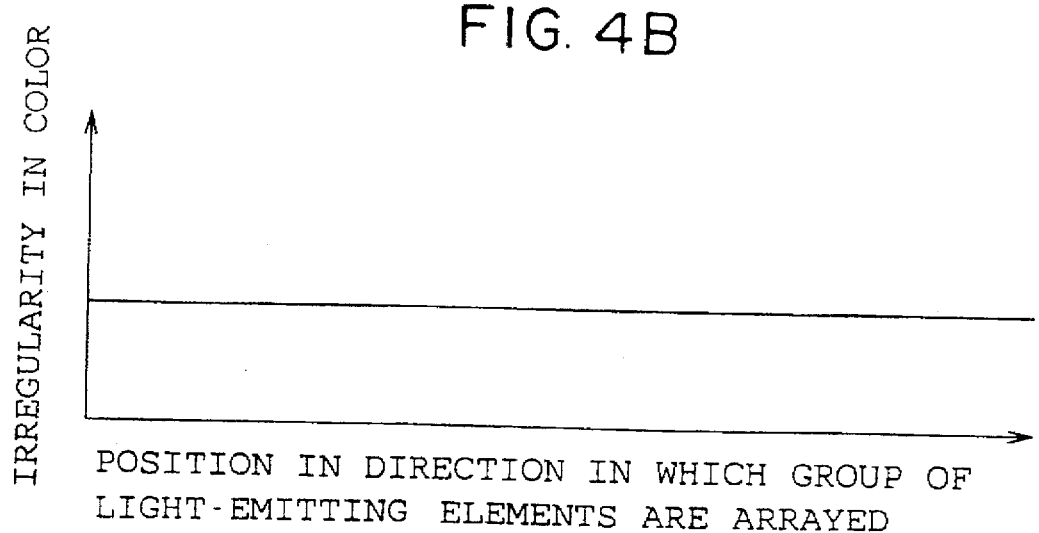
FIG. 4B is a diagram illustrating the irregularity in color.
Figure 38:
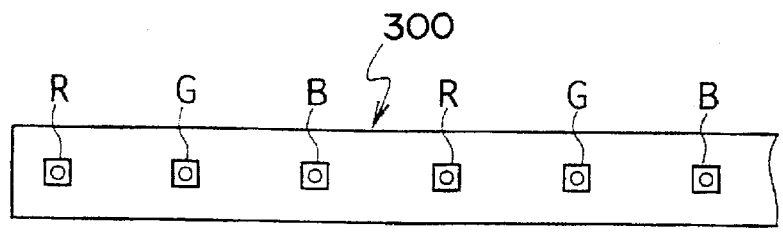
FIG. 38 is a plan view illustrating the layout of elements of a conventional LED array.
Figure 39A:
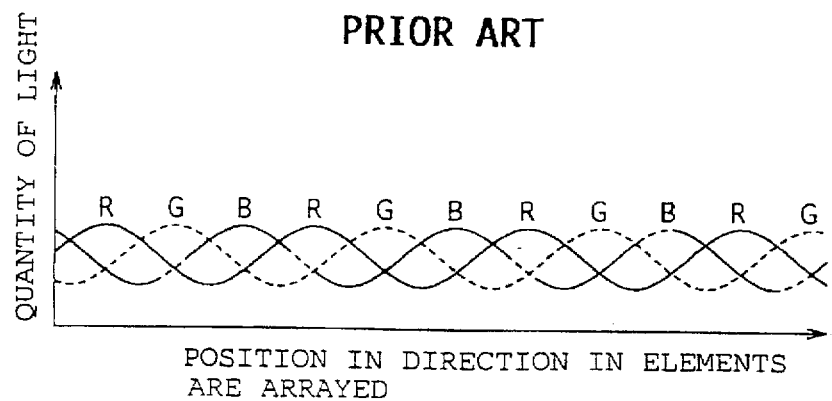
FIG. 39A is a diagram illustrating the irregularity in illuminance of the light from a conventional LED array.
Figure 39B:
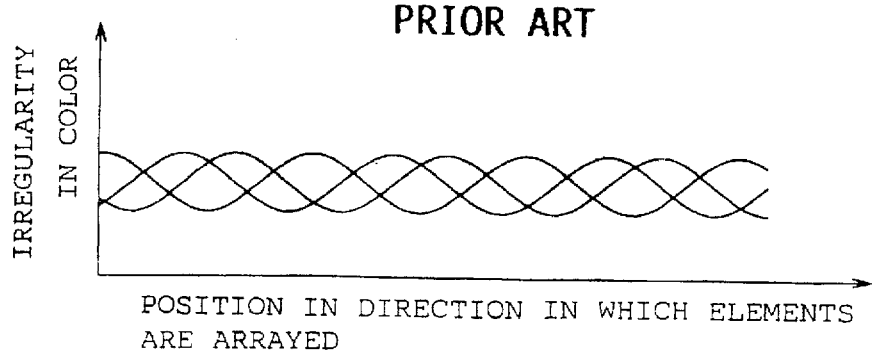
FIG. 39B is a diagram illustrating the irregularity in color using the conventional LED array.

Here, in a case where the light is emitted by an ordinary LED array 300 arranged by arraying LEDs merely in a linear direction, as shown in FIG. 38, irregularity occurs in illuminance (the quantity of light) in correspondence with the pitch of array of the LEDs, and irregularity also occurs in color in correspondence with the pitch of array of the LEDs, as shown in FIGS. 39A and 39B. In contrast, in the light source system 27A, since the LEDs for the B, G, and R light in each group of light-emitting elements 30 are disposed in close proximity to each other, and emit the respective colors with substantially the same phase, so that irregularity in color does not occur, as shown in FIG. 4B.

A liquid-crystal optical shutter array 36 serving as an optical shutter array in accordance with the present invention is provided below the cylindrical lens 34 (see FIG. 2). The liquid-crystal optical shutter array 36 is formed such that liquid-crystal cells 36S1, 36S2, . . . , 36Sn (see also FIG. 5) serving as optical shutter elements are arrayed in a direction corresponding to the longitudinal direction of the slit beam in correspondence with pixels constituting a row of pixels of one line on the photosensitive material 16. The liquid-crystal cells 36S1, 36S2, . . . , 36Sn are opened to allow the slit beam to be transmitted therethrough when a voltage is applied thereto, and are closed to shut off the slit beam when the voltage ceases to be applied thereto. Incidentally, the liquid-crystal cells may be of a type in which they are opened to shut off the slit beam when the voltage ceases to be applied thereto, and are closed to allow the slit beam to be transmitted therethrough when the voltage is applied thereto.

A self-focusing fiber array (typically a SELFOC lens array; hereafter referred to as the SLA) 38 is provided below the liquid-crystal optical shutter array 36. The SLA 38 causes the slit beam transmitted through the liquid-crystal cells 36S1, 36S2, . . . , 36Sn to form an image on the photosensitive material 16.

A switch back section 40 is provided on the side of the exposure section 22 (see FIG. 1), and a water application section 162 is provided below the exposure section 22. The photosensitive material 16, which has been transported in such a manner as to rise upward along the transport passage on the side of the photosensitive material magazine 14 and has been exposed in the exposure section 22, is temporarily fed into the switch back section 40, and is then fed into the water application section 162 through a transport passage provided below the exposure section 22 as the transport rollers 26 are rotated reversely.

A plurality of pipes are connected to the water application section 162 to supply water to the water application section 162.

A heat development/transfer section 104 is disposed on the side of the water application section 162, into which the photosensitive material 16 with water applied thereto is fed.

Meanwhile, an image-receiving-material magazine 106 is disposed on the side of the photosensitive material magazine 14 in the machine stand 12, and an image receiving material 108 is accommodated therein by being taken up in the form of a roll. A pigment fixing material having a mordant has been applied to the image-forming surface of the image receiving material 108, and the image receiving material 108 has been taken up with its image-forming surface facing a takeup shaft for taking up the image receiving material 108.

The image-receiving-material magazine 106, like the photosensitive material magazine 14, is comprised of a trunk portion and a pair of side frame portions fixed to both ends of the trunk portion. The image-receiving-material magazine 106 can be pulled out toward the front side of the machine stand 12 (toward this side in FIG. 1, i.e., in the transverse direction of the taken-up image receiving material 108).

A pair of nip rollers 110 is disposed in the vicinity of an image-receiving-material paying-out port of the image-receiving-material magazine 106, and is capable of pulling out the image receiving material 108 from the image-receiving-material magazine 106 and of canceling their nip. A cutter 112 is disposed on the downstream side of the nip rollers 110.

An image-receiving-material transporting section 180 is provided on the downstream side of the cutter 112 near the photosensitive material magazine 14. Transport rollers 186, 190, and 114 and guide plates 182 are disposed in the image-receiving material transporting section 180 so as to transport the image receiving material 108 cut to a predetermined length to the heat development/transfer section 104.

The photosensitive material 16 which is transported to the heat development/transfer section 104 is fed into a nip between a laminating roller 120 and a heat drum 116. Meanwhile, the image receiving material 108 is also fed into the nip between the laminating roller 120 and the heat drum 116 in synchronism with the transport of the photosensitive material 16 in a state in which the image receiving material 108 is preceded by the photosensitive material 16 by a predetermined length, and is superposed on top of the photosensitive material 16.

A pair of halogen lamps 132A and 132B is disposed within the heat drum 116 and is capable of raising the temperature of the surface of the heat drum 116.

An endless pressure-contact belt 118 is trained around five training rollers 134, 135, 136, 138, and 140. The outer side of the endless pressure-contact belt 118 located between the training roller 134 and the training roller 140 is brought into pressure contact with the outer periphery of the heat drum 116.

A bending/guiding roller 142 is disposed downstream of the endless pressure-contact belt 118 in the transporting direction of the materials and on the lower side of the heat drum 116. A peeling claw 154 is disposed downstream of the bending/guiding roller 142 in the transporting direction of the materials and on the lower side of the heat drum 116, and is rotatably supported by a shaft.

The photosensitive material 16 peeled off by the peeling claw 154 is wound around the bending/guiding roller 142, and is accumulated in a waste photosensitive material accommodating box 178.

A peeling roller 174 and a peeling claw 176 are disposed in the vicinity of the heat drum 116 on the side of the bending/guiding roller 142. Disposed below the peeling roller 174 and the peeling claw 176 are an image receiving material guide 170 as well as image receiving material discharge rollers 172, 173, and 175, so that the image receiving material 108 peeled off the heat drum 116 by means of the peeling roller 174 and the peeling claw 176 can be guided and transported.

The image receiving material 108 peeled off from the outer periphery of the heat drum 116 by the peeling claw 176 is transported by the image receiving material guide 170 and the image receiving material discharge rollers 172, 173, and 175 and is discharged to a tray 177.

Figure 5:
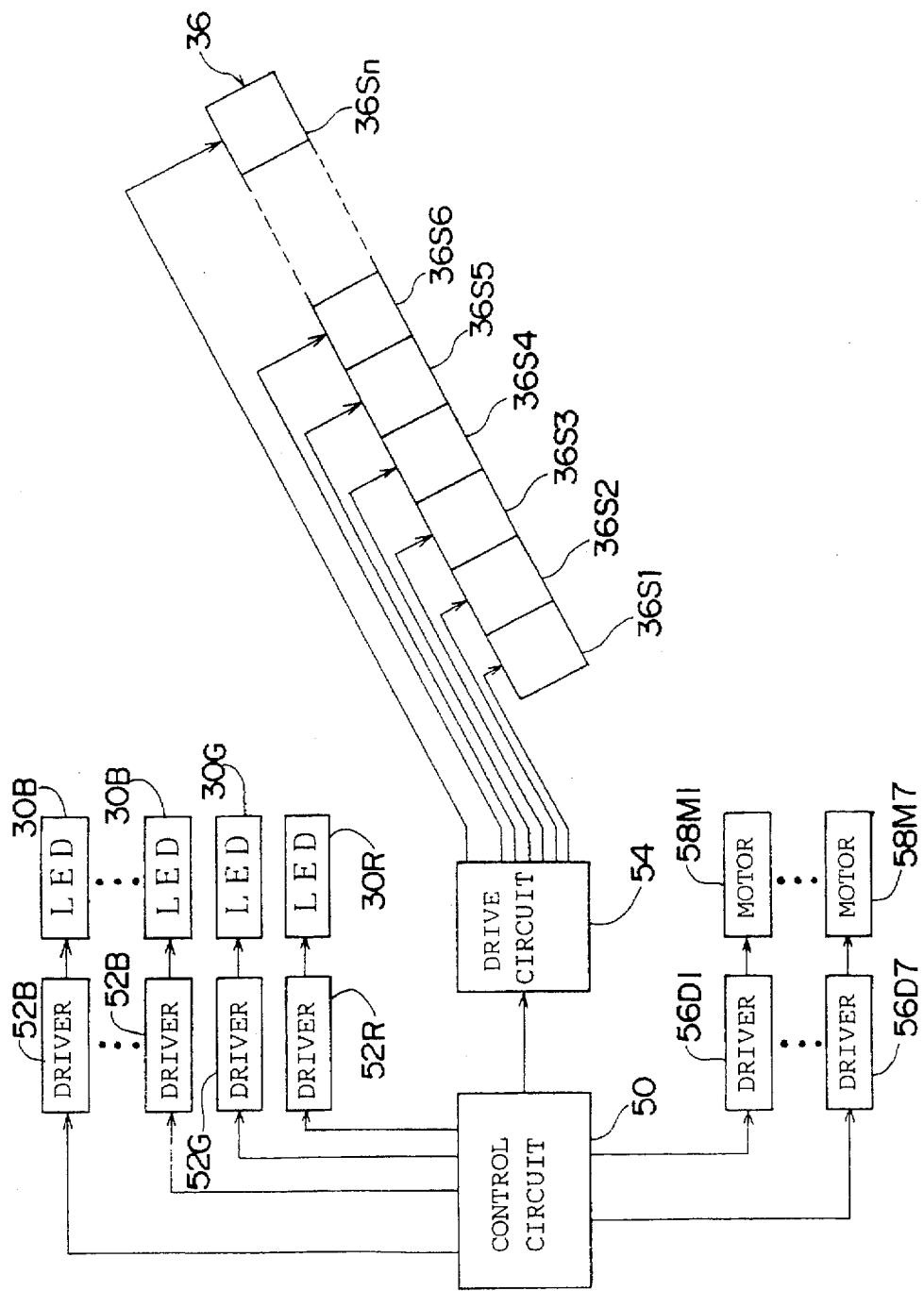
FIG. 5 is a circuit diagram of a control system of the exposure device.

Next, referring to FIG. 5, a description will be given of the control system of the exposure device 25. As shown in FIG. 5, the control system of the exposure device 25 has a control circuit 50 as a control member of the present invention. Connected to the control circuit 50 are an LED 30R via a driver 52R, an LED 30G via a driver 52G, and an LED 30B via a driver 52B, respectively. In addition, a drive circuit 54 for driving the liquid-crystal cells 36S1, 36S2, . . . , 36Sn is also connected to the control circuit 50. Further, motors 58M1 to 58M7 for driving the transport rollers 19, 21, 23A, 23B, 24A, 24B, 26 by means of drivers 56D1 to 56D7 are respectively connected to the control circuit 50.

Next, a description will be given of the operation of this embodiment. When the unillustrated operation panel is operated to designate the magnification, the number of sheets to be processed, and the like and an instruction of starting is given, image processing is commenced. Namely, the nip rollers 18 are operated in a state in which the photosensitive material 16 is set in the photosensitive material magazine 14, and the photosensitive material 16 is pulled out by the nip rollers 18. When a predetermined length of the photosensitive material 16 is pulled out, the cutter 20 is actuated to cut the photosensitive material 16 to a predetermined length.

After the actuation of the cutter 20, the direction of travel of the photosensitive material 16 is inverted as the photosensitive material 16 is transported along the transport passage, and the photosensitive material 16 is transported to the exposure section 22 in a state in which its photosensitive (exposure) surface is faced upward.

The control circuit 50 in the exposure device 25 controls the liquid-crystal cells 36S1, 36S2, . . . , 36Sn as described below, such that the amount of exposure of portions of the photosensitive material 16 corresponding to pixels with a slit beam transmitted through the liquid-crystal cells 36S1, 36S2, . . . , 36Sn becomes substantially equal to the amount of exposure of corresponding pixels of color image data stored in an unillustrated memory.

Figure 6:
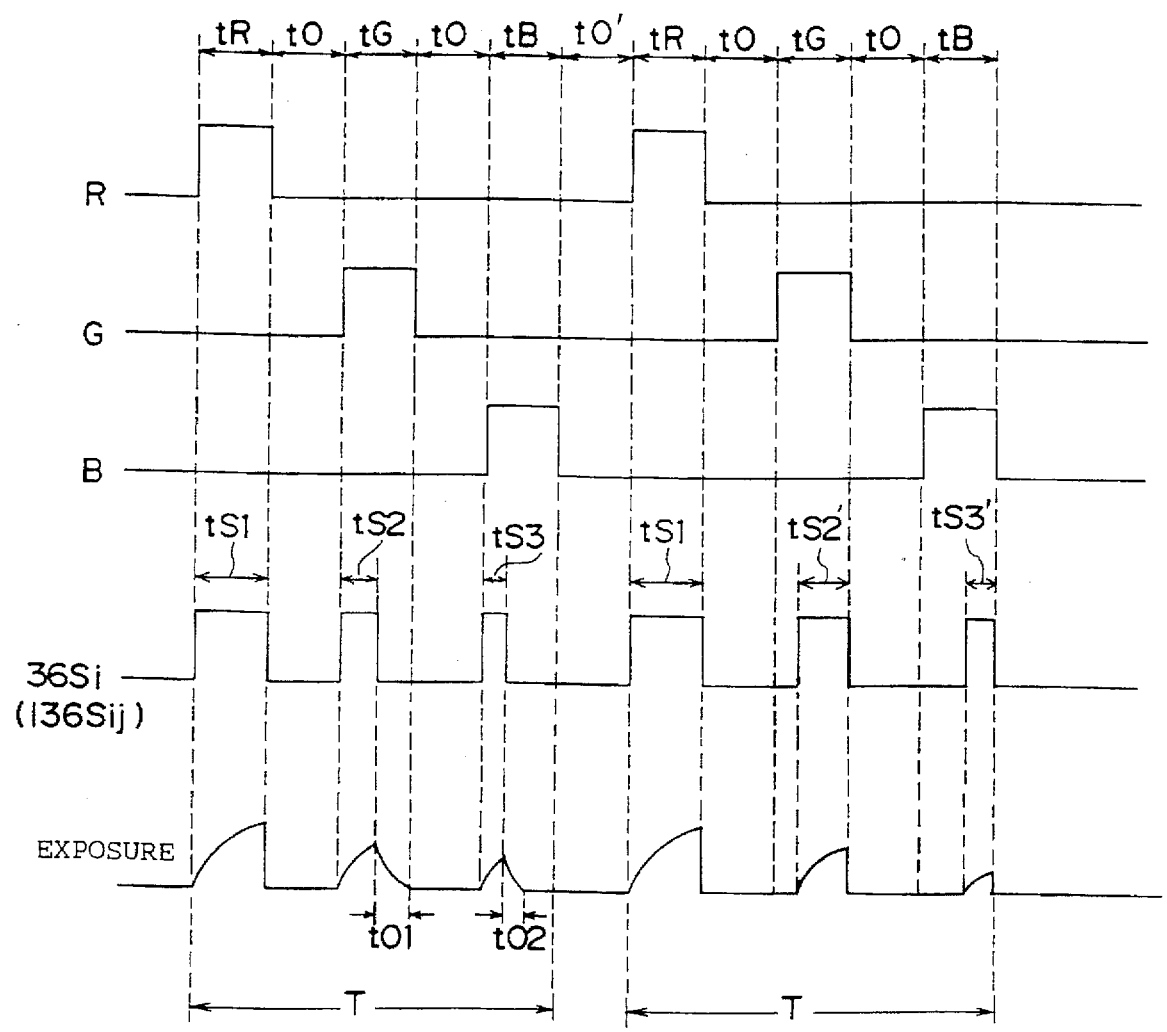
FIG. 6 is a timing chart illustrating a first controlling method using a control circuit of the control system of the exposure device.

Namely, as shown in FIG. 6, at a predetermined time interval t0 a pulsed voltage is applied to the LED 30R for a predetermined period tR, to the LED 30G for a predetermined period tG, and to the LED 30B for a predetermined period tB, respectively, so as to cause the LED 30R, the LED 30G, and the LED 30B to emit light. Consequently, the R light, the G light, and the B light are consecutively emitted for the period tR from the LED 30R, for the period tG from the LED 30G, and for the period tB from the LED 30B, respectively.

The R light, the G light, and B light applied consecutively at the predetermined time interval t0 are formed into a slit beam by being transmitted through the cylindrical lens 34, and are applied to the liquid-crystal optical shutter array 36.

By controlling the drive circuit 54, the control circuit 50 in the exposure device 25 controls the opening and closing of the liquid-crystal cells 36S1, 36S2, . . . , 36Sn by application of a predetermined pulsed voltage thereto such that the amount of exposure of portions of the photosensitive material 16 corresponding to pixels to the R light, the G light, and the B light applied consecutively after being transmitted through the liquid-crystal cells 36S1, 36S2, . . . , 36Sn becomes substantially equal to the amount of exposure of corresponding pixels of the color image data. This controlling process will be described by citing as an example a liquid-crystal cell 36Si corresponding to a certain pixel on the photosensitive material 16. As shown in FIG. 6, the liquid-crystal cell 36Si is driven such that, as for the R light, the liquid-crystal cell 36Si is opened only during a time duration tS1 of the period tR during which the R light is applied (a final opening of the liquid-crystal cell 36Si: 100%); as for the G light, the liquid-crystal cell 36Si is opened only during a time duration tS2 of the period tG during which the G light is applied (a final opening thereof: 50%); and as for the B light, the liquid-crystal cell 36Si is opened only during a time duration tS3 of the period tB during which the B light is applied (a final opening thereof: 20%).

Here, as shown in FIG. 6, the liquid-crystal cell 36Si undergoes a phenomenon of transition in which the liquid-crystal cell 36Si is opened gradually instead of being immediately opened fully in response to a predetermined pulsed voltage applied thereto. Accordingly, the amount of exposure of the portion of the photosensitive material 16 corresponding to a pixel by each of the R light, the G light, and the B light becomes gradually larger in each case. Similarly, the liquid-crystal cell 36Si undergoes a phenomenon of transition in which the liquid-crystal cell 36Si is closed gradually instead of being immediately closed fully when the predetermined pulsed voltage ceases to be applied thereto. Hence, even after the pulsed voltage ceases to be applied to the liquid-crystal cell 36Si (i.e., after the lapse of the time duration tS2 and the time duration tS3, respectively), the portion of the photosensitive material 16 corresponding to the pixel continues to be exposed with a gradually decreasing intensity to the G light and the B light for a time duration t01 and a time duration t02, respectively. By also taking these phenomena of transition into consideration, the time durations tS1, tS2, and tS3 are set such that the amount of exposure of the portion of the photosensitive material 16 corresponding to the pixel by the R light, the G light, and the B light applied consecutively becomes substantially equal to the amount of exposure of the corresponding pixel of the color image data.

Then, after one line on the photosensitive material 16 has thus been exposed, the control circuit 50 drives the motors 58M1 to 58M7 by means of the drivers 56D1 to 56D7, which in turn causes the transport rollers 19, 21, 23A, 23B, 24A, 24B, and 26 to be driven so as to transport the photosensitive material 16 by a one-line portion and expose an ensuing line. When the ensuing line is exposed, in this embodiment, as shown in FIG. 6, the liquid-crystal cell 36Si is opened such that the opening becomes continuously larger until the end of emission of each of the R light, the G light and the B light. incidentally, in this case, time durations tS1, tS2', and tS3' are set so that the amount of exposure of the portion of the photosensitive material 16 corresponding to the pixel by the R light, the G light, and the B light applied consecutively becomes substantially equal to the amount of exposure of the corresponding pixel of the color image data. That is, here, with respect to the G light and the B light, the timing at which the liquid-crystal cell 36Si is opened is delayed than the timing at which the G light and the B light are emitted. Thus, the photosensitive material 16 positioned in the exposure section 22 is subjected to scanning exposure.

After the exposure is started, the exposed photosensitive material 16 is temporarily sent to the switch back section 40, and is then sent to the water application section 162 by the reverse rotation of the transport rollers 26.

In the water application section 162, water is applied to the photosensitive material 16, and the photosensitive material 16 passes through the water application section 162 while excess water is being removed by a pair of squeeze rollers 68.

The photosensitive material 18, to which water serving as an image-forming solvent is applied in the water application section 162, is sent to the heat development/transfer section 104 by the squeeze rollers 68.

Meanwhile, as the scanning and exposure of the photosensitive material 16 is started, the image receiving material 108 is pulled out from the image receiving material magazine 106 by the nip rollers 110 and is transported. When a predetermined length of the image receiving material 108 is pulled out, the cutter 112 is actuated to cut the image receiving material 108 to a predetermined length.

After the actuation of the cutter 112, the image receiving material 108 is transported by the transport rollers 190, 186, and 114 while being guided by the guide plate 182, and is set on standby immediately before the heat development/transfer section 104.

In the heat development/transfer section 104, when it is detected that the photosensitive material 16 has been fed into a nip between the outer periphery of the heat drum 116 and the laminating roller 120 by the squeeze rollers 68, the transport of the image receiving material 108 is resumed and is the image receiving material 108 is fed into the nip between the outer periphery of the heat drum 116 and the laminating roller 120. At the same time, the heat drum 116 is operated.

In this case, a guide plate 122 is disposed between the laminating roller 120 and the squeeze rollers 68 of the water application section 162, so that the photosensitive material 16 sent from the squeeze rollers 68 is guided reliably into the nip between the outer periphery of the heat drum 116 and the laminating roller 120.

The photosensitive material 16 and the image receiving material 108, which are superposed one on top of the other by the laminating roller 120, are nipped in the superposed state by the outer periphery of the heat drum 116 and the endless pressure-contact belt 118, and are transported substantially by two-thirds of the circumference (between the training roller 134 and the training roller 140) of the heat drum 116. As a result, the photosensitive material 16 and the image receiving material 108 are heated, so that mobile pigments are released, and the pigments are simultaneously transferred onto a pigment fixing layer of the image receiving material 108, thereby obtaining an image.

Subsequently, when the photosensitive material 16 and the image receiving material 108 are nipped and transported, and reach a lower portion of the heat drum 116, the peeling claw 154 is moved by a cam 130 into engagement with a leading end of the photosensitive material 16 which is being transported by preceding the image receiving material 108 by a predetermined length. Consequently, the leading end portion of the photosensitive material 16 is peeled off the outer periphery of the heat drum 116. Further, as the peeling claw 154 is returned, the photosensitive material 16 is pressed by a pinch roller 157. As a result, the photosensitive material 16 is wound around the bending/guiding roller 142 while being pressed by the pinch roller 157, is then moved downward, and is accumulated in the waste photosensitive material accommodating box 178.

Meanwhile, the image receiving material 108, which is separated from the photosensitive material 16 and moves in close contact with the heat drum 116, is fed into a nip between the outer periphery of the heat drum 116 and the peeling roller 174 so as to be peeled off the outer periphery of the heat drum 116.

The image receiving material 108, which is peeled off the outer periphery of the heat drum 116 by the peeling claw 176, is moved downward while being wound around the peeling roller 174, is transported by the image receiving material discharge rollers 172, 173, and 175 while being guided by the image receiving material guide 170, and is discharged to the tray 177.

As described above, the light-emitting diodes for emitting red, green, and blue light are used as light sources, and the liquid-crystal cells are controlled such that the amount of exposure of the portions of the photosensitive material 16 corresponding to pixels becomes substantially equal to the amount of exposure of the corresponding pixels of the color image data. Hence, it is unnecessary to provide a movable portion such as a filter cylinder for converting white light into the R light, the G light, and the B light, thereby making it possible to provide a compact and low-cost exposure device.

In the above-described embodiment, the light source system 27A is arranged such that the LED 30B for the B light, the LED 30G for the G light, and the LED 30R for the R light, which are light-emitting elements, are juxtaposed in proximity to each other along a direction substantially perpendicular to the direction of one line on the photosensitive material 16 so as to constitute one of the groups of light-emitting elements 30, and these groups of light-emitting elements 30 are arrayed along the direction of one line on the photosensitive material 16 at the predetermined pitch $P_1$. However, the direction in which the LEDs for the B, G, and R light are arrayed and the number thereof are not limited to the same.

Figure 7:
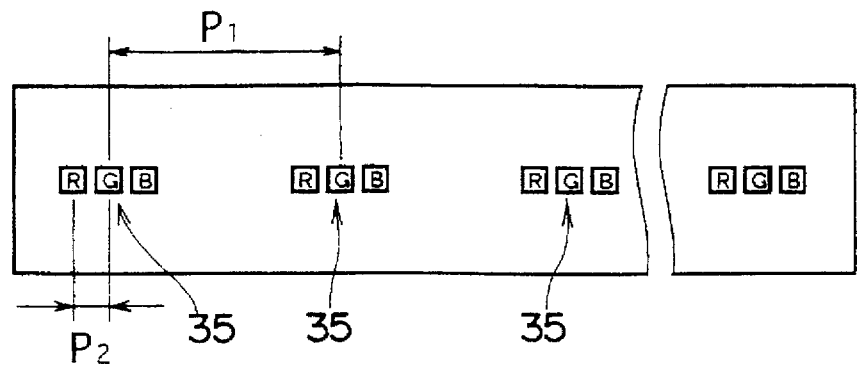
FIG. 7 is a plan view illustrating another example of the layout of the LEDs.
Figure 8:
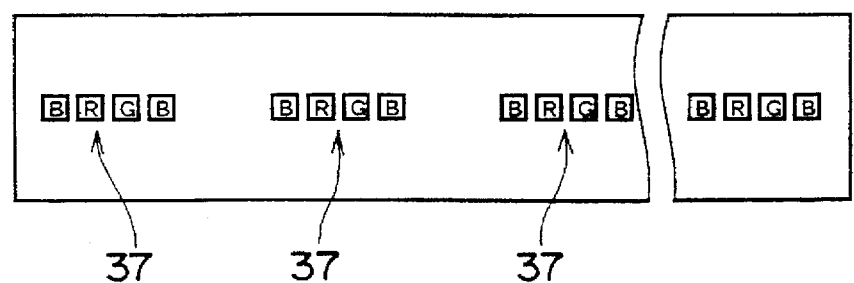
FIG. 8 is a plan view illustrating still another example of the layout of the LEDs.

For example, as shown in FIG. 7, an arrangement may be provided such that an LED for the B light, an LED for the G light, and an LED for the R light, which are light-emitting elements, are juxtaposed in proximity to each other along the direction of one line on the photosensitive material 16 at a pitch $P_2$ of 0.5 mm or thereabouts so as to constitute one of groups of light-emitting elements 35, and these groups of light-emitting elements 35 are arrayed along the direction of one line on the photosensitive material 16 at the predetermined pitch $P_1$. Alternatively, as shown in FIG. 8, LEDs (e.g., LEDs for the B light) whose quantity of light is smaller than that of the other LEDs may be provided in a greater number, as required, than the other LEDs so as to constitute a group of light-emitting elements 37. In this case, in substantially the same manner as the above-described embodiment, the light-emitting phases of the respective LEDs of the group of light-emitting elements 37 become substantially equal, thereby making it possible to substantially reduce the irregularity in color as compared with the conventional example.

Figure 9:
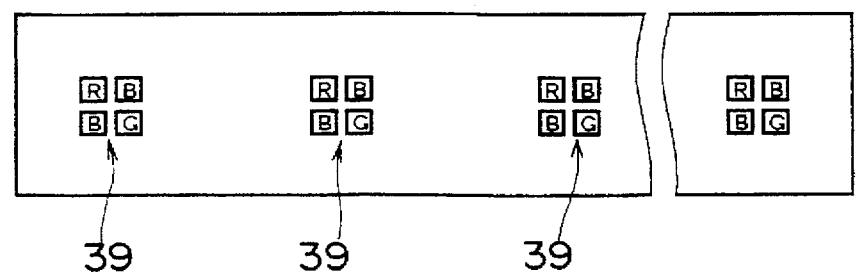
FIG. 9 is a plan view illustrating a further example of the layout of the LEDs.

Further, as shown in FIG. 9, an arrangement may be provided such that the LEDs serving as the light-emitting elements are juxtaposed in two or three or more lines in proximity to each other both in the direction substantially perpendicular to the direction of one line on the photosensitive material 16 and in the direction of one line on the photosensitive material 16 so as to form a group of light-emitting elements 39. In this case, it is preferred that LEDs (e.g., LEDs for the B light) whose quantity of light is smaller than that of the other LEDs may be provided in a greater number, as required, than the other LEDs, or the number of the LEDs is determined in correspondence with the sensitivity of the photosensitive material 16, and that the LEDs provided in a greater number are arranged in a dispersed manner in the group of light-emitting elements 37. In an embodiment shown in FIG. 9, the LEDs for the B light are arranged in such a manner as to be juxtaposed diagonally. In this case as well, in substantially the same manner as the above-described embodiment, the light-emitting phases of the respective LEDs of the group of light-emitting elements 39 become substantially equal, thereby making it possible to substantially reduce the irregularity in color as compared with the conventional example.

In addition, although, in the above-described embodiment, the light source system 27A is arranged by using the LEDs for B, G, and R light serving as the light-emitting elements, the light-emitting elements are not restricted to the same, and it is possible to use, for example, a false system for the B, R, and G light, or a light source combining wavelengths of four or more kinds of color.

Figure 10:
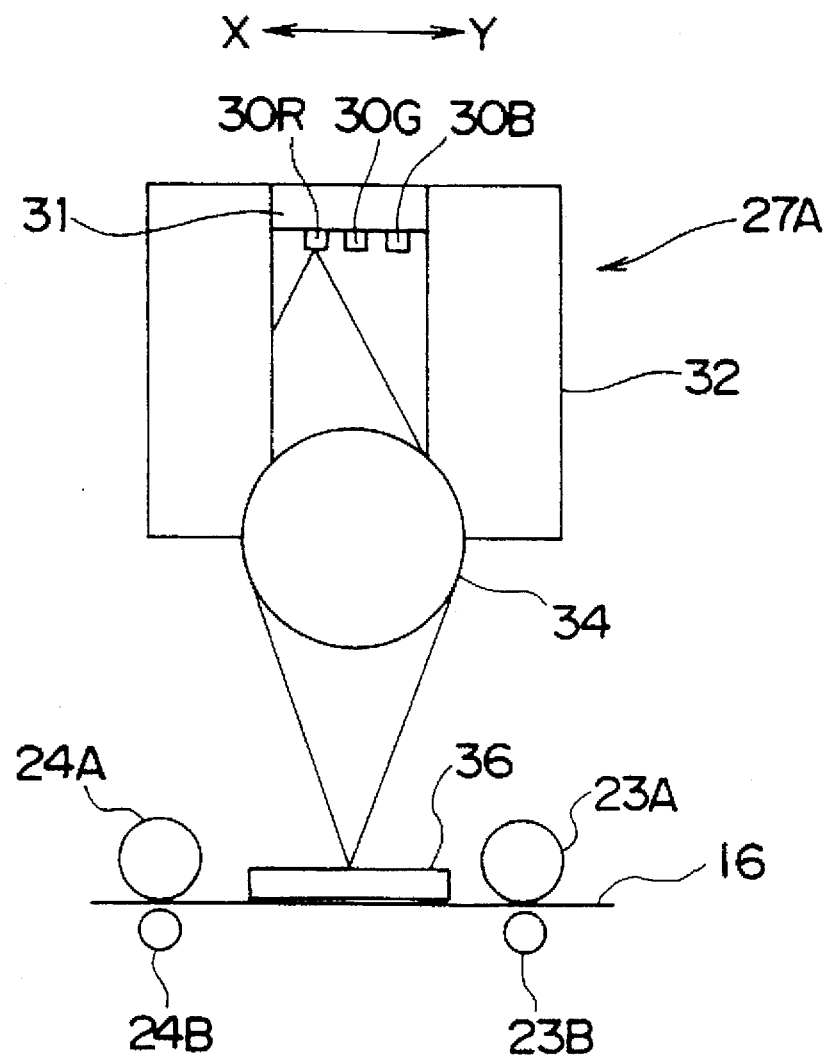
FIG. 10 is an overall schematic diagram of the image recording apparatus in accordance with another embodiment of the present invention.

In addition, although, in the above-described embodiment, the slit beam transmitted through the liquid-crystal optical shutter array 36 using the SLA 38 is used to form an image on the photosensitive material 16, the present invention is not limited to the same, and an arrangement may be provided such that, as shown in FIG. 10, the photosensitive material 16 is brought into close contact with the liquid-crystal optical shutter array 36. This arrangement makes it possible to eliminate an image-forming lens system such as the SLA, and make the exposure device more compact.

Figure 11:
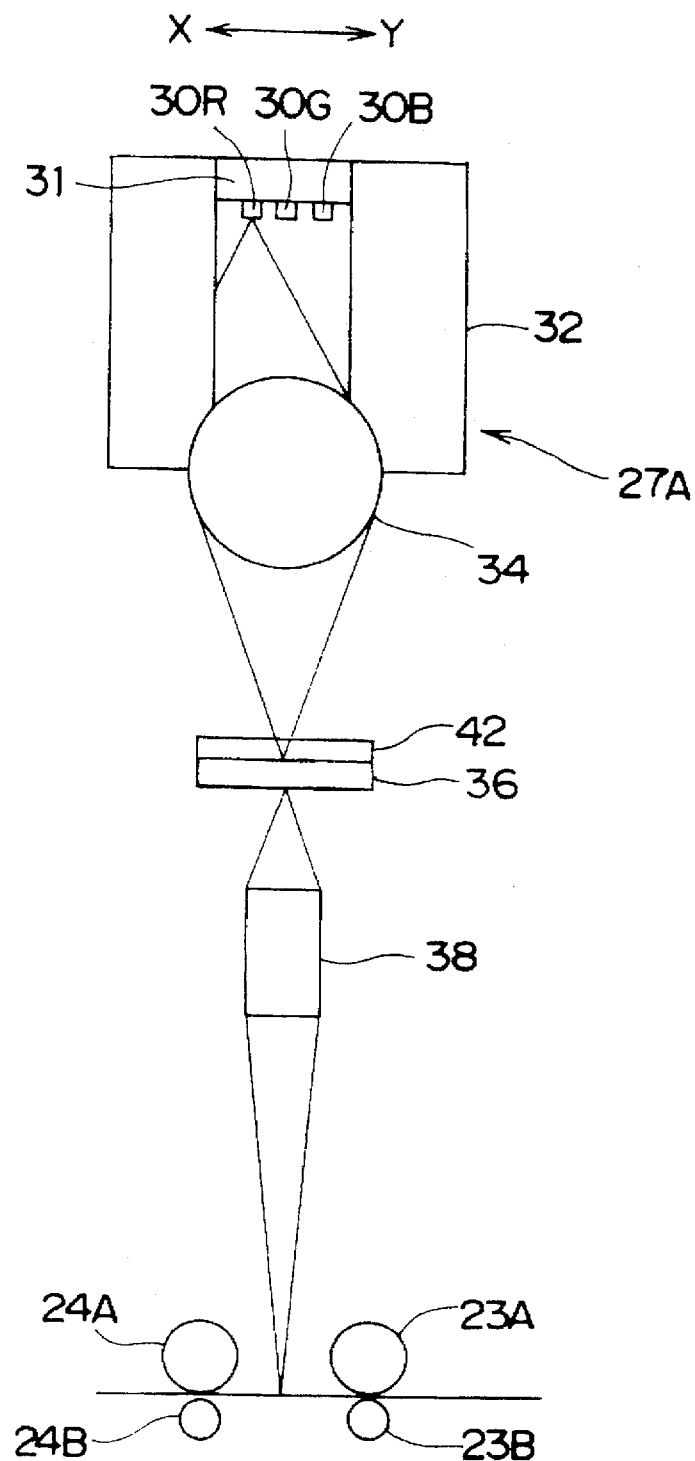
FIG. 11 is an overall schematic diagram of an image recording apparatus in accordance with still another embodiment of the present invention.

In addition, as shown in FIG. 11, a diffusing plate 42 serving as a diffusing member for diffusing the light formed as the slit beam after being transmitted through the cylindrical lens may be disposed in the vicinity of the light-source side of the liquid-crystal optical shutter array 36 in the above-described embodiment. This arrangement makes it possible to diffuse the slit beam and eliminate the nonuniformity of emission of light to the liquid-crystal cells, thereby making it possible to improve the efficiency of utilizing the light.

Figure 12:
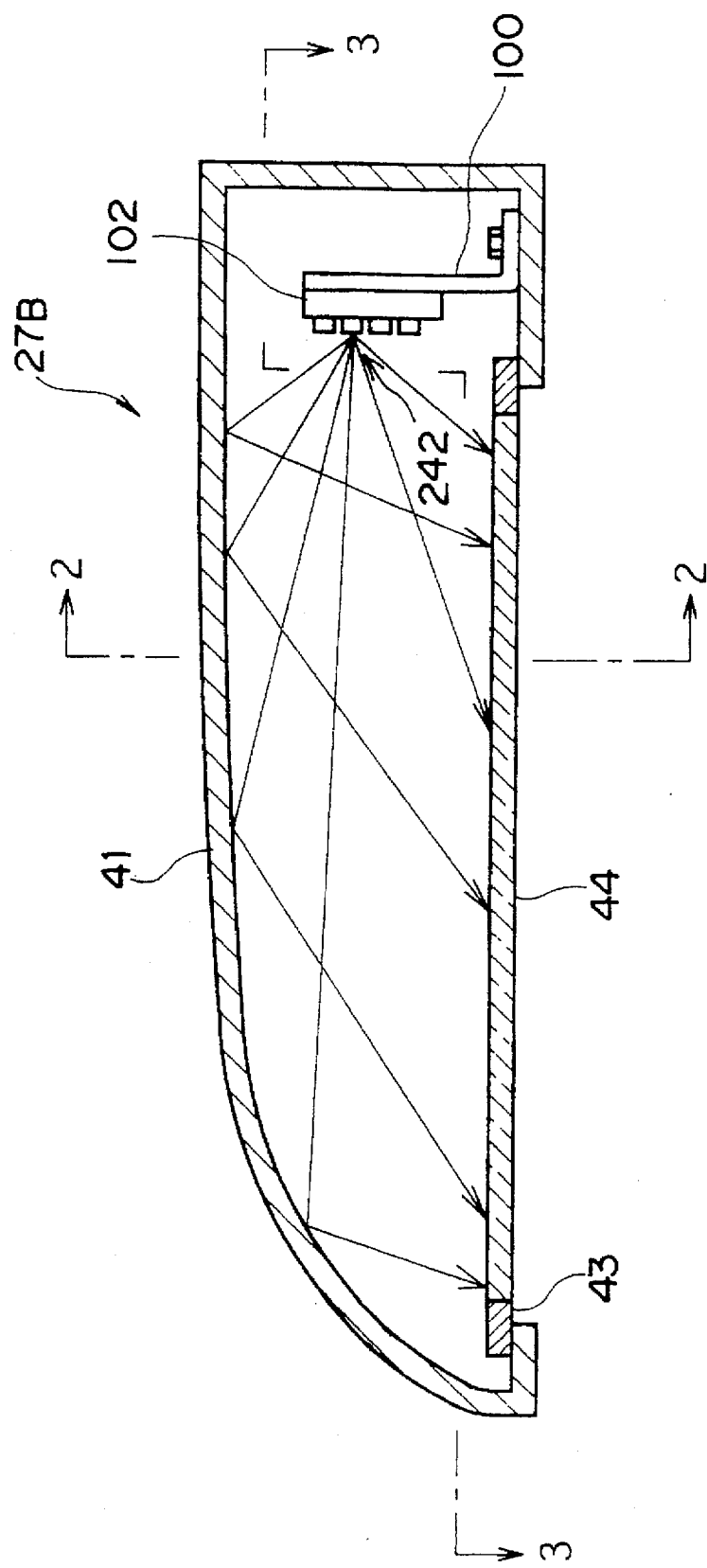
FIG. 12 is a vertical cross-sectional view illustrating an arrangement of another example of the light source system.
Figure 13:
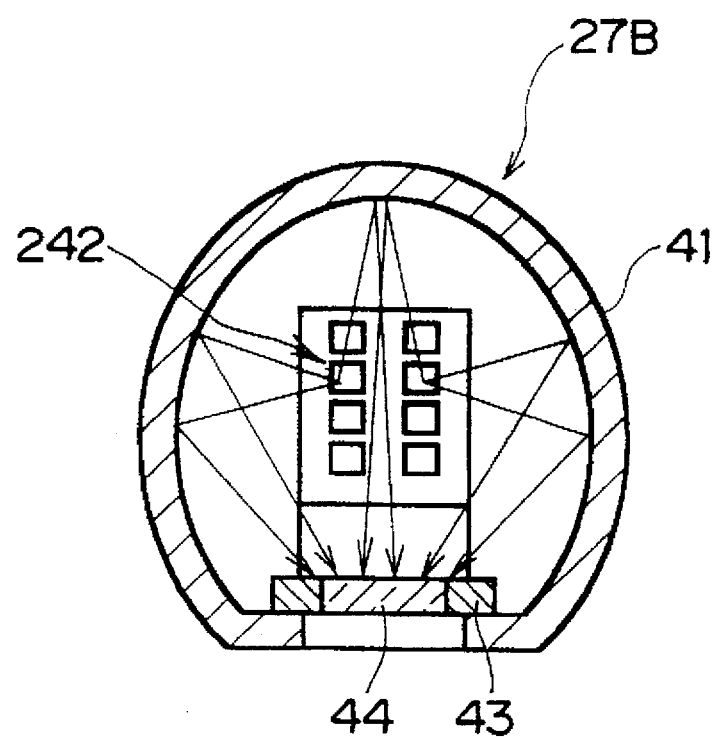
FIG. 13 is a cross-sectional view of the example of the light source system taken along line 2—2 of FIG. 12.
Figure 14:
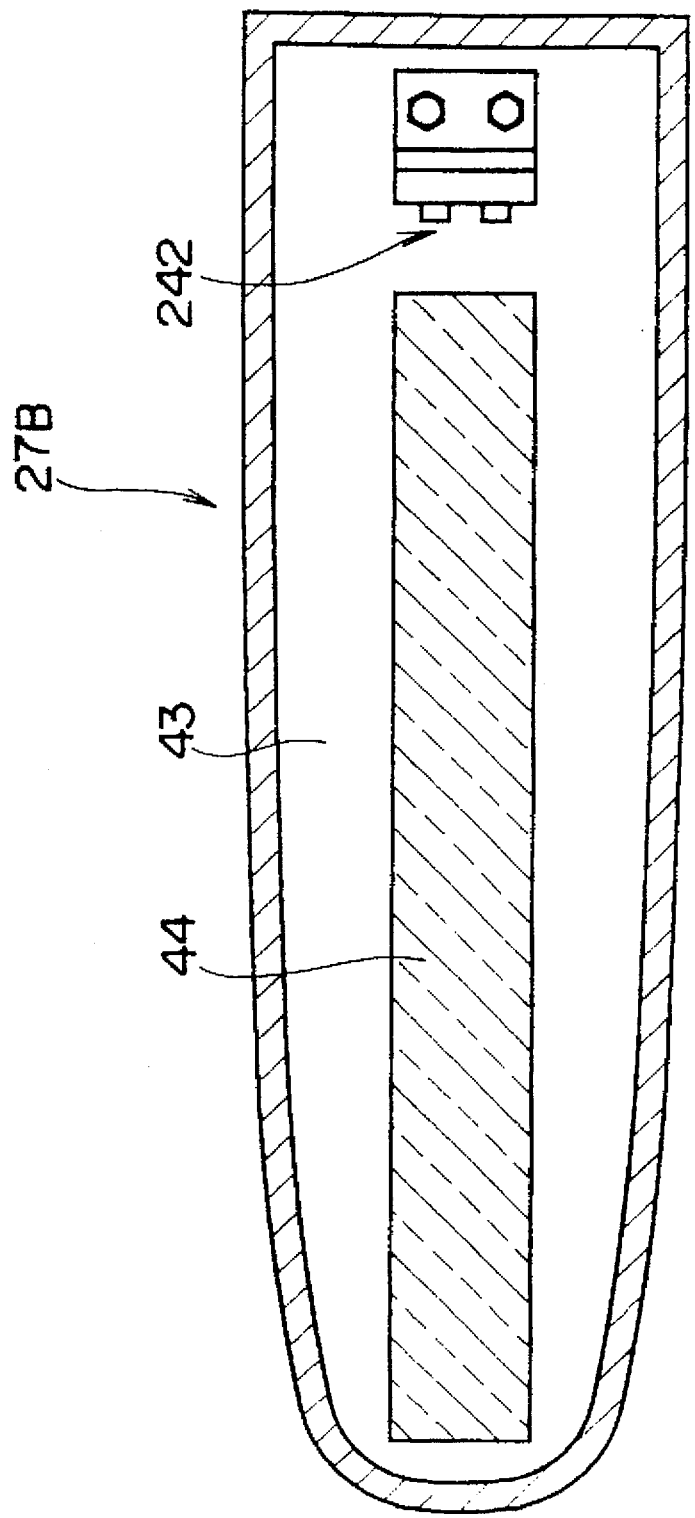
FIG. 14 is a cross-sectional view of the example of the light source system taken along line 3—3 of FIG. 12.

Further, although, in the above-described embodiment, the light source system 27A for directly applying the light of three colors from the LEDs 30R, 30G, and 30B in the downward direction in the exposure device 25, the present invention is not limited to the same, and it is possible to use a light source system 27B having an optical waveguide, as shown in FIGS. 12 to 14.

FIG. 12 shows a vertical cross-sectional view of the arrangement of the light source system 27B. FIG. 13 shows a cross-sectional view of the light source system 27B taken along the line 13 to 13 in FIG. 12. FIG. 14 shows a cross-sectional view of the light source system 27B taken along the line 14 to 14 in FIG. 12.

The light source system 27B has a reflecting plate 41 constituting the optical waveguide. The reflecting plate 41 is formed in the shape of a gutter with its open side set as a bottom, and is formed as a parabolic reflecting plate in which the vertical and horizontal cross-sectional shapes of its reflecting surface are formed as parabolic curves. LEDs 242 are attached to one longitudinal end of the reflecting plate 41 via a bracket 100 and a support member 102. The LEDs 242 are arranged such that LEDs serving as light-emitting elements for emitting the B light, LEDs serving as light-emitting elements for emitting the G light, and LEDs serving as light-emitting elements for emitting the R light are juxtaposed adjacent to each other. Incidentally, the LEDs are desirably placed in a concentrated manner as much as possible. Consequently, the light from the LEDs 242 is emitted toward the reflecting plate 41, and the light reflected from an inner peripheral reflecting surface of the reflecting plate 41 is directed uniformly toward the bottom opening. A base plate 43 is attached to the bottom opening of the reflecting plate 41, and a scattering plate 44 serving as a light-emergent portion is attached to the central portion of the base plate 43. As shown in FIG. 14, the scattering plate 44 is formed in the shape of a slit having a narrow width (e.g., 1 mm to 20 mm). This scattering plate 44 is capable of allowing the light to be transmitted therethrough while scattering the light, so that the light emitted from the LEDs 242 and reflected from various longitudinal portions of the reflecting plate 41 is scattered as it is transmitted through the scattering plate 44. As a result, the light emitted from the LEDs 242 is radiated uniformly as a slit beam along the longitudinal direction of the scattering plate 44.

In addition, as for the LEDs 242 of the light source system 27B, their emission time and luminance can be controlled independently. For this reason, it is unnecessary to provide a color filter or a diaphragm mechanism for controlling the quantity of light or the quality of light on the optical axis, and the control of the quantity of light and the quality of light can be effected by controlling the current supplied to the LEDs.

Figure 15:
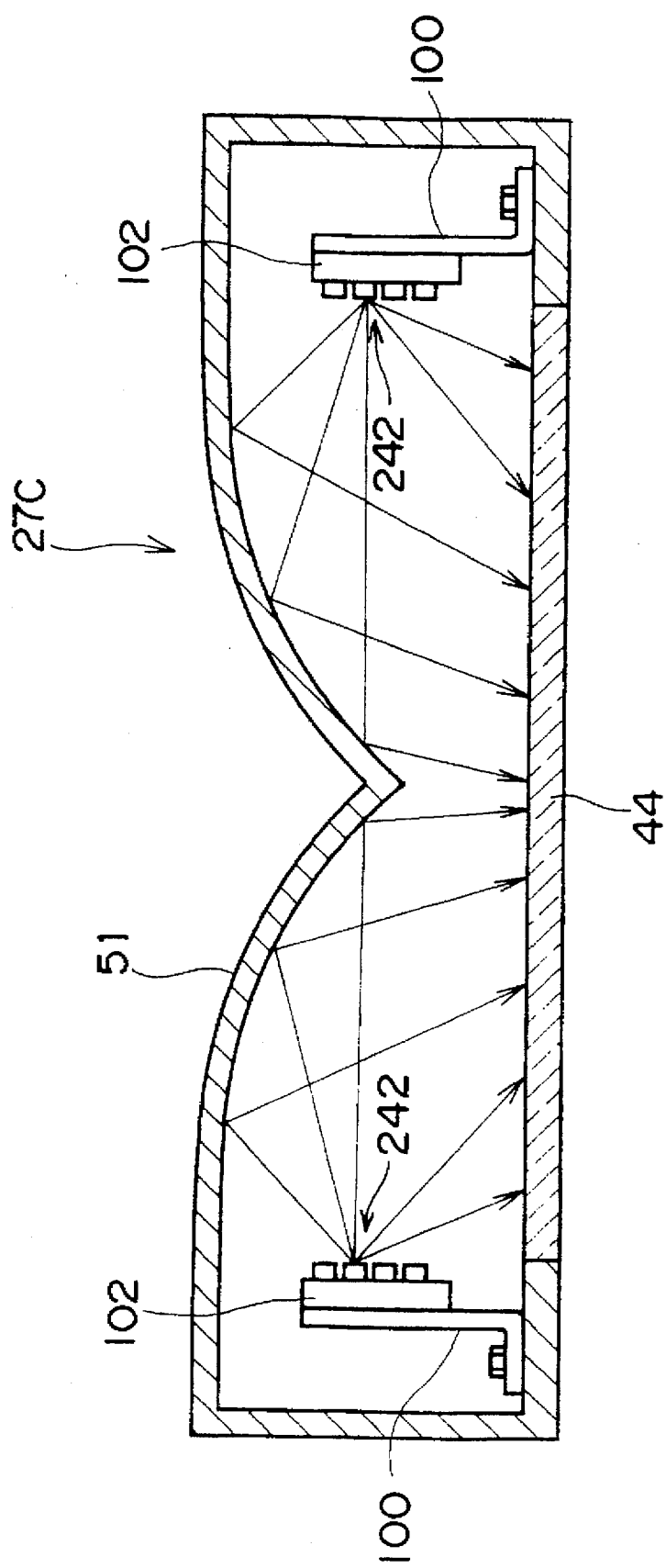
FIG. 15 is a vertical cross-sectional view illustrating an arrangement of still another example of the light source system.

FIG. 15 shows a vertical cross-sectional view of an arrangement of another light source system 27C. The light source system 27C is provided with a reflecting plate 51 constituting an optical waveguide. The reflecting plate 51 is formed in such a manner that its bottom is open, and both sides with its longitudinally intermediate portion are formed as parabolic curves. The LEDs 242 are attached to each longitudinal end of the reflecting plate 51 by means of the bracket 100 and the support member 102, respectively. As a result, the light from the LEDs 242 is emitted toward the interior of the reflecting plate 51, and is reflected by the inner peripheral reflecting surface of the reflecting plate 51 toward the reflecting plate 44 provided in the bottom opening. Further, in this case, since the reflecting plate 51 has the above-described shape, the light is reflected uniformly also at an area remote from the LEDs 242 (at a longitudinally intermediate area of the reflecting plate 51) as at an area in the vicinity of the LEDs 242. For this reason, the light emitted from the LEDs 242 and reflected from various longitudinal portions of the reflecting plate 51 is scattered as it is transmitted through the scattering plate 44. As a result, the light emitted from the LEDs 242 is radiated uniformly as a slit beam along the longitudinal direction of the scattering plate 44.

Figure 16:
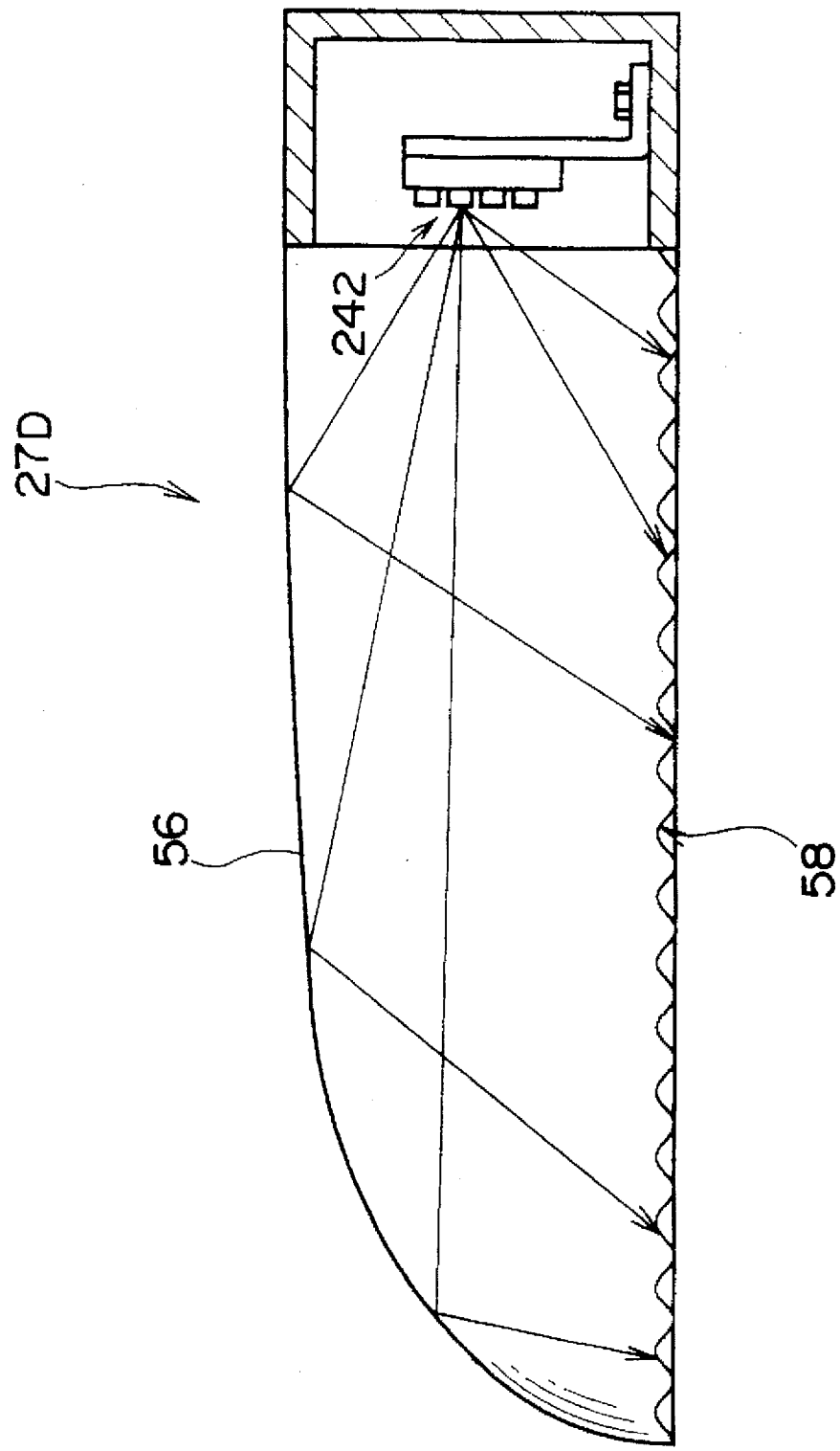
FIG. 16 is a vertical cross-sectional view illustrating an arrangement of a further example of the light source system.

FIG. 16 shows a vertical cross-sectional view of an arrangement of still another light source system 27D. The light source system 27D has a light guide 56 constituting an optical waveguide instead of the reflecting plate 31 of the light source system 27B or the reflecting plate 51 of the light source system 27C.

The light guide 56 has its inner peripheral surface whose vertical and horizontal cross sections are formed as parabolic curves, and is capable of transmitting light while refracting or reflecting the same. In addition, the light guide 56 has at its bottom a light emergent portion 58 whose inner surface is formed with a multiplicity of convex portions. This light emergent portion 58 is capable of transmitting the incident light while scattering the same. Accordingly, the light from the LEDs 242 is emitted toward the light guide 56, and the light reflected by the light guide 56 is applied toward the light emergent portion 58, and is scattered by being transmitted through the light emergent portion 58. Thus, the light is radiated uniformly as a slit beam along the longitudinal direction of the light emergent portion 58.

Figure 17:
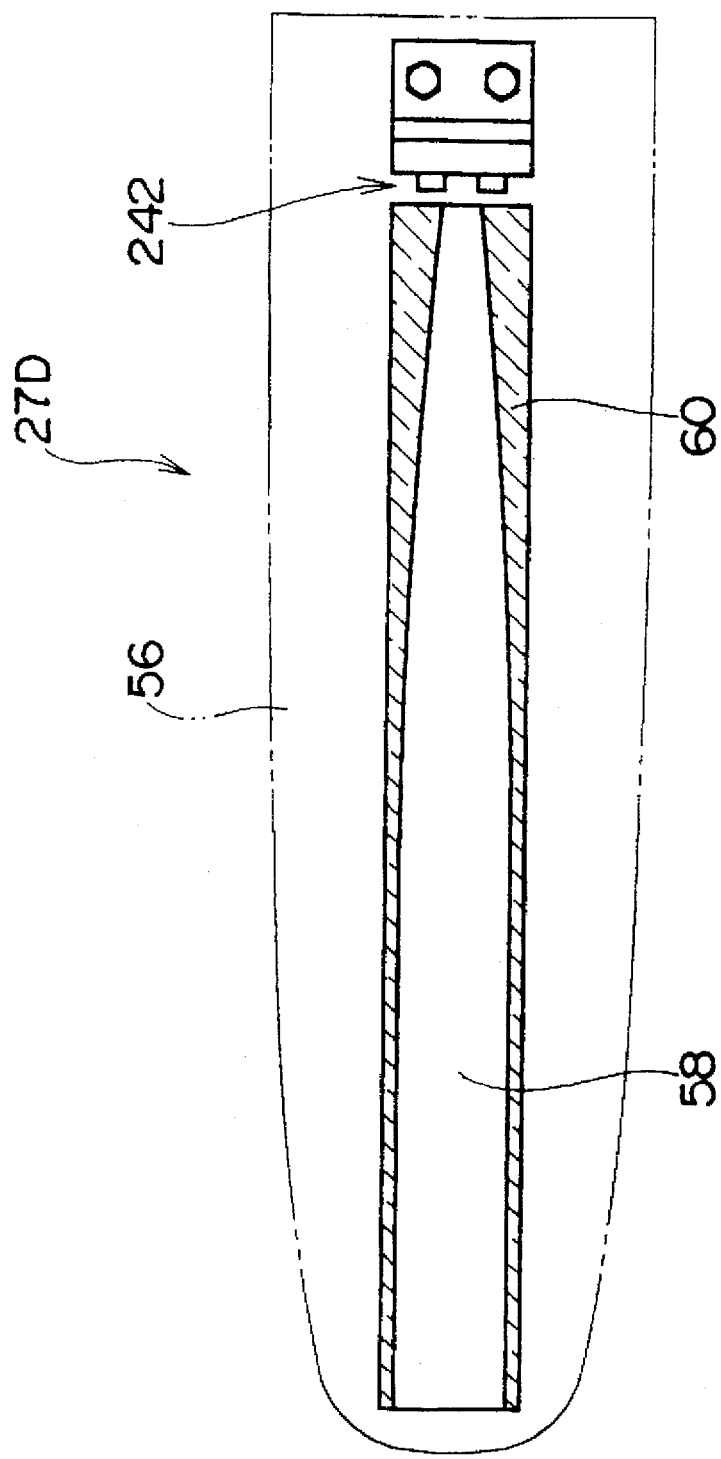
FIG. 17 is a horizontal cross-sectional view illustrating a modification of the light source system.

If there is irregularity in illuminance in the light emergent portion 58 of the light source system 27D, in order to correct the irregularity in illuminance, it is possible to provide the light emergent portion 58 with a correcting mask 60, as shown in FIG. 17. This arrangement makes it possible to further reduce the irregularity in illuminance of the emergent light.

Figure 18:
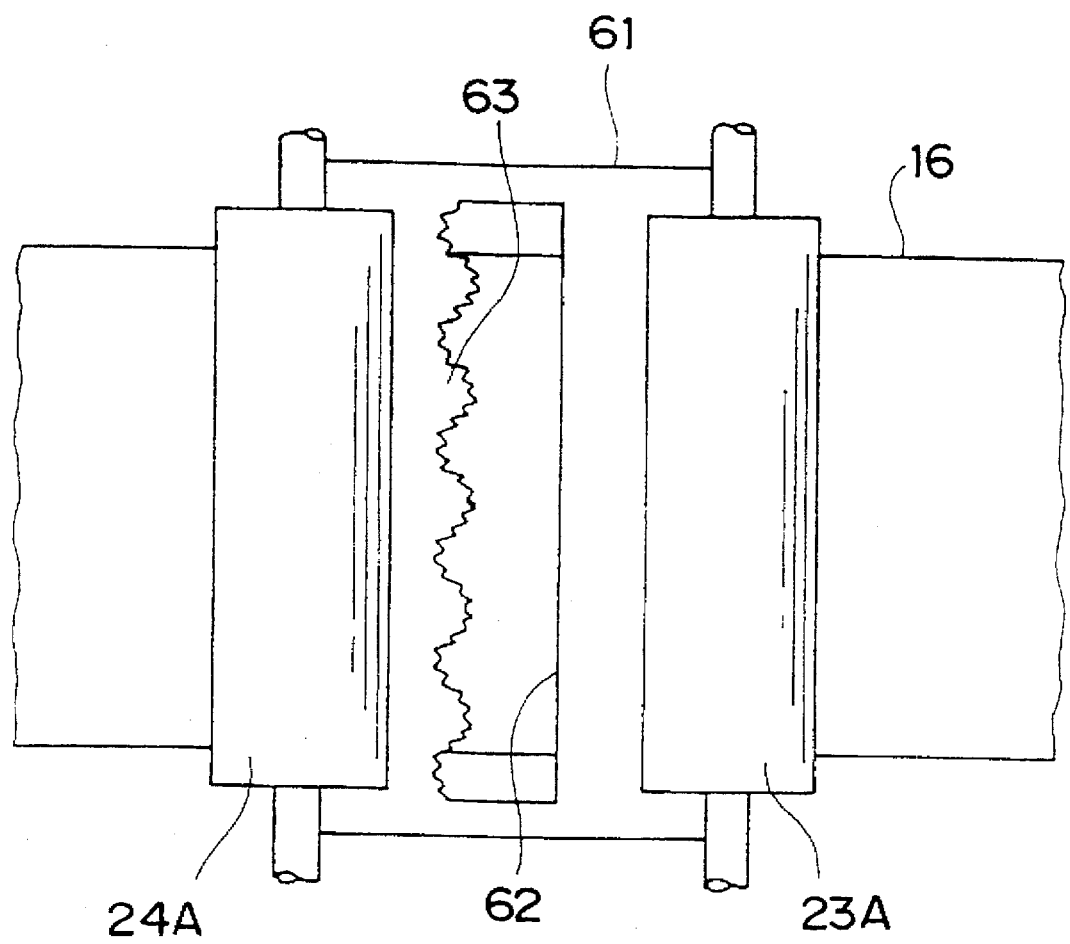
FIG. 18 is a plan view of an exposure correcting plate as viewed from the LED array side.
Figure 19A:
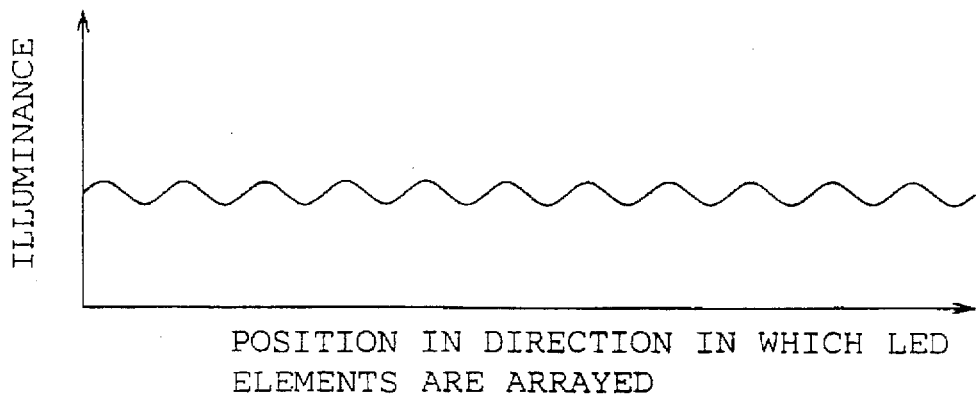
FIG. 19A is a diagram illustrating a state of irregularity in illuminance of the LED array.
Figure 19B:
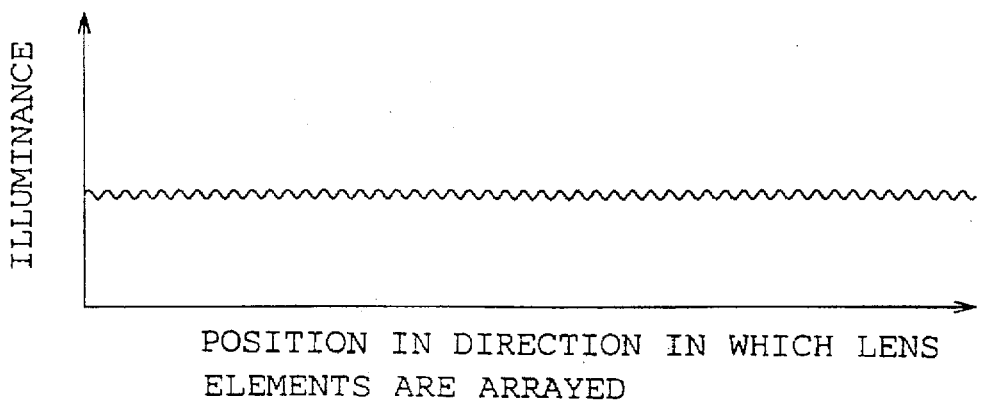
FIG. 19B is a diagram illustrating a state of irregularity in illuminance of a rod lend array.
Figure 19C:
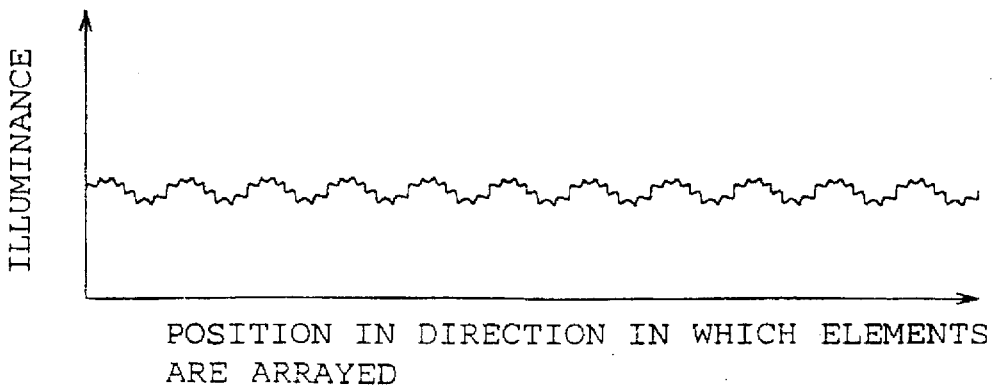
FIG. 19C is a diagram illustrating a state of irregularity of illuminance on a photosensitive material.
Figure 36:
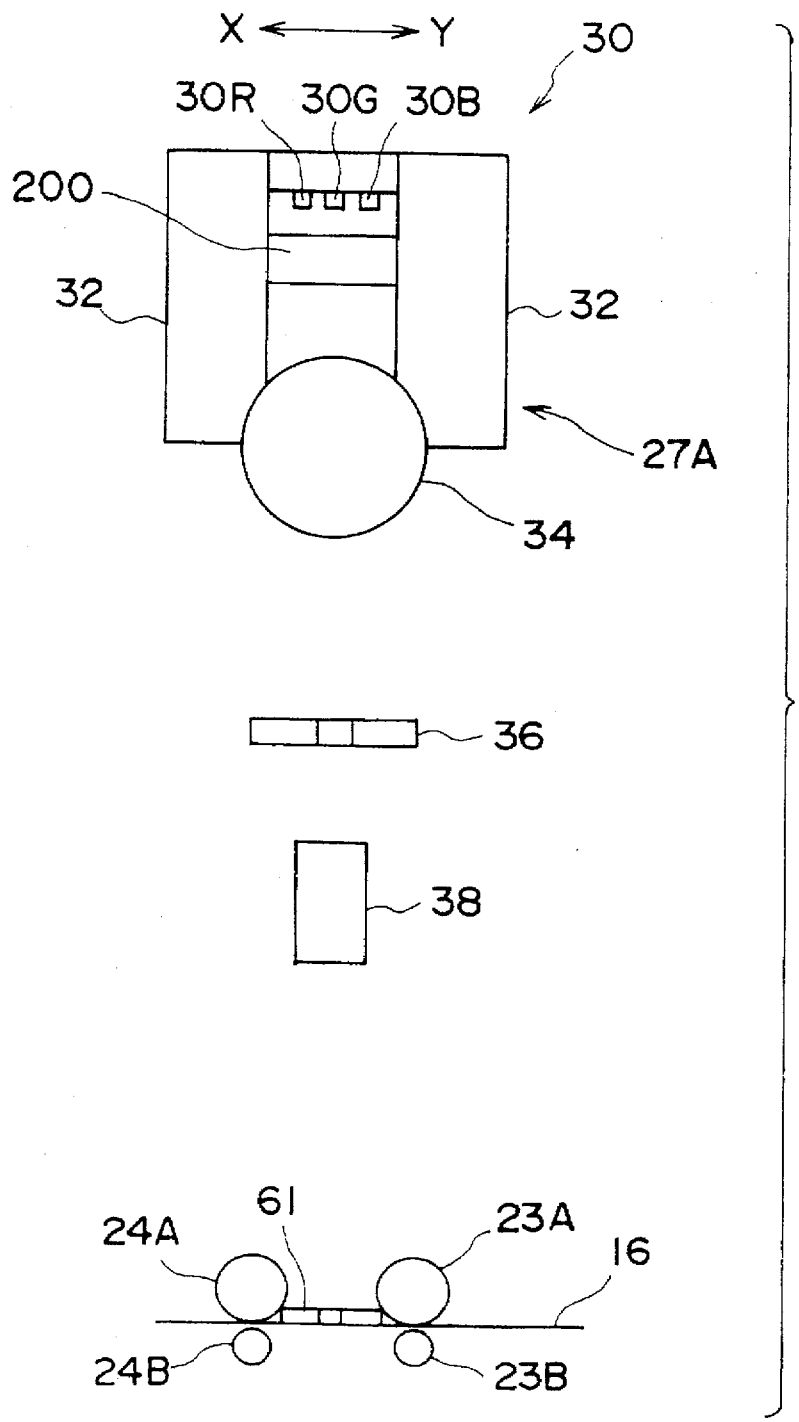
FIG. 36 is an overall schematic diagram of the exposure device in a case where the exposure correcting plate shown in FIGS. 18 and 21 is used.
Figure 37:
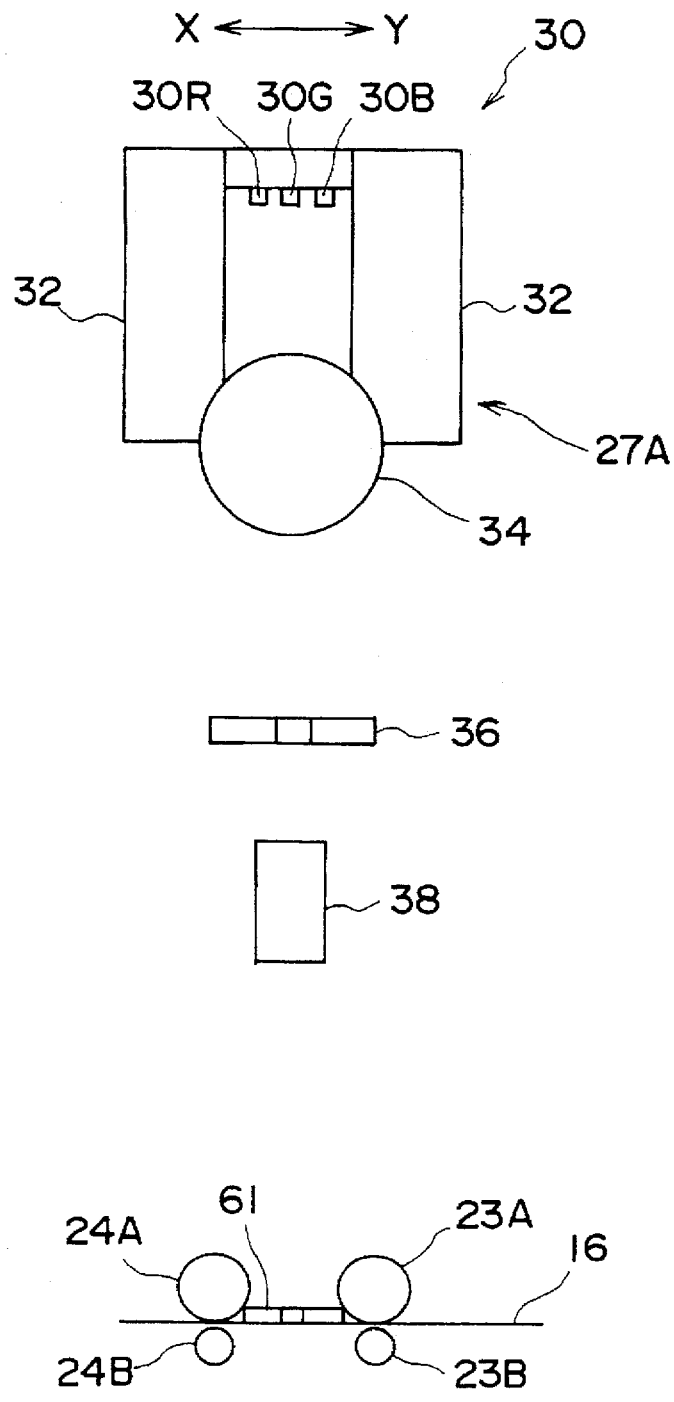
FIG. 37 is an overall schematic diagram of another embodiment of the exposure device in the case where the exposure correcting plate shown in FIGS. 18 and 21 is used.

Although, in the embodiment shown in FIG. 2, a light source system is used in which each group of light-emitting elements 30 is comprised of the LED 30R, the LED 30B, and the LED 30G that are juxtaposed in proximity to each other, the present invention is not limited to the same. For instance, it is possible to use a light source system comprising the LED array in which the LED 30R, the LED 30B, and the LED 30G are consecutively arranged as one unit and a multiplicity of LED units are arrayed (hence, the number of LEDs provided in the LED array is a multiple of 3), as well as a rod lens array 200 corresponding to the LED array (see FIG. 36). In this case, an exposure correcting plate 61 serving as an exposure adjusting member may be disposed between the SLA 38 and the photosensitive material 16 in the vicinity of the light-source side of the photosensitive material 16, as shown in FIG. 18. The exposure correcting plate 61 is provided with a slit-like aperture 62. On one side of the aperture 62, the exposure correcting plate 61 has a correcting portion 63 having a configuration (specifically, a waveform) corresponding to the pitches in which the LEDs of the LED array and lenses of the rod lens array are arrayed. That is, as shown in FIG. 19A, the LED array exhibits irregularity in illuminance (the quantity of light) in correspondence with the pitches in which the LEDs are arrayed, and, as shown in FIG. 19B, the rod lens array also exhibits irregularity in illuminance in correspondence with the pitches in which its lenses are arrayed. Accordingly, if the two irregularities are combined, the light applied to the photosensitive material 16 has irregularity, as shown in FIG. 19C. The configuration of the correcting portion 63 at the opening 62 is set in correspondence with the waveform of this combined irregularity. As a result, when the light reflected from an original due to the light from the LED array is applied to the photosensitive material 16 through the rod lens array, the light is transmitted through the aperture 62 of the exposure correcting plate 61, thereby making it possible to make the amount of exposure of the photosensitive material 16 uniform. Incidentally, the exposure correcting plate 61 serving as an exposure adjusting member may also be used for a light source system which is not provided with the rod lens array 200 (see FIG. 37).

Figure 20A:
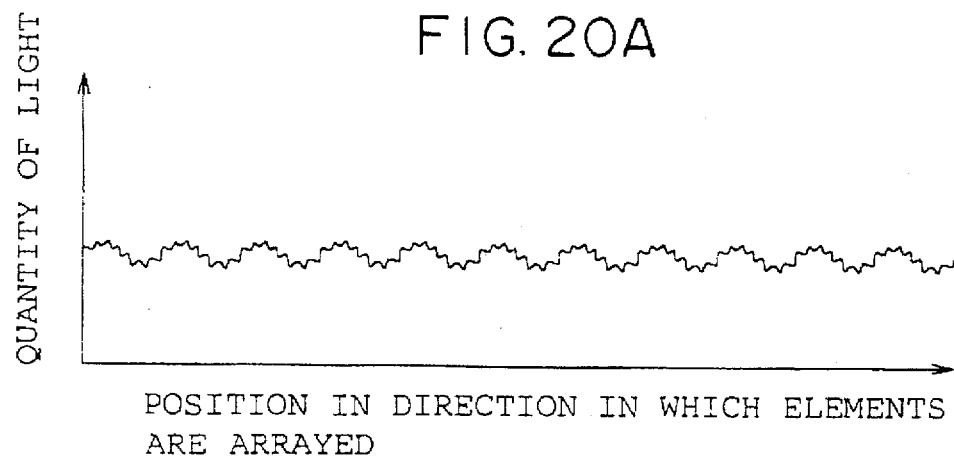
FIG. 20A is a diagram illustrating a state of irregularity in illuminance of the LED array and the rod lens array.
Figure 20B:
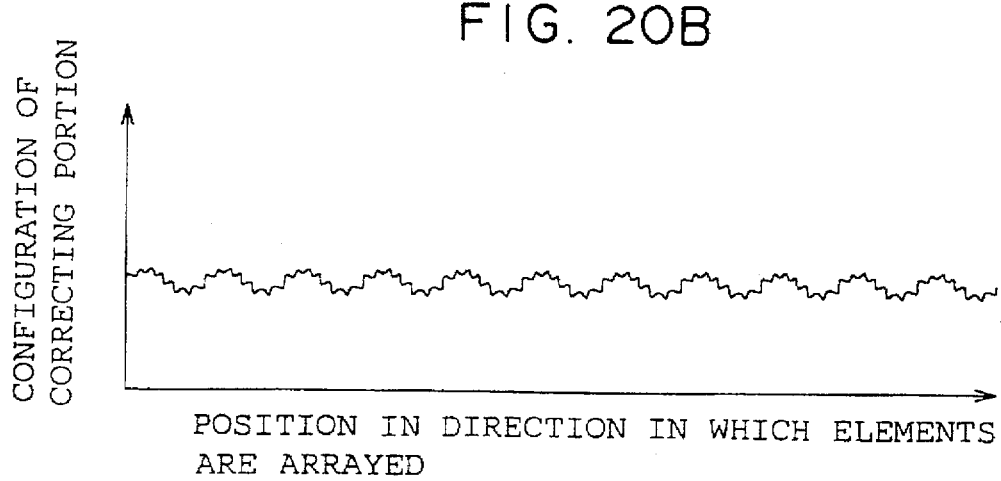
FIG. 20B is a diagram illustrating a diagram illustrating a configuration of a correcting portion.
Figure 20C:
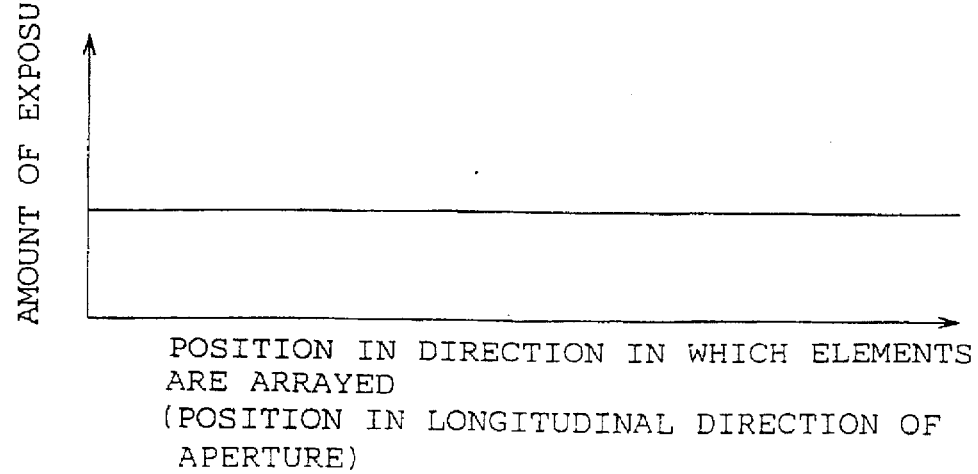
FIG. 20C is a diagram illustrating an amount of exposure on the photosensitive material.

When the photosensitive material 16 is irradiated, the light passes through the aperture 62 of the exposure correcting plate 61. Here, the light which has passed through the rod lens array after being emitted from the LED array has irregularity in the quantity of light in the direction in which the elements are arrayed, as shown in FIG. 20A. However, since the correcting portion 63, which has a waveform corresponding to the irregularity in illuminance due to the pitches by which the lenses of the LEDs of the LED array and the lenses of the rod lens array are arrayed, as shown in FIG. 20B, is formed on one side of the aperture 62 of the exposure correcting plate 61, the irregularity in illuminance is corrected as the light passes through the aperture 62 of the exposure correcting plate 61. Hence, the amount of exposure of the photosensitive material 16 is made uniform without the occurrence of irregularity, as shown in FIG. 20C.

In other words, since the correcting portion 63 is formed on one side of the aperture 62, integral values over time of the illuminance of the light applied to the photosensitive surface of the photosensitive material 16 by scanning become uniform over the respective longitudinal portions of the aperture 62. Hence, the amount of exposure of the photosensitive material 16 is made uniform without the occurrence of irregularity.

As described above, even if irregularity in illuminance occurs for the pitches in which the elements of the LED array and the rod lens array are arrayed in the light source system, since the exposure correcting plate 61, which has the aperture 62 where the correcting portion 63 having the waveform corresponding to the irregularity in illuminance due to the pitches of array of the elements is formed, is provided in the optical path, the amount of exposure of the photosensitive material 16 exposed through the aperture 62 in the exposure correcting plate 61 becomes uniform without the occurrence of irregularity. Hence, it is possible to obtain an image of high image quality which is free of irregularities in the image.

Figure 21:
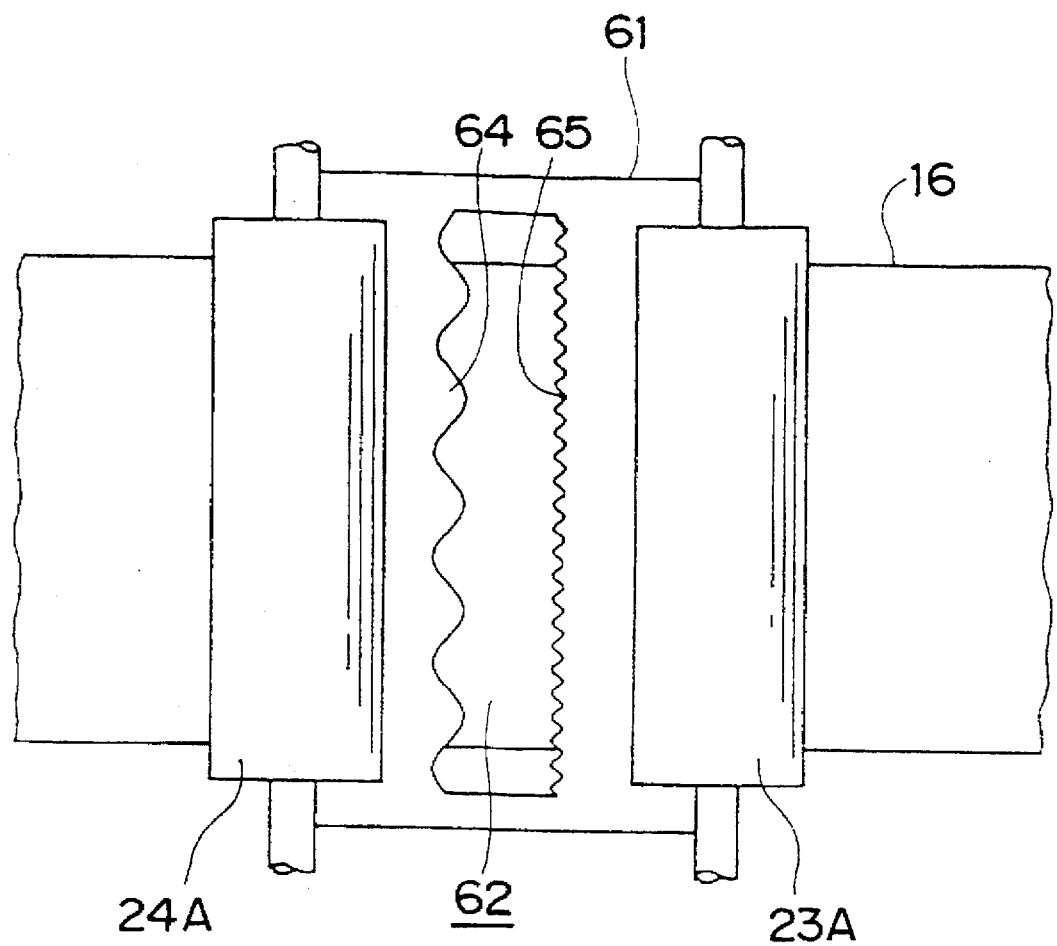
FIG. 21 is a plan view corresponding to FIG. 18 and illustrates another example of the exposure correcting plate.

Although the correcting portion 63 provided on one side the aperture 62 of the exposure correcting plate 61 is arranged such that its configuration is set in correspondence with the waveform of irregularity in illuminance, which combines the irregularity in illuminance (the quantity of light) due to the pitches of array of the LEDs of the LED array and the irregularity in illuminance due to the pitches of array of the lenses of the rod lens array, the present invention is not limited the same. For example, an arrangement may alternatively be provided such that a correcting portion corresponding to the irregularity in illuminance due to the pitches of array of the LEDs of the LED array and a correcting portion corresponding to the irregularity in illuminance due to the pitches of the array of the lenses of the rod lens array are provided separately. That is, as shown in FIG. 21, an arrangement may be provided such that provided on the respective sides of the aperture 62 of the exposure correcting plate 61 are a correcting portion 64 corresponding to the irregularity in illuminance due to the pitches of array of the LEDs of the LED array as well as a correcting portion 65 corresponding to the irregularity in illuminance due to the pitches of array of the lenses of the rod lens array. In this case as well, the aforementioned irregularity in illuminance is corrected, and the amount of exposure of the photosensitive material 16 exposed through the aperture 62 of the exposure correcting plate 61 becomes uniform without the occurrence of irregularity. Hence, it is possible to obtain an image of high image quality which is free of irregularities in the image.

In the above-described embodiment, a description has been given of a first controlling method using the control circuit 50 for controlling only the opening and closing of the liquid-crystal cells; however, the controlling method for ensuing that the amount of exposure of the portions of the photosensitive material 16 corresponding to pixels to the slit beam transmitted through the liquid-crystal cells becomes substantially equal to the amount of exposure of corresponding pixels of the color image data is not limited to the same. For example, it is possible to employ various other controlling methods shown in FIGS. 22 to 25.

Figure 22:
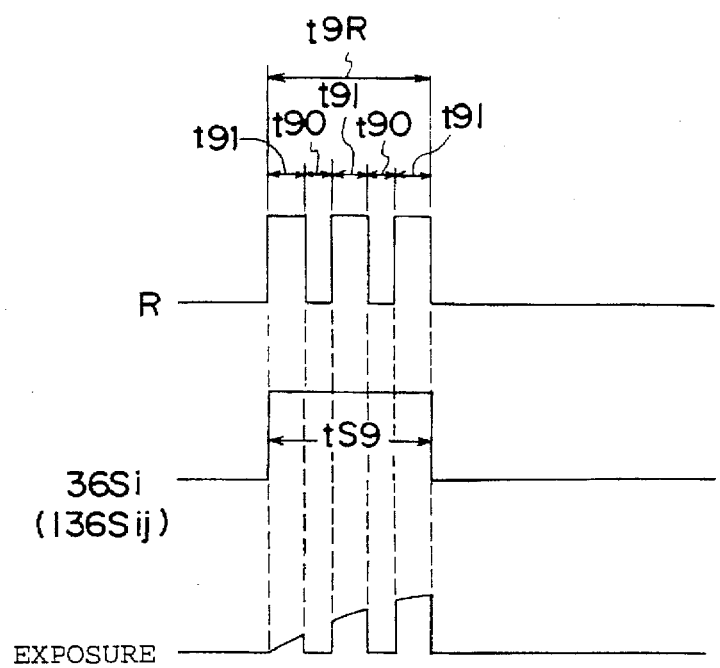
FIG. 22 is a timing chart illustrating a second controlling method using the control circuit of the control system of the exposure device.

FIG. 22 shows a timing chart illustrating a second controlling method for controlling a liquid-crystal cell and the LED 30R by citing the LED 30R by way of example. It should be noted that although the LED 30G and the LED 30B are also controlled in a similar manner, their controlling method is not restricted to the second controlling method, and it is possible to adopt the above-described first controlling method or any one of third to fifth controlling methods which will be described later. As shown in FIG. 22, in the second controlling method, a period t9R for controlling the LED 30R and a period tS9 for opening the liquid-crystal cell are made to coincide with each other, and the LED 30R is made to emit pulses of light.

Namely, in the second controlling method, the time interval of the pulsed voltage is set to t90, pulses with a predetermined time duration t91 are continually applied to the LED 30R, so as to digitally control the quantity of the emitted R light. During the period tS9 which coincides with the period t9R of continual application of the pulsed voltage, the liquid-crystal cell 36Si is driven in such a manner as to be opened by applying the pulsed voltage thereto.

Thus, since the quantity of light emitted from the LEDs is reduced and the period of opening of the liquid-crystal cells is controlled, the amount of exposure of the portions of the photosensitive material 16 corresponding to the pixels can be made equal to the amount of exposure of the corresponding pixels of the color image data with high accuracy.

Figure 23:
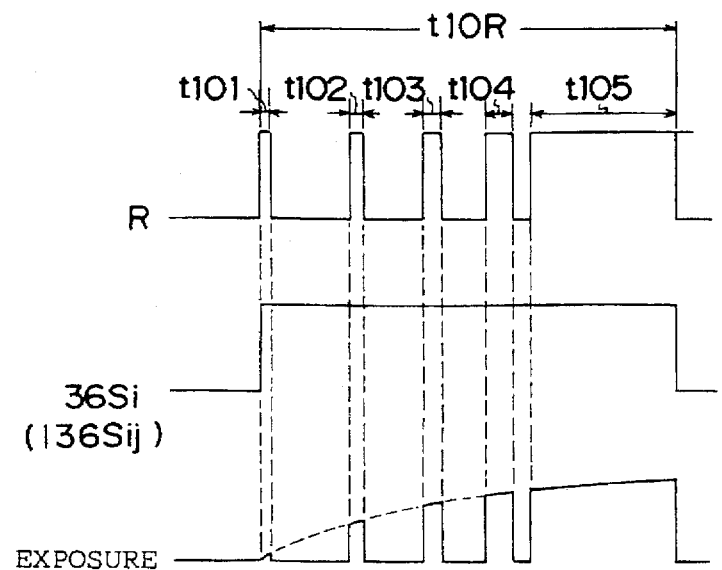
FIG. 23 is a timing chart illustrating a third controlling method using the control circuit of the control system of the exposure device.

FIG. 23 shows a timing chart illustrating a third controlling method for controlling a liquid-crystal cell and the LED 30R by citing the LED 30R by way of example. It should be noted that although the LED 30G and the LED 30B are also controlled in a similar manner, their controlling method is not restricted to the third controlling method, and it is possible to adopt the above-described first or second controlling method, or the fourth or fifth controlling method which will be described later. As shown in FIG. 23, in the third controlling method, a period t10R for controlling the LED 30R and a period for opening the liquid-crystal cell are made to coincide with each other, and the time duration of application of the pulsed voltage to the LED 30R is made variable. That is, during the period t10R for controlling the LED 30R, the liquid-crystal cell 36i is opened, and the time duration of application of the pulsed voltage to the LED 30R is made variable as t101, t102, t103, t104, and t105.

Thus, since the quantity of light emitted from the LED 30R is reduced by varying the time duration of application of the pulsed voltage to the LED 30R, and the period of controlling the LED 30R and the period of opening the liquid-crystal cell are made to coincide with each other, the amount of exposure of the portions of the photosensitive material 16 corresponding to the pixels can be made equal to the amount of exposure of the corresponding pixels of the color image data with high accuracy.

Figure 24:
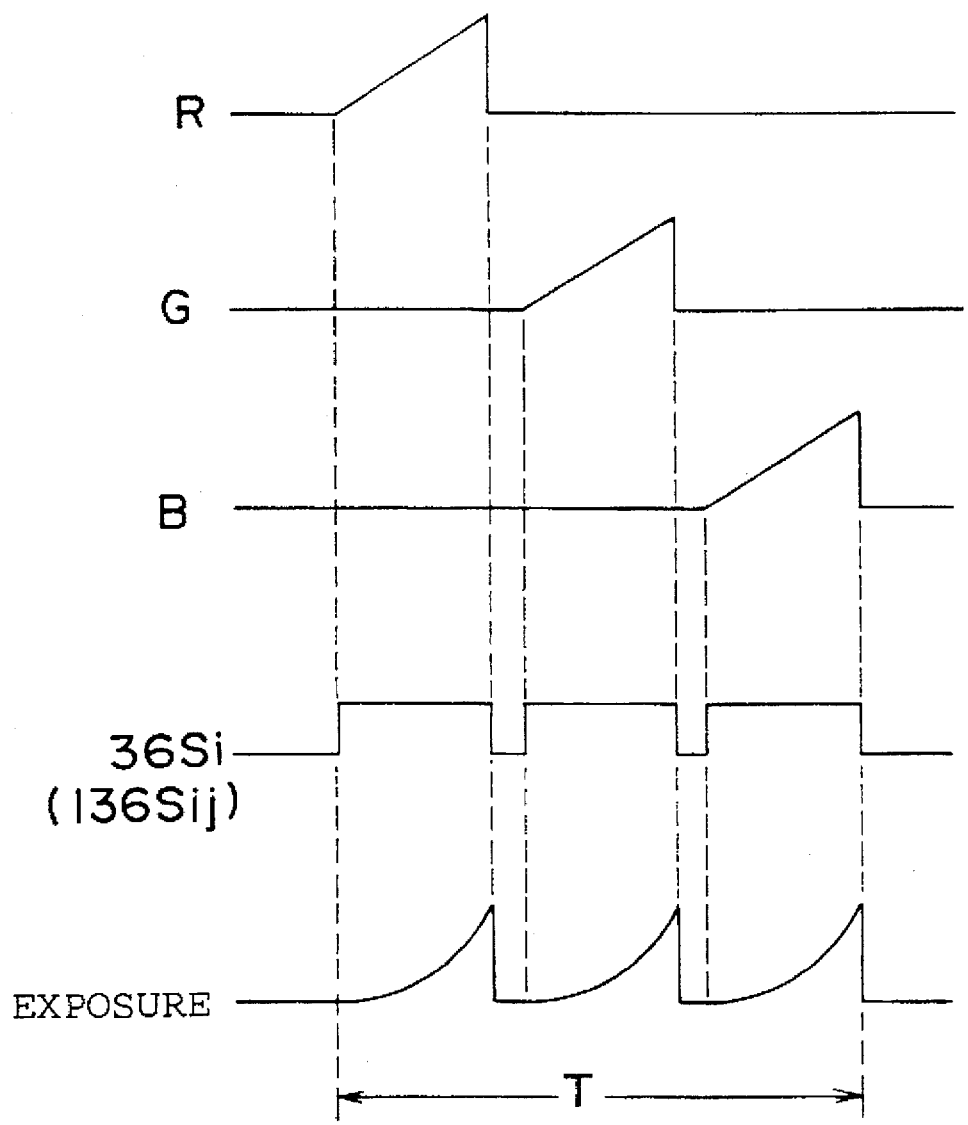
FIG. 24 is a timing chart illustrating a fourth controlling method using the control circuit of the control system of the exposure device.

FIG. 24 shows a timing chart illustrating a fourth controlling method for controlling the liquid-crystal cells and the LEDs 30R, 30G, and 30B. As shown in FIG. 24, in the fourth controlling method, instead of digitally controlling the quantity of light emitted by applying a pulsed voltage to the LEDs, the quantity of light emitted by the LEDs is gradually increased in an analog manner by gradually increasing the voltage to be applied, and the period of opening the liquid-crystal cell 36Si is made to coincide with the period of controlling the LEDs. This arrangement makes it possible to simplify the control of the liquid-crystal cell.

Figure 25:
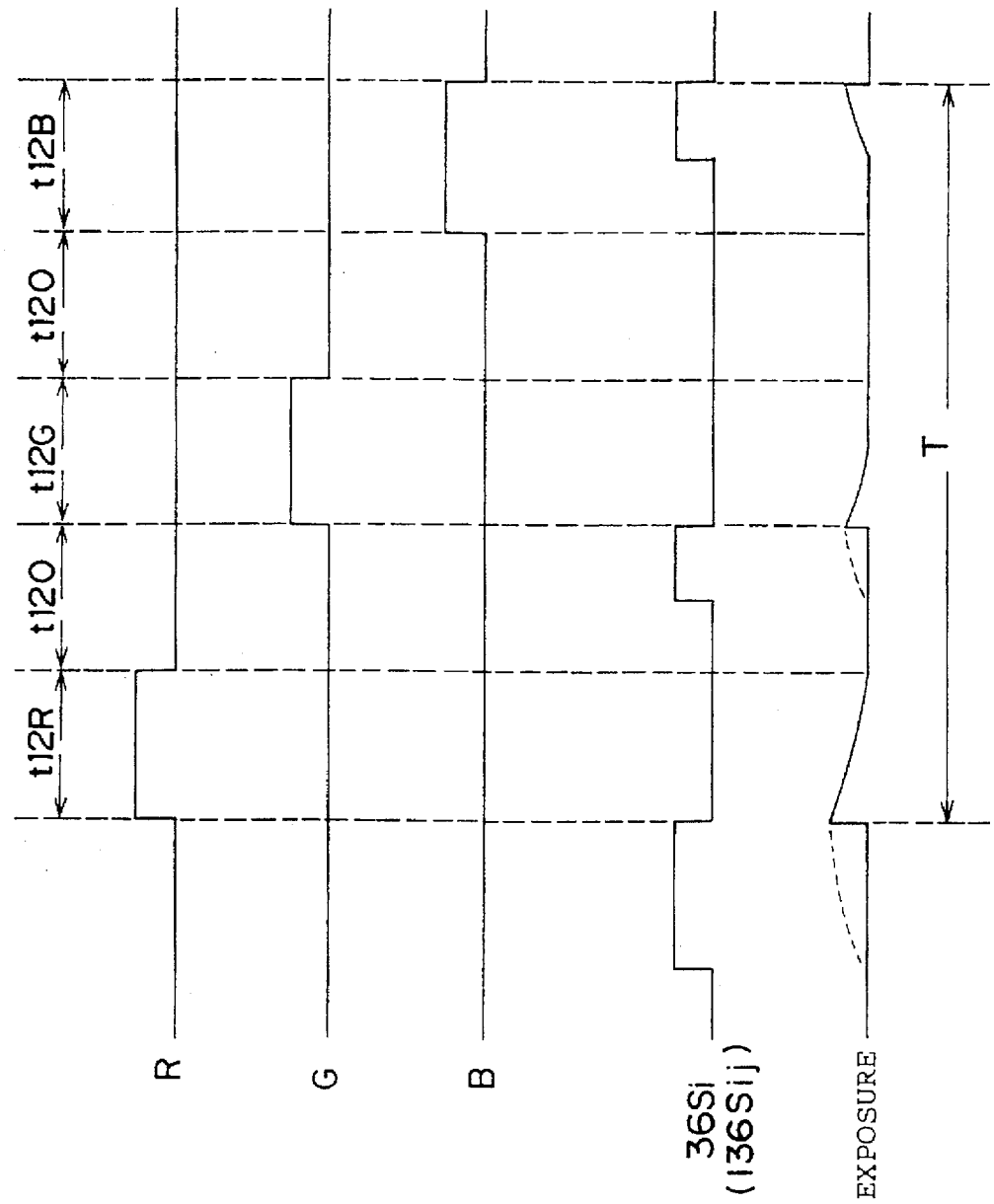
FIG. 25 is a timing chart illustrating a fifth controlling method using the control circuit of the control system of the exposure device.

FIG. 25 shows a timing chart illustrating a fifth controlling method for controlling the liquid-crystal cells and the LEDs 30R, 30G, and 30B. As shown in FIG. 25, the fifth controlling method mainly makes use of the phenomenon of transition of the liquid-crystal cells. That is, when a pulsed voltage starts to be applied to the LED 30R, the time duration of applying the pulsed voltage to the liquid-crystal cell 36Si ends. As a result, by making use of only the phenomenon of transition in which the liquid-crystal cell 36Si is closed when the application of the pulsed voltage is stopped, the quantity of the R light transmitted through the liquid-crystal cell 36Si is reduced. The LED 30G is also controlled in a similar manner. Incidentally, since the opening of the liquid-crystal cell 36Si also changes in correspondence with the time duration of the pulsed voltage applied to the liquid-crystal cell 36Si, by changing the time duration of application of the pulsed voltage to the LED 30R and the LED 30G, it is possible to vary the amount of the R light and the G light transmitted through the liquid-crystal cell 36Si. Further, the pulsed voltage is applied to the liquid-crystal cell 36Si after the lapse of a fixed time from the time of application of the pulsed voltage to the LED 30B, and the application of the pulsed voltage to the liquid-crystal cell 36Si is completed when the time duration of application of the pulsed voltage to the LED 30B ends. As a result, the amount of the B light transmitted is gradually increased by making use of only the phenomenon of transition in which the liquid-crystal cell 36Si is gradually opened.

Thus, since only the phenomenon of transition of the liquid-crystal cells is made use of, it suffices to calculate only the relationship between the opening at the time of the occurrence of the phenomenon of transition of the liquid-crystal cells and the quantity of light emitted from the LEDs, so that it is possible to simplify the control of the liquid-crystal cells.

Figure 26A:
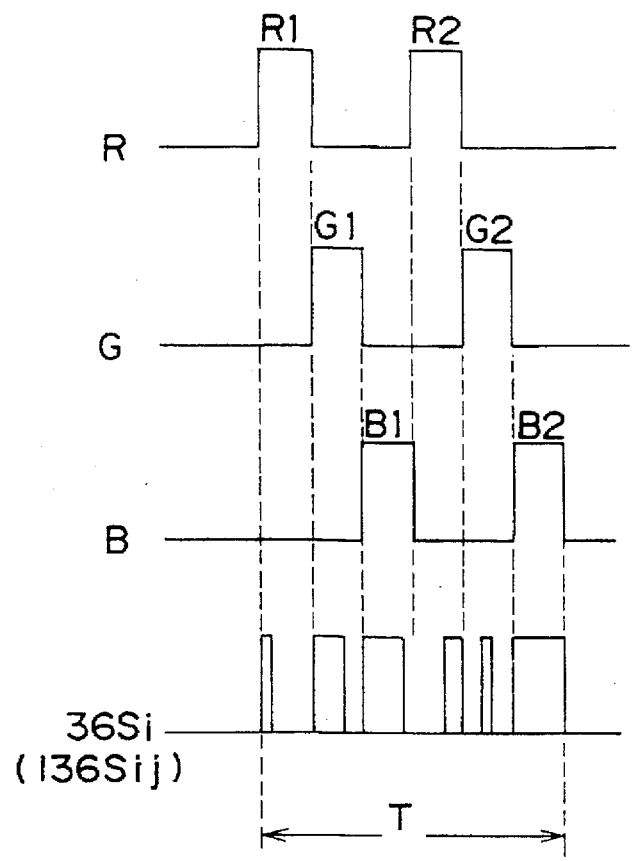
FIG. 26A is a diagram illustrating a timing chart of the LEDs, liquid-crystal cells, and a pulse signal to a motor when the photosensitive material is continuously transported.
Figure 26B:
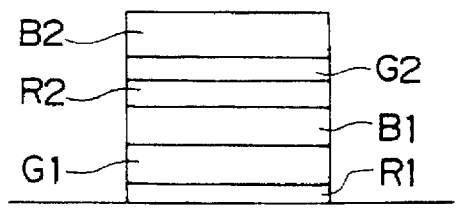
FIG. 26B is a diagram illustrating the mean value of the amount of exposure.
Figure 27:
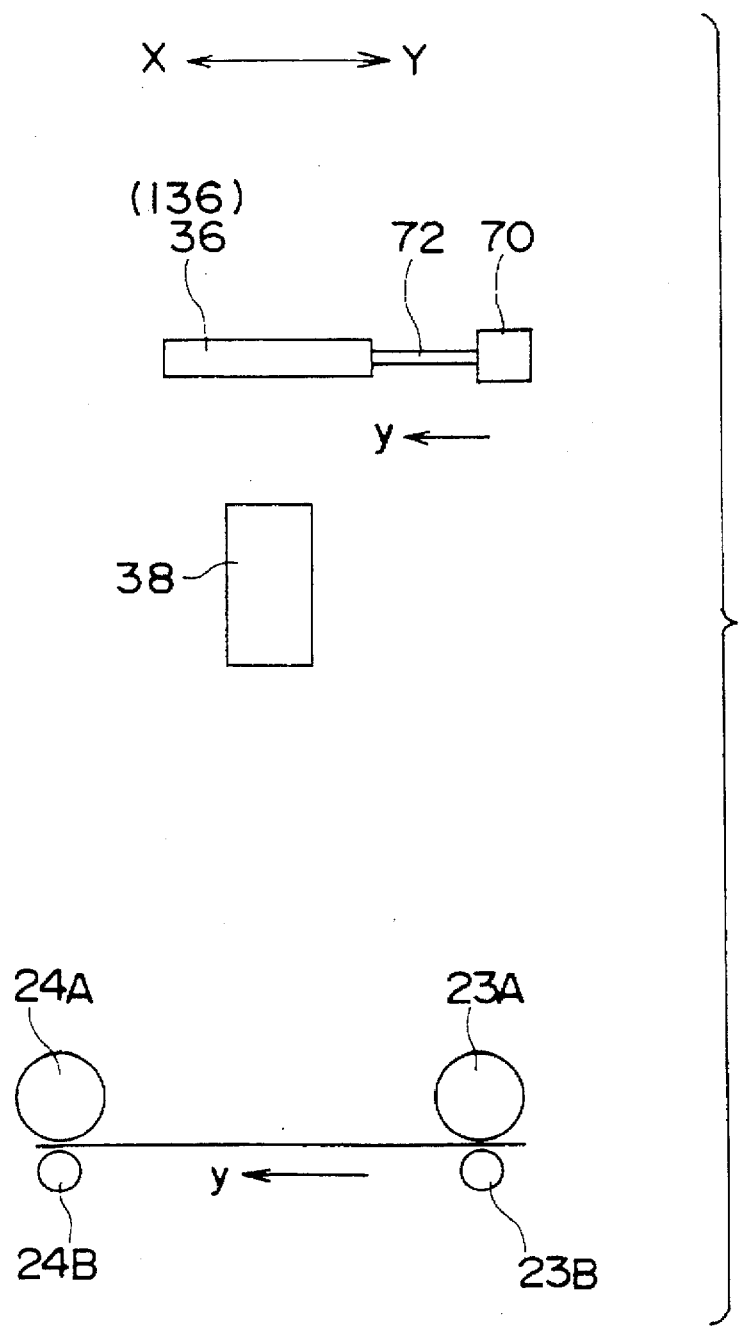
FIG. 27 is a diagram illustrating a device for moving an optical shutter array for continuously transporting the photosensitive material.
Figure 28:
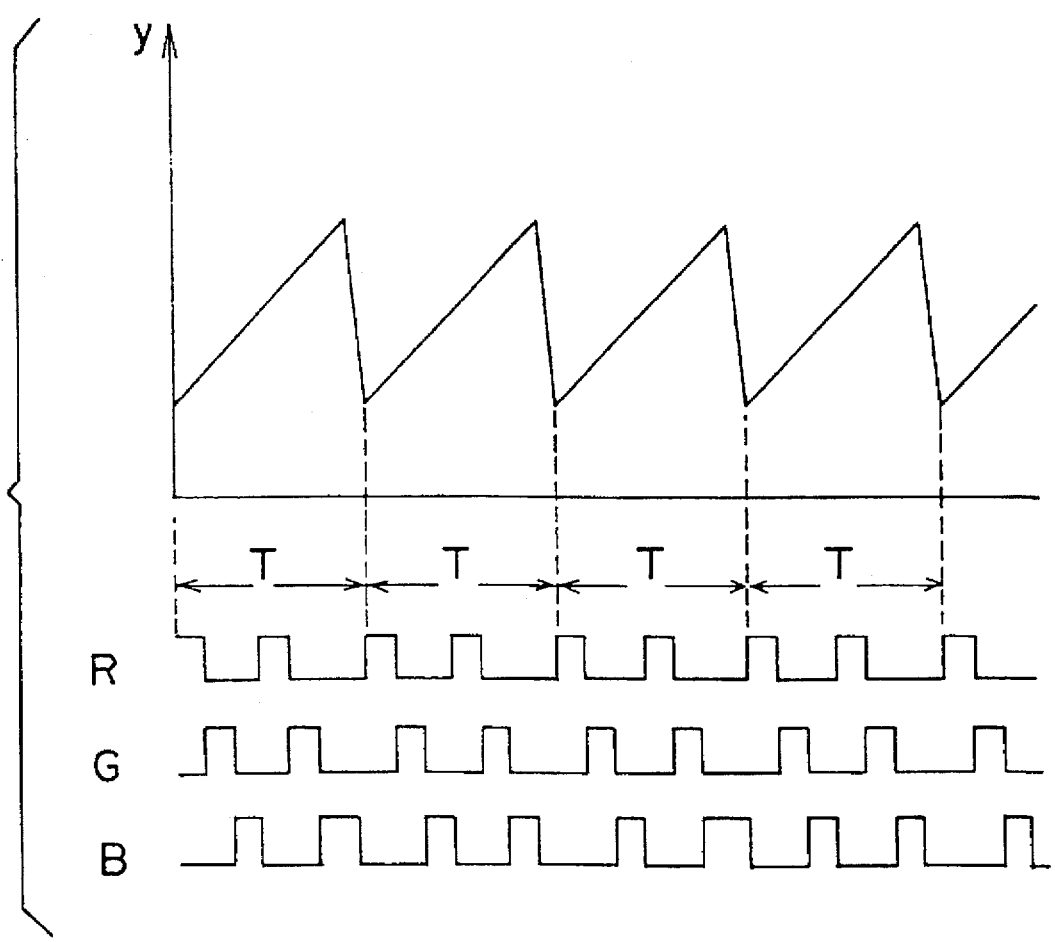
FIG. 28 is a timing chart of the pulse signal to the LEDs for continuously transporting the photosensitive material and a diagram illustrating a change over time of the position of the optical shutter array.

In the above-described various embodiments, a description has been given of an example in which after one line on the photosensitive material 16 has been exposed, the photosensitive material 16 is transported intermittently by one line, and an ensuing line is exposed. However, the present invention is not limited to the same, and the photosensitive material 16 may be transported continuously. In this case, the photosensitive material 16 is irradiated with the R light not once but a plurality of times (e.g., two times, three times, four times, five times, . . . ), and in this embodiment it is irradiated two times for each light, as shown in FIG. 26A. Consequently, as shown in FIG. 26B, the pixels constituting one line on the photosensitive material 16 are subjected to multiple exposure with the quantity of the R light, the G light, and the B light applied thereto twice, respectively. In this case, if the photosensitive material 16 is transported continuously, there are cases where an exposed line on the photosensitive material 16 deviates from a line corresponding to one line of the color image data, thereby making it impossible to form a proper image. Therefore, as shown in FIG. 27, the liquid-crystal optical shutter array 36 is moved by a piezoelectric element 70 serving as a slit-beam moving member via a bar 72. The liquid-crystal optical shutter array 36 is moved by the piezoelectric element 70 in substantially the same direction as the direction (the y-direction in FIG. 28) in which the photosensitive material 16 is transported continuously and at the substantially the same speed as the transporting speed, as shown in FIG. 28. This movement is repeated for each line on the photosensitive material 16 to be exposed. That is, the movement of the liquid-crystal optical shutter array 36 is started when the exposure of one line on the photosensitive material 16 is started, and when the exposure of that line is completed, the liquid-crystal optical shutter array 36 is returned to its initial position. Then, when the exposure of an ensuing line is started again, the movement of the liquid-crystal optical shutter array 36 is started. Consequently, the slit beam transmitted through the liquid-crystal optical shutter array 36 can be applied to the photosensitive material 16 in such a manner as to be substantially aligned with the exposure line on the photosensitive material 16 corresponding to one line of the color image data.

Thus, as the slit beam is moved for each line of the photosensitive material in substantially the same direction as the direction of continuously transporting the photosensitive material and at substantially the same speed as the transporting direction, the exposed line on the photosensitive material 16 by the slit beam can be substantially aligned with the line corresponding to one line of the color image data. Incidentally, although the liquid-crystal optical shutter array 36 is moved by using the piezoelectric element 70 so as to allow the exposed line on the photosensitive material 16 by the slit beam to be constantly aligned with the line corresponding to one line of the color image data, the present invention is not limited to the same, and the liquid-crystal optical shutter array 36 may be moved by using an eccentric cam. Further, although only the liquid-crystal optical shutter array 36 is moved by the piezoelectric element 70, the present invention is not limited to the same, and an arrangement may be provided to move the entire assembly of the light source system 27A or 27B, the liquid-crystal optical shutter array 36, and the SLA 38.

In the above-described embodiment. an optical shutter array in which liquid-crystal cells are arrayed as the optical shutter elements is used, the present invention is not limited to the same. For example, it is possible to use an optical shutter array which is comprised of a polarizer, an analyzer whose plane of polarization is arranged at an angle of 90 ° with respect to the plane of polarization of the polarizer, and a plumbum-lanthanum-zirconium-titanium oxide (PLZT) substrate disposed between the polarizer and the analyzer. A plurality of electrodes are arrayed at equal intervals on the PLZT substrate. The electrodes can be formed of an Au—Cr alloy or $In_2O_3$, and are electrically connected to the control circuit 50 so as to allow a voltage to be applied to the respective electrodes independently. When a light beam is made incident from the polarizer side, the light beam is linearly polarized by being transmitted through the polarizer, and is then made incident upon the PLZT substrate. At this time, if a voltage is applied across adjacent electrodes on the PLZT substrate, the light beam undergoes a change in phase proportional to the square of the electric field, is transmitted between the adjacent electrodes on the PLZT substrate, and is converted into elliptical polarized light. This elliptical polarized light is made incident upon the analyzer, and only a component which coincides with the plane of polarization of the analyzer is transmitted through the analyzer. As a result, intervals between the adjacent electrodes act as optical shutter elements, and although the optical shutter elements to which the electric field is not applied remain closed, the optical shutter elements to which the electric field is applied allow a linear light beam to be transmitted therethrough.

Thus, since the intervals between adjacent electrodes on the PLZT substrate where a plurality of electrodes are arrayed at equal intervals act as the optical shutter elements, the intervals between adjacent electrodes, as a whole, demonstrate action similar to that of the above-described liquid-crystal optical shutter array on which a plurality of liquid-crystal cells are arrayed, thereby making it possible to achieve the above-described advantages.

Although, in the above-described embodiment, the photosensitive material is transported, the present invention is not limited to the same, it is possible to move the light source system, the liquid-crystal optical shutter array, and the like with respect to the photosensitive material, or it is possible to move the photosensitive material, the liquid-crystal optical shutter array, and the like. Such arrangements also make it possible to obtain the above-described advantages.

Next, a description will be given of a light source system 127A in accordance with a further embodiment of the exposure device 25. It should be noted that those members that are similar to those of the first embodiment will be denoted by the same reference numerals, and a description thereof will be omitted.

Figure 29:
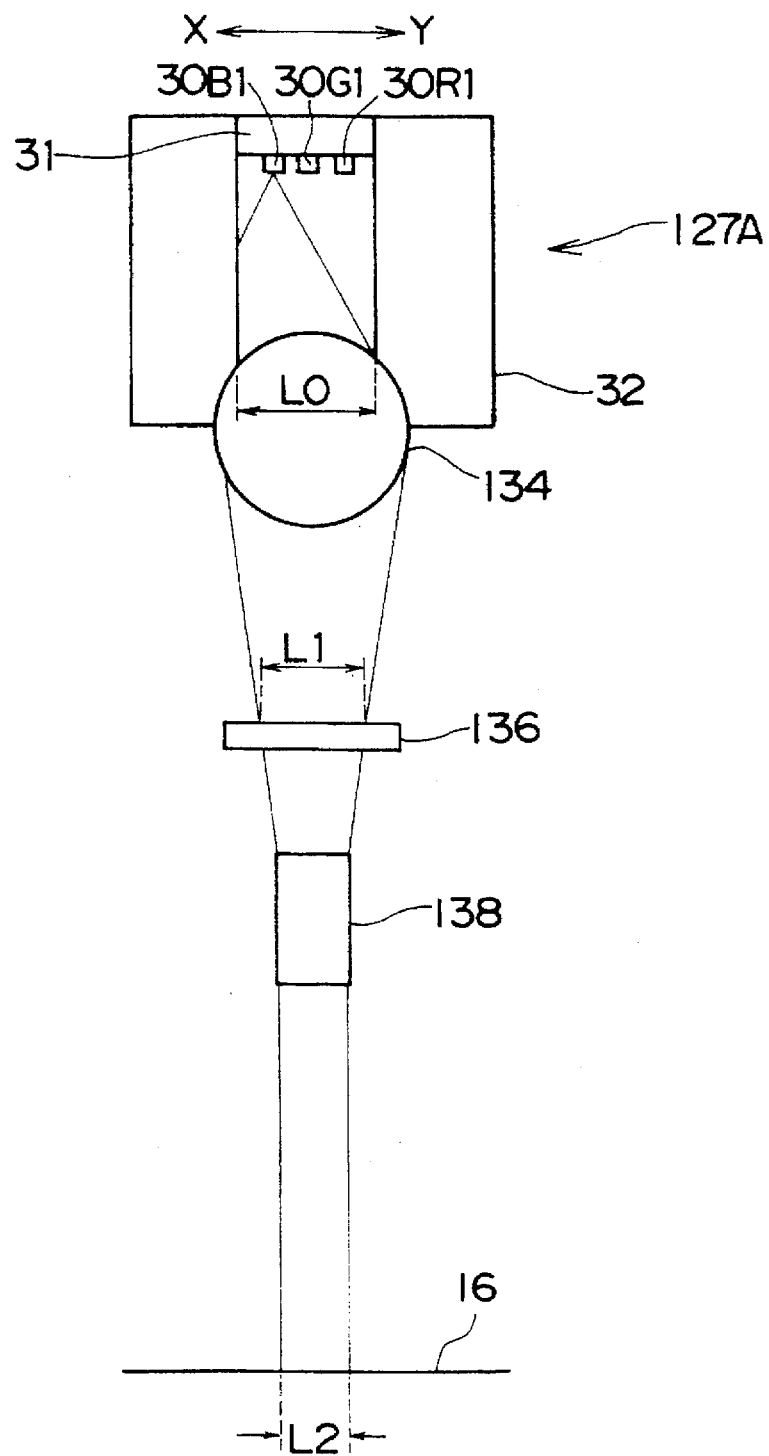
FIG. 29 is an overall schematic diagram of a further embodiment of the exposure device.

As shown in FIG. 29, a cylindrical lens 134 is attached to a lower end of the hollow portion formed between the pair of members 32. The cylindrical lens 134 has its axial direction arranged substantially parallel to the longitudinal direction of the support member 31 (i.e., the direction of one line on the photosensitive material 16), and causes each light emitted from the LEDs 30R, LEDs 30G, and LEDs 30B to be formed into a slit beam whose cross-sectionally longitudinal direction is substantially coincides with a direction corresponding to the direction of one line on the photosensitive material 16, and which has a predetermined width L1 in a direction substantially perpendicular to the direction corresponding to the direction of one line on the photosensitive material 16.

Here, in a case where the light is emitted by the ordinary LED array 300 arranged by arraying LEDs merely in a linear direction, as shown in FIG. 38, irregularity occurs in illuminance (the quantity of light) in correspondence with the pitch of array of the LEDs, and irregularity also occurs in color in correspondence with the pitch of array of the LEDs, as shown in FIGS. 39A and 39B. In contrast, in the light source system 127A, since the LEDs for the B, G, and R light in each group of light-emitting elements 30 are disposed in close proximity to each other, and emit the respective colors with substantially the same phase, so that irregularity in color does not occur, as shown in FIG. 4B.

Figure 30:
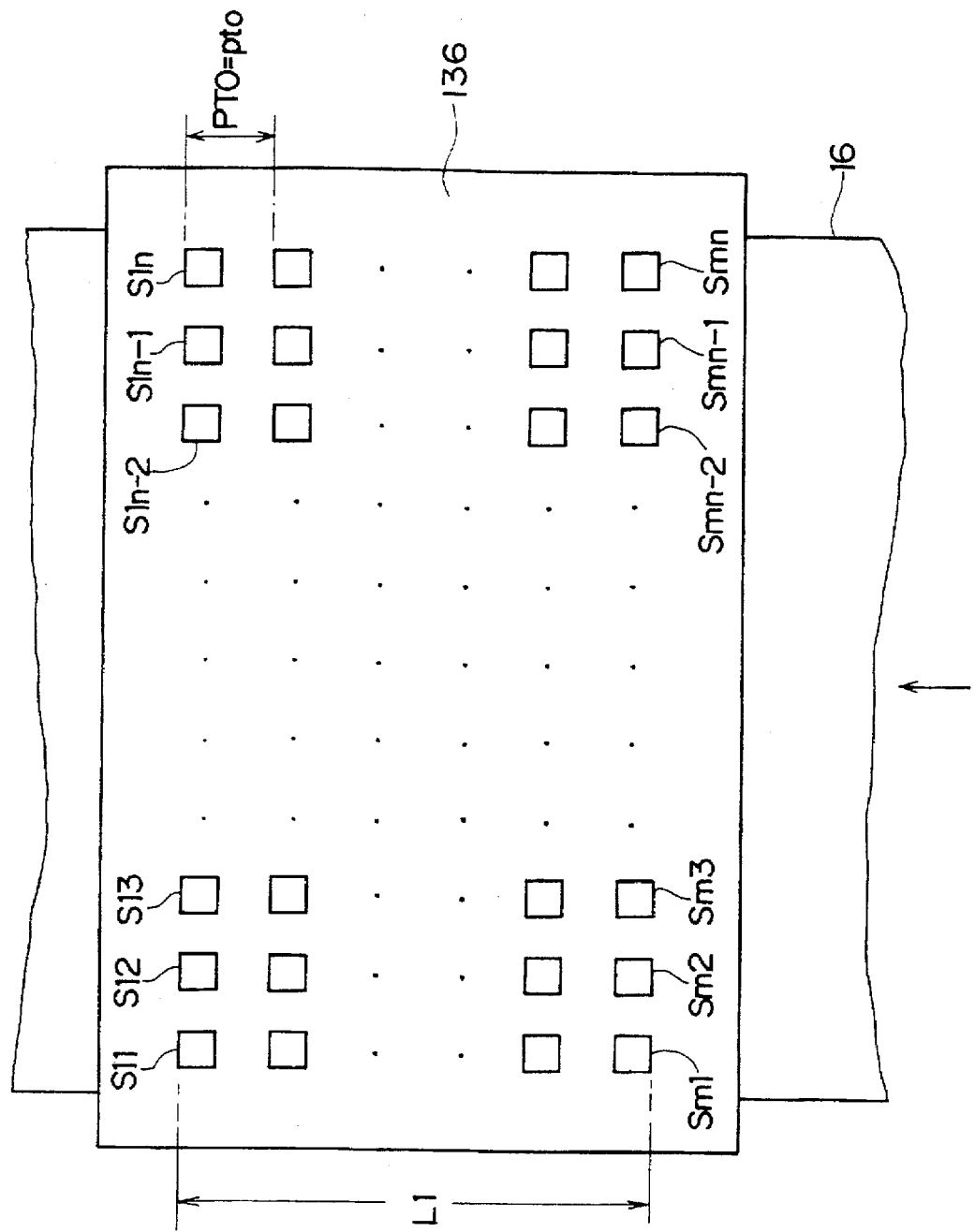
FIG. 30 is a diagram illustrating the layout of liquid-crystal cells of a liquid-crystal optical shutter array used in the exposure device shown in FIG. 29.

A liquid-crystal optical shutter array 136 serving as an optical shutter array in accordance with the present invention is provided below the cylindrical lens 134 (see FIG. 29). As shown in FIG. 30, the liquid-crystal optical shutter array 136 is formed such that liquid-crystal cells 136S11, 136S12, ..., 136Smn serving as optical shutter elements of the present invention are arrayed in a matrix form so as to correspond to pixels constituting rows of pixels of m lines on the photosensitive material 16. The direction of the row of the liquid-crystal cells 136S11, 136S12, ..., 136Smn arrayed in the matrix form corresponds to the direction of one line on the photosensitive material 16, while the direction of the column corresponds to a direction substantially perpendicular to the direction of one line on the photosensitive material 16. Hereafter, an arbitrary liquid-crystal cell of these liquid-crystal cells 136S11, 136S12, ..., 136Smn will be denoted by a liquid-crystal cell 136Sij (i (row)=1 to m and j (column)=1 to n, where n is the number of pixels constituting one line on the photosensitive material 16). The liquid-crystal cells 136Sij are opened to allow the slit beam to be transmitted therethrough when a voltage is applied thereto, and are closed to shut off the slit beam when the voltage ceases to be applied thereto. Incidentally, the liquid-crystal cells may be of a type in which they are opened to shut off the slit beam when the voltage ceases to be applied thereto, and are closed to allow the slit beam to be transmitted therethrough when the voltage is applied thereto. As the liquid crystal cells, for example, twisted nematic (TN) cells are used.

A self-focusing fiber array (SLA) 138 is provided below the liquid-crystal optical shutter array 136 (see FIG. 29). Since the liquid-crystal cells 136Sij are provided in correspondence with the pixels constituting the rows of pixels of m lines on the photosensitive material 16, the SLA 138 causes the slit beam transmitted through the liquid-crystal cells 136Sij to form an image on the photosensitive material 16 as the slit beam having the width of m lines on the photosensitive material 16.

It should be noted that the distance L1 in the X-Y direction from the liquid-crystal cell 136S11 to the liquid-crystal cell 136Sm1 (see FIGS. 29 and 30) is not more than two times the distance L0 in the X-Y direction of the effective emission range of the light emitted from the LEDs 30R, the LEDs 30G, and the LEDs 30B, and not more than two times the width (distance in the X-Y direction) L2 of m lines on the photosensitive material 16.

Figure 31:
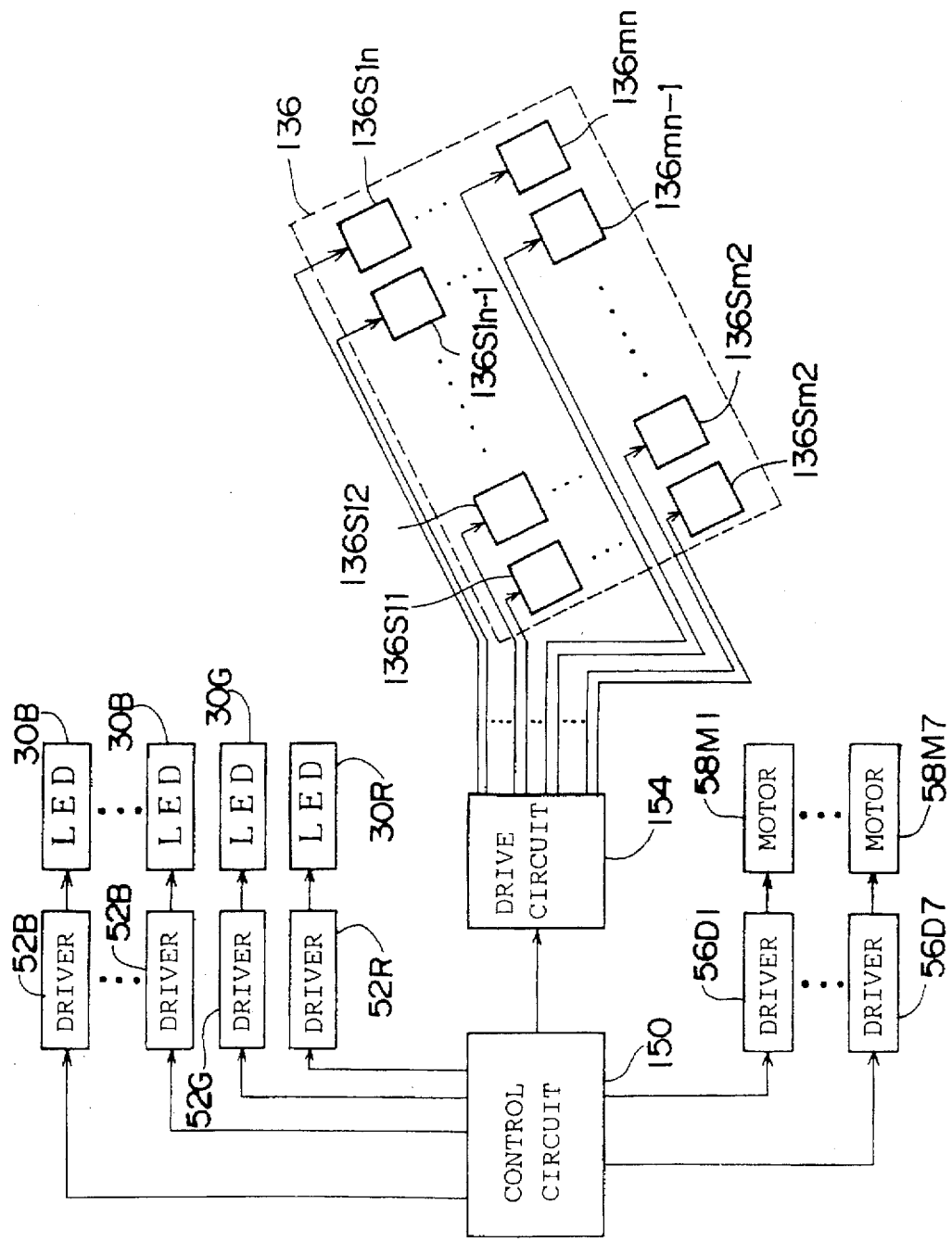
FIG. 31 is a circuit diagram of a control system of the exposure device shown in FIG. 29.

Next, referring to FIG. 31, a description will be given of the control system of the exposure device 25. As shown in FIG. 31, the control system of the exposure device 25 has the control circuit 50 as a control member of the present invention. Connected to the control circuit 50 are the LED 30R via the driver 52R, the LED 30G via the driver 52G, and the LED 30B via the driver 52B, respectively. In addition, a drive circuit 154 for driving the liquid-crystal cells 136S1, 136S2, ..., 136Sn is also connected to the control circuit 50. Further, the motors 58M1 to 58M7 for driving the transport rollers 19, 21, 23A, 23B, 24A, 24B, 26 by means of the drivers 56D1 to 56D7 are respectively connected to the control circuit 50.

Next, a description will be given of the operation of this embodiment. The photosensitive material 16 is transported from the photosensitive material magazine 14 to the exposure section 22 in the same way as in the first embodiment. The control circuit 50 in the exposure device 25 controls the emission of light by the LEDs 30R, the LEDs 30G, and the LEDs 30B and the opening of the liquid-crystal cells 136Sij as described below to expose the lines on the photosensitive material 16 a plurality of times, respectively, such that the amount of exposure of portions of the photosensitive material 16 corresponding to pixels to the slit beam transmitted through the liquid-crystal cells 136Sij becomes substantially equal to the amount of exposure of corresponding pixels of color image data stored in the unillustrated memory.

First, referring to FIG. 6, a description will be given of the first controlling method for controlling the LEDs 30R, the LEDs 30G, and the LEDs 30B and the opening of the liquid-crystal cells 136Sij. As shown in FIG. 6, at a predetermined time interval t0 a pulsed voltage is applied to the LED 30R for a predetermined period tR, to the LED 30G for a predetermined period tG, and to the LED 30B for a predetermined period tB, respectively, so as to cause the LED 30R, the LED 30G, and the LED 30B to emit light. Consequently, the R light, the G light, and the B light are consecutively emitted for the period tR from the LED 30R, for the period tG from the LED 30G, and for the period tB from the LED 30B, respectively.

The R light, the G light, and B light applied consecutively at the predetermined time interval t0 are formed into a slit beam having the predetermined width L1 by being transmitted through the cylindrical lens 134, and are applied to the liquid-crystal optical shutter array 136.

By controlling the drive circuit 154, the control circuit 50 in the exposure device 25 controls the opening and closing of the liquid-crystal cells 136Sij by application of a predetermined pulsed voltage thereto. As shown in FIG. 6, in the same way as in the first embodiment, each liquid-crystal cell 136Sij is driven such that, as for the R light, the liquid-crystal cell 136Sij is opened only during the time duration tS1 of the period tR during which the R light is applied; as for the G light, the liquid-crystal cell 136Sij is opened only during the time duration tS2 of the period tG during which the G light is applied; and as for the B light, the liquid-crystal cell 136Sij is opened only during the time duration tS3 of the period tB during which the B light is applied. Here, as shown in FIG. 6, the liquid-crystal cell 136Sij undergoes the phenomenon of transition in which the liquid-crystal cell 136Sij is opened gradually instead of being immediately opened fully in response to a predetermined pulsed voltage applied thereto. The time durations tS1, tS2, and tS3 are set by also taking this phenomena of transition into consideration.

Then, after one line on the photosensitive material 16 has thus been exposed, in the same way as in the first embodiment, the control circuit 50 drives the motors 58M1 to 58M7 by means of the drivers 56D1 to 56D7, which in turn causes the transport rollers 19, 21, 23A, 23B, 24A, 24B, and 26 to be driven so as to transport the photosensitive material 16 by a one-line portion and expose an ensuing line.

Next, referring to FIGS. 32A to 32D, a description will be given of the opening patterns of liquid-crystal cells for each line on the photosensitive material 16. Incidentally, it is assumed for convenience' sake that the row of pixels in one line on the photosensitive material 16 is comprised of 5 pixels, and an example is cited below of the liquid-crystal optical shutter array 136 in which, as shown in FIGS. 32A to 32D, the number of corresponding liquid-crystal cells is 5, and four rows of these liquid-crystal cells are provided in a direction substantially perpendicular to the direction of one line on the photosensitive material 16. In FIGS. 32A to 32D, the liquid-crystal cells 136Sij through which the R light emitted from the LEDs 30R is transmitted are indicated by being hatched.

Figure 32A:
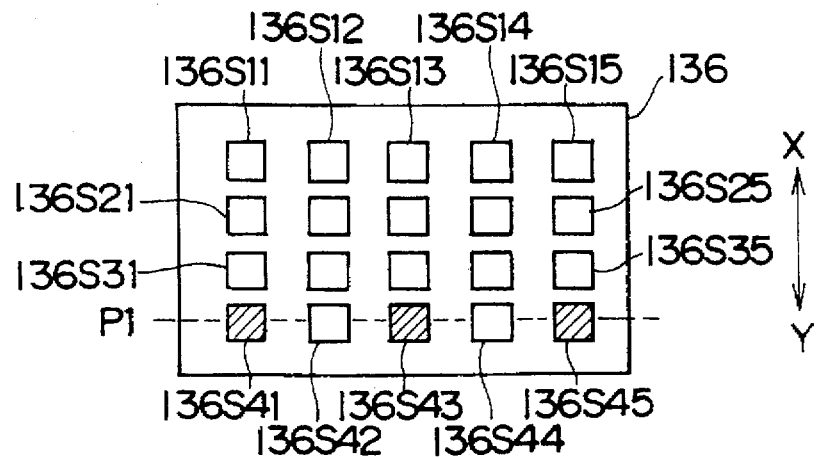
FIG. 32A is a diagram illustrating a pattern for controlling the liquid-crystal cells shown in FIG. 30.

When the photosensitive material 16 starts to be transported and the first line is exposed, of the liquid-crystal cells 136S41 to 136S45 shown in FIG. 32A, the liquid-crystal cells 136S41, 136S43, and 136S45 are opened (pattern P1). Incidentally, this pattern P1, including the openings of the liquid-crystal cells 136S41 to 136S45 adapted to expose the photosensitive material 16 on the basis of the color image data, is stored in the memory. Upon completion of exposure of the line with the G light and the B light emitted from the LEDs 30G and LEDs 30B, the transport rollers 19 to 26 are driven to transport the photosensitive material 16 by a one-line portion. With respect to the G light and the B light emitted from the LEDs 30G and the LEDs 30B, their patterns are also stored in the memory in a similar manner.

Figure 32B:
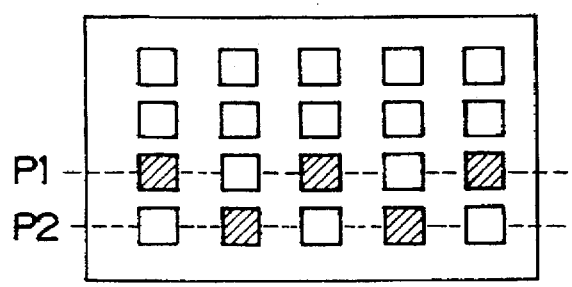
FIG. 32B is a diagram illustrating patterns for controlling the liquid-crystal cells shown in FIG. 30.

After transport of the one-line portion, the pattern of the liquid-crystal cells 136Sij corresponding to the pixels of the first line for which exposure has been completed moves to the liquid-crystal cells 136S31 to 136S35. Then, when the photosensitive material 16 is exposed with the R light emitted from the LEDs 30R for the second time, as shown in FIG. 32B, of the liquid-crystal cells 136S31 to 136S35, the liquid-crystal cells 136S31, 136S33, and 136S35 are opened on the basis of the aforementioned pattern P1 and, as for the liquid-crystal cells 136S41 to 136S45, the liquid-crystal cells 136S42 and 136S44 are opened (pattern P2). Incidentally, this pattern P2, including the openings of the liquid-crystal cells 136S41 to 136S45 adapted to expose the photosensitive material 16 on the basis of the color image data, is also stored in the memory. Then, the LEDs 30G and the LEDs 30B are also controlled in a similar manner. Subsequently, the transport rollers 19 to 26 are driven to transport the photosensitive material 16 by a one-line portion.

Figure 32C:
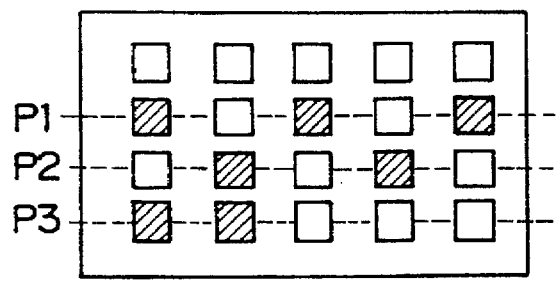
FIG. 32C is a diagram illustrating patterns for controlling the liquid-crystal cells shown in FIG. 30.

After transport of the one-line portion, the pattern of the liquid-crystal cells 136Sij corresponding to the pixels of the first line for which first and second exposures have been completed moves to the liquid-crystal cells 136S21 to 136S25, while the pattern of the liquid-crystal cells 136Sij corresponding to the pixels of the second line for which only the second exposure has been completed moves to the liquid-crystal cells 136S31 to 136S35. Then, when the photosensitive material 16 is exposed with the R light emitted from the LEDs 30R for the third time, as shown in FIG. 32C, of the liquid-crystal cells 136S21 to 136S25, the liquid-crystal cells 136S21, 136S23, and 136S25 are opened on the basis of the aforementioned pattern P1 and, as for the liquid-crystal cells 136S31 to 136S35, the liquid-crystal cells 136S32 and 136S34 are opened on the basis of the aforementioned pattern P2. Further, with respect to the liquid-crystal cells 136S41 to 136S45, the liquid-crystal cells 136S41 and 136S42 are opened (pattern P3). Incidentally, this pattern P3 is also stored in the memory. Then, the LEDs 30G and the LEDs 30B are also controlled in a similar manner. Subsequently, the transport rollers 19 to 26 are driven to transport the photosensitive material 16 by a one-line portion.

Figure 32D:
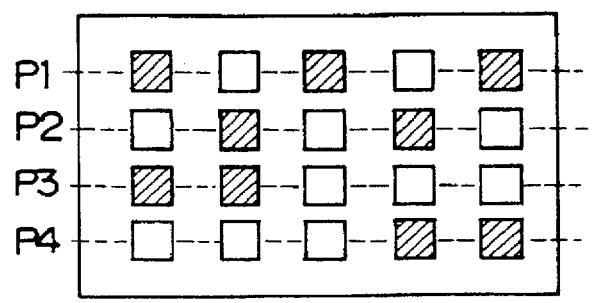
FIG. 32D is a diagram illustrating patterns for controlling the liquid-crystal cells shown in FIG. 30.

With respect to the LEDs 30R for the fourth exposure and thereafter, as shown in FIG. 32D, the liquid-crystal cells 136S11 to 136S35 are controlled on the basis of the patterns P1 to P3, and of the liquid-crystal cells 136S41 to 136S45, the liquid-crystal cells 136S44 and 136S45 are opened (pattern P4). This pattern P4, including the openings of the liquid-crystal cells 136S41 to 136S45 adapted to expose the photosensitive material 16 on the basis of the color image data, is also stored in the memory. Then, the LEDs 30G and the LEDs 30B are also controlled in a similar manner. Subsequently, the transport rollers 19 to 26 are driven to transport the photosensitive material 16 by a one-line portion.

Figure 33:
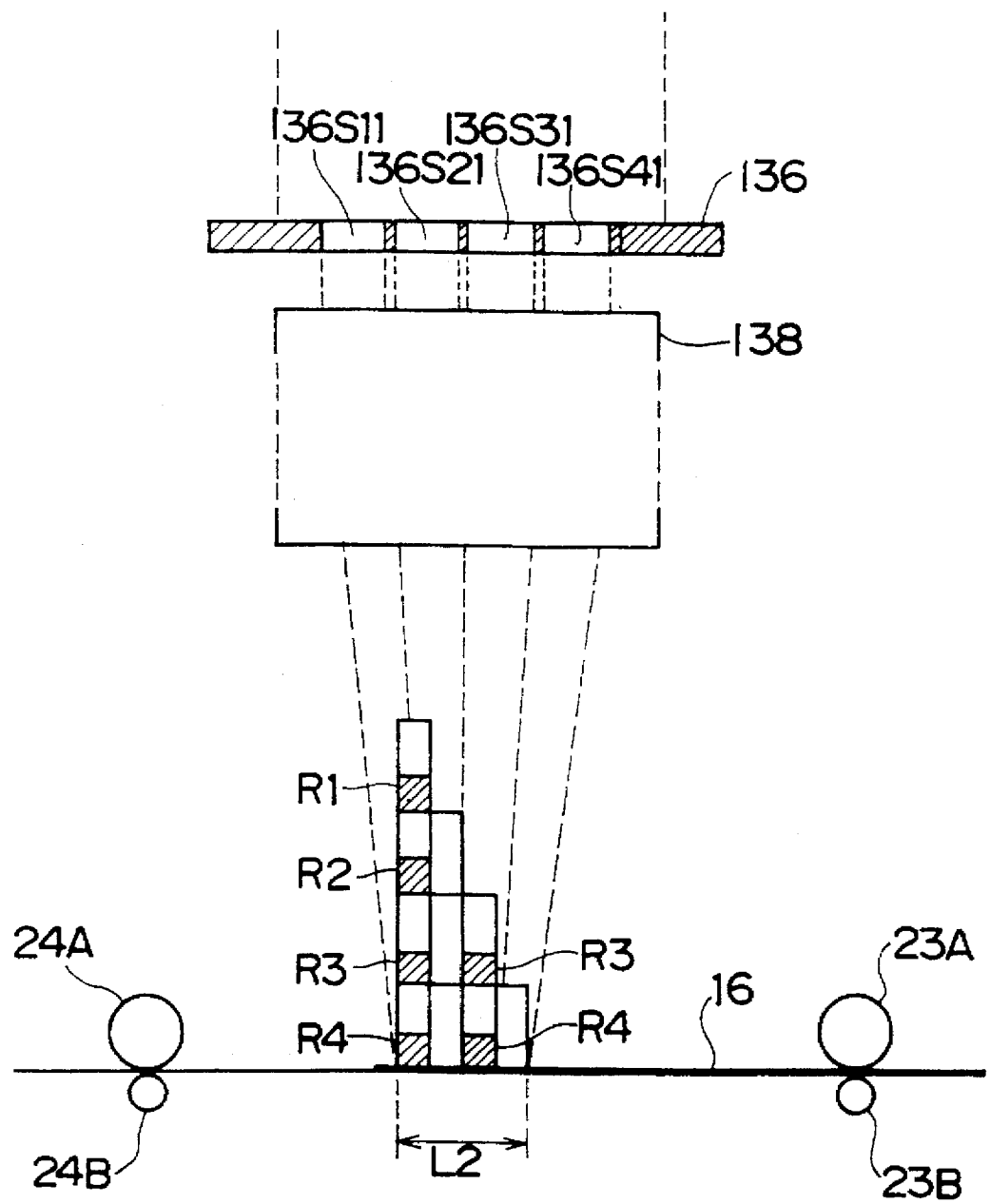
FIG. 33 is a diagram illustrating an amount of exposure of the photosensitive material using the patterns for controlling the liquid-crystal cells.

By controlling the openings of the liquid-crystal cells on the basis of the patterns as described above, the amount of exposure for each pixel of each line on the photosensitive material 16 is set to be equal to a targeted amount of exposure for each line corresponding to the color image data. FIG. 33 shows the amount of exposure of the photosensitive material 16 when it is transported by a three-line portion. In the first line on the photosensitive material 16, four exposures by the LEDs 30R, 30G, and 30B are effected during the transport of the three-line portion. To describe this process by citing the exposure with the R light, the pattern P1 is applied to the liquid-crystal cells during each of the four exposures, the first R light (R1) is transmitted through the liquid-crystal cell 136S41, the second R light (R2) is transmitted through the liquid-crystal cell 136S31, the third R light (R3) is transmitted through the liquid-crystal cell 136S21, and the fourth R light (R4) is transmitted through the liquid-crystal cell 136S11, thereby respectively exposing the left-end pixel, as viewed in the transporting direction, of the first line on the photosensitive material 16. Since the opening of the liquid-crystal cell in the pattern P2 is 0% for the left-end pixel, as viewed in the transporting direction, of the second line on the photosensitive material 16, the exposure with the R light is not effected. In the exposure of the third line on the photosensitive material 16, since the pattern P3 is applied, the third R light (R3) is transmitted through the liquid-crystal cell 136S41, and the fourth R light (R4) is transmitted through the liquid-crystal cell 136S31, thereby respectively exposing the left-end pixel, as viewed in the transporting direction, of the second line on the photosensitive material 16.

Thus, as the exposure for each pixel of each line on the photosensitive material 16 is repeated each time the photosensitive material 16 is transported by a one-line portion, the amount of exposure of each pixel is set to be equal to a targeted amount of exposure for each pixel of each line corresponding to the color image data.

As described above, although, during each exposure after the photosensitive material is transported by a one-line portion, the opening and closing of the liquid-crystal cells are controlled on the basis of the opening patterns to make uniform the quantity of the slit beam transmitted through the liquid-crystal cells during each exposure, the present invention is not limited to the same, and the quantity of the slit beam transmitted through the liquid-crystal cells during each exposure may be varied.

Subsequently, an image on the exposed photosensitive material 16 is transferred onto the image receiving material 108 in a procedure similar to that of the first embodiment.

Since the light-emitting diodes for emitting red, green, and blue light are used as light sources, it is unnecessary to provide a movable portion such as a filter cylinder for converting white light into the R light, the G light, and the B light, thereby making it possible to provide a compact and low-cost exposure device.

In addition, since a plurality of liquid-crystal cells are arrayed for the respective pixels on each line on the photosensitive material, and exposure for the same pixels is effected a plurality of times with the slit beam transmitted through the liquid-crystal cells thus arrayed, it is possible to improve the efficiency of utilizing the light and transport the photosensitive material at high speed, thereby making it possible to shorten the overall exposure time for the photosensitive material.

In the above-described embodiment, the light source system 127A is arranged such that the LED 30B for the B light, the LED 30G for the G light, and the LED 30R for the R light, which are light-emitting elements, are juxtaposed in proximity to each other along a direction substantially perpendicular to the direction of one line on the photosensitive material 16 so as to constitute one of the groups of light-emitting elements 30, and these groups of light-emitting elements 30 are arrayed along the direction of one line on the photosensitive material 16 at the predetermined pitch $P_1$. However, the direction in which the LEDs for the B, G, and R light are arrayed and the number thereof are not limited to the same.

For instance, as described in the first embodiment, the light source system 127A may comprise the groups of light-emitting elements 35, as shown in FIG. 7, or the groups of light-emitting elements 37, as shown in FIG. 8. In such cases as well, it is possible to obtain advantages similar to those of the first embodiment. Further, the light source system 127A may comprise the groups of light-emitting elements 39, as shown in FIG. 9. In this case as well, it is possible to obtain advantages similar to those of the first embodiment. In addition, although, in the above-described embodiment, the light source system 127A is arranged by using the LEDs for B, G, and R light serving as the light-emitting elements, the light-emitting elements are not restricted to the same, and it is possible to use, for example, a false system for the B, R, and G light, or a light source combining wavelengths of four or more kinds of color.

Further, although, in the above-described embodiment, the light source system 27A for directly applying the light of three colors from the LEDs 30R, 30G, and 30B in the downward direction, the present invention is not limited to the same and, as described in connection with the first embodiment, it is possible to use the light source system 27B, 27C, or 27D having an optical waveguide, as shown in FIGS. 12 to 14. In such arrangements, since the light transmitted through the optical waveguide is scattered by the scattering plate, and is radiated in the form of a slit beam, the slit beam is provided with a quantity of light which is uniform in its cross-sectionally longitudinal direction, thereby making it possible to eliminate the irregularity in the quantity of the slit beam and the irregularity of color with respect to the photosensitive material.

Although, in the above-described embodiment, a light source system is used in which each group of light-emitting elements 30 is comprised of the LED 30R, the LED 30B, and the LED 30G that are juxtaposed in proximity to each other, the present invention is not limited to the same. For instance, it is possible to use a light source system comprising an LED array and a rod lens array corresponding to the LED array. In this case, in the same way as in the first embodiment, the exposure correcting plate 61 serving as the exposure adjusting member may be disposed in the vicinity of the light-source side of the photosensitive material 16, as shown in FIG. 18. As a result, when the light reflected from an original due to the light from the LED array is applied to the photosensitive material 16 through the rod lens array, the light is transmitted through the aperture 62 of the exposure correcting plate 61, thereby making it possible to make the amount of exposure of the photosensitive material 16 uniform. Since the exposure correcting plate 61 is provided as described above, it is possible to obtain advantages similar to those of the first embodiment.

When the photosensitive material 16 is irradiated, the light passes through the aperture 62 of the exposure correcting plate 61. Here, the light which has passed through the rod lens array after being emitted from the LED array has irregularity in the quantity of light in the direction in which the elements are arrayed, as shown in FIG. 20A. However, since the correcting portion 63, which has a waveform corresponding to the irregularity in illuminance due to the pitches by which the lenses of the LEDs of the LED array and the lenses of the rod lens array are arrayed, as shown in FIG. 20B, is formed on one side of the aperture 62 of the exposure correcting plate 61, the irregularity in illuminance is corrected as the light passes through the aperture 62 of the exposure correcting plate 61. Hence, the amount of exposure of the photosensitive material 16 is made uniform without the occurrence of irregularity, as shown in FIG. 20C.

Although the correcting portion 63 provided on one side the aperture 62 of the exposure correcting plate 61 is arranged such that its configuration is set in correspondence with the waveform of irregularity in illuminance which combines the irregularity in illuminance (the quantity of light) due to the pitches of array of the LEDs of the LED light array and the irregularity in illuminance due to the pitches of array of the lenses of the rod lens array, the present invention is not limited the same. For example, as shown in FIG. 21, an arrangement may alternatively provided such that the correcting portion 64 corresponding to the irregularity in illuminance due to the pitches of array of the LEDs of the LED array and the correcting portion 65 corresponding to the irregularity in illuminance due to the pitches of array of the lenses of the rod lens array are provided separately. In this case as well, the aforementioned irregularity in illuminance is corrected, and the amount of exposure of the photosensitive material 16 exposed through the aperture 62 of the exposure correcting plate 61 becomes uniform without the occurrence of irregularity. Hence, it is possible to obtain an image of high image quality which is free of irregularities in the image.

In the above-described embodiment, a description has been given of the first controlling method using the control circuit 50 for controlling only the opening and closing of the liquid-crystal cells; however, the controlling method for ensuing that the amount of exposure of the portions of the photosensitive material 16 corresponding to pixels to the slit beam transmitted through the liquid-crystal cells becomes substantially equal to the amount of exposure of corresponding pixels of the color image data is not limited to the same. For example, it is possible to employ various other controlling methods shown in FIGS. 22 to 25, as described in the first embodiment.

FIG. 22 shows a timing chart illustrating the second controlling method for controlling a liquid-crystal cell and the LED 30R by citing the LED 30R by way of example. It should be noted that although the LED 30G and the LED 30B are also controlled in a similar manner, their controlling method is not restricted to the second controlling method, and it is possible to adopt the above-described first controlling method or any one of the third to fifth controlling methods which will be described later. As shown in FIG. 22, in the second controlling method, the period t9R for controlling the LED 30R and the period tS9 for opening the liquid-crystal cell are made to coincide with each other, and the LED 30R is made to emit pulses of light.

Namely, in the second controlling method, the time interval of the pulsed voltage is set to t90, pulses with a predetermined time duration t91 are continually applied to the LED 30R, so as to digitally control the quantity of the emitted R light. During the period tS9 which coincides with the period t9R of continual application of the pulsed voltage, the liquid-crystal cell 136Sij is driven in such a manner as to be opened by applying the pulsed voltage thereto.

Thus, since the quantity of light emitted from the LEDs is reduced and the period of opening of the liquid-crystal cells is controlled, the amount of exposure of the portions of the photosensitive material 16 corresponding to the pixels can be accurately aligned with the amount of exposure of the corresponding pixels of the color image data.

FIG. 23 shows a timing chart illustrating the third controlling method for controlling a liquid-crystal cell and the LED 30R by citing the LED 30R by way of example. It should be noted that although the LED 30G and the LED 30B are also controlled in a similar manner, their controlling method is not restricted to the third controlling method, and it is possible to adopt the above-described first or second controlling method, or the fourth or fifth controlling method which will be described later. As shown in FIG. 23, in the third controlling method, the period t10R for controlling the LED 30R and the period for opening the liquid-crystal cell are made to coincide with each other, and the time duration of application of the pulsed voltage to the LED 30R is made variable. That is, during the period t10R for controlling the LED 30R, the liquid-crystal cell 136i is opened, and the time duration of application of the pulsed voltage to the LED 30R is made variable as t101, t102, t103, t104, and t105.

Thus, since the quantity of light emitted from the LED 30R is reduced by varying the time duration of application of the pulsed voltage to the LED 30R, and the period of controlling the LED 30R and the period of opening the liquid-crystal cell are made to coincide with each other, the amount of exposure of the portions of the photosensitive material 16 corresponding to the pixels can be accurately aligned with the amount of exposure of the corresponding pixels of the color image data.

FIG. 24 shows a timing chart illustrating the fourth controlling method for controlling the LEDs 30R, 30G, and 30B. As shown in FIG. 24, in the fourth controlling method, instead of digitally controlling the quantity of light emitted by applying a pulsed voltage to the LEDs, the quantity of light emitted by the LEDs is gradually increased in an analog manner by gradually increasing the voltage to be applied, and the period of opening the liquid-crystal cell 136Sij is made to coincide with the period of controlling the LEDs. This arrangement makes it possible to simplify the control of the liquid-crystal cell.

FIG. 25 shows a timing chart illustrating the fifth controlling method for controlling the liquid-crystal cells and the LEDs 30R, 30G, and 30B by citing the LED 30R by way of example. It should be noted that although the LEDs 30G and the LEDs 30B are also controlled in a similar manner, their controlling method is not limited to the fifth controlling method, and it is possible to use any one of the first to fourth controlling methods described above. As shown in FIG. 25, the fifth controlling method mainly makes use of the phenomenon of transition of the liquid-crystal cells. That is, when a pulsed voltage starts to be applied to the LED 30R, the time duration of applying the pulsed voltage to the liquid-crystal cell 136Sij ends. As a result, by making use of only the phenomenon of transition in which the liquid-crystal cell 136Sij is closed when the application of the pulsed voltage is stopped, the quantity of the R light transmitted through the liquid-crystal cell 136Sij is reduced. The LED 30B is also controlled in a similar manner. Incidentally, since the opening of the liquid-crystal cell 136Sij also changes in correspondence with the time duration of the pulsed voltage applied to the liquid-crystal cell 136Sij, by changing the time duration of application of the pulsed voltage to the LED 30R and the LED 30B, it is possible to vary the amount of the R light and the B light transmitted through the liquid-crystal cell 136Sij. Further, the pulsed voltage is applied to the liquid-crystal cell 136Sij after the lapse of a fixed time from the time of application of the pulsed voltage to the LED 30B, and the application of the pulsed voltage to the liquid-crystal cell 136Sij is completed when the time duration of application of the pulsed voltage to the LED 30B ends. As a result, the amount of the B light transmitted is gradually increased by making use of only the phenomenon of transition in which the liquid-crystal cell 136Sij is gradually opened.

Thus, since only the phenomenon of transition of the liquid-crystal cells is made use of, it suffices to calculate only the relationship between the opening at the time of the occurrence of the phenomenon of transition of the liquid-crystal cells and the quantity of light emitted from the LEDs, so that it is possible to simplify the control of the liquid-crystal cells.

Figure 34:
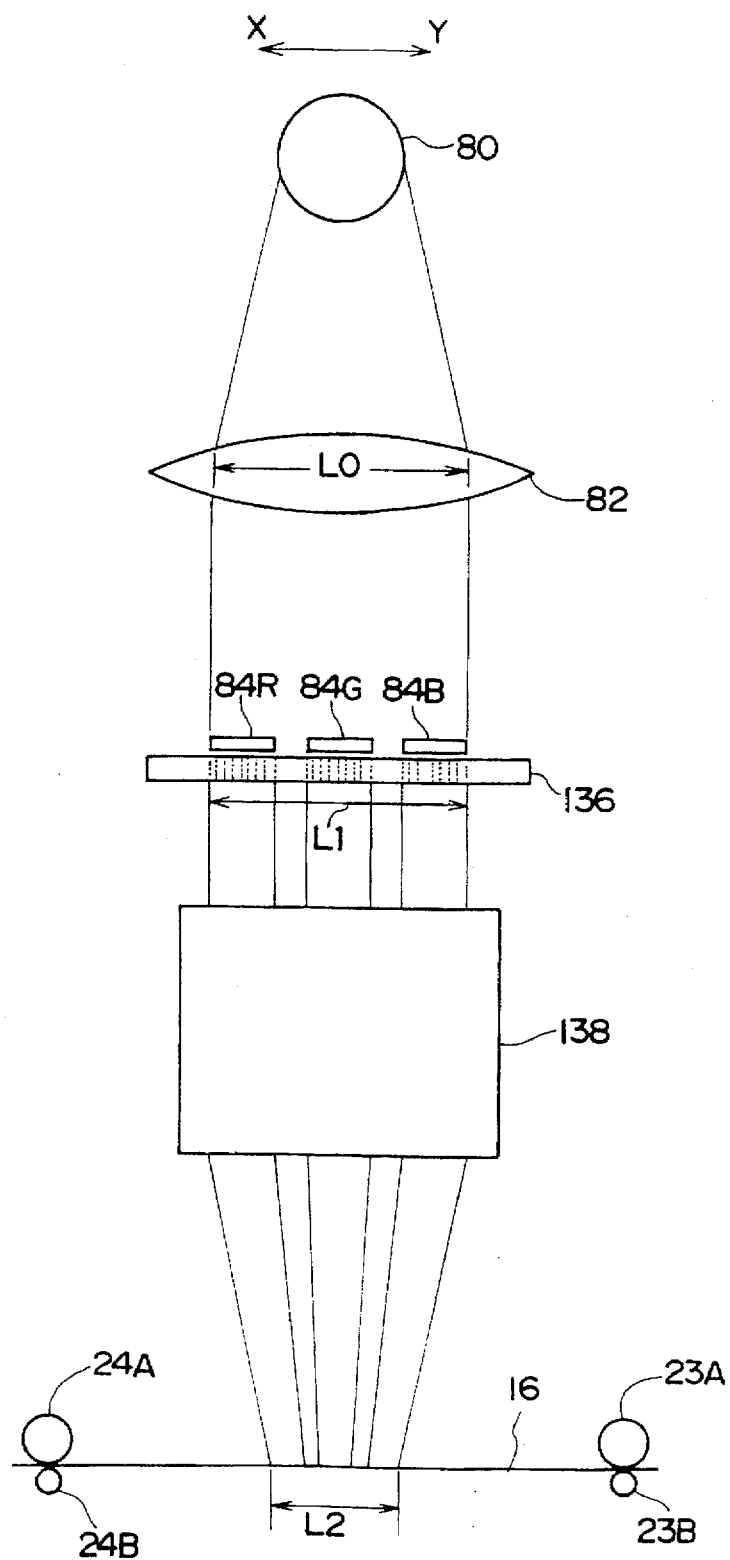
FIG. 34 is a diagram of an exposure device in which a white lamp is used for the light source system.

Although in the above-described embodiments, LEDs are used as the light-emitting elements, the present invention is not confined to the same, and a semiconductor laser may be used instead. In addition, a white lamp 80 may be alternatively used, as shown in FIG. 34. In this case, instead of using a movable portion such as a filter cylinder having a blue filter, a green filter, a red filter, and a mask attached to its peripheral surface, as described with reference to the prior art, a red filter 84R, a green filter 84G, and a blue filter 84B are provided in the vicinity of the light-source side of the liquid-crystal optical shutter array 136, so as to allow white light to be transmitted through the respective filters, thereby subjecting the white color to the R light, the G light, and the blue light. First, by means of the color-separated B light after being transmitted through the blue filter 84B, the exposure of the plurality of lines is effected while controlling the openings of the liquid-crystal cells 136Sij on the basis of the aforementioned patterns (while transporting the photosensitive material 16 for each line). Similarly, by means of the color-separated G and R light after being transmitted through the blue filter 84B and the red filter 84R, the exposure of the plurality of lines is effected while controlling the openings of the liquid-crystal cells 136Sij on the basis of the aforementioned patterns (while transporting the photosensitive material 16 for each line).

Thus, even by using the white lamp, since the red filter, the green filter, and the blue filter are provided in the vicinity of the light-source side of the liquid-crystal optical shutter array, and exposure is effected by the color-separated color after being transmitted through the respective filters, it is unnecessary to provide a movable portion such as a filter cylinder for converting the white light into the R light, the G light, and the B light, thereby making it possible to provide a compact and low-cost exposure device.

Figure 35:
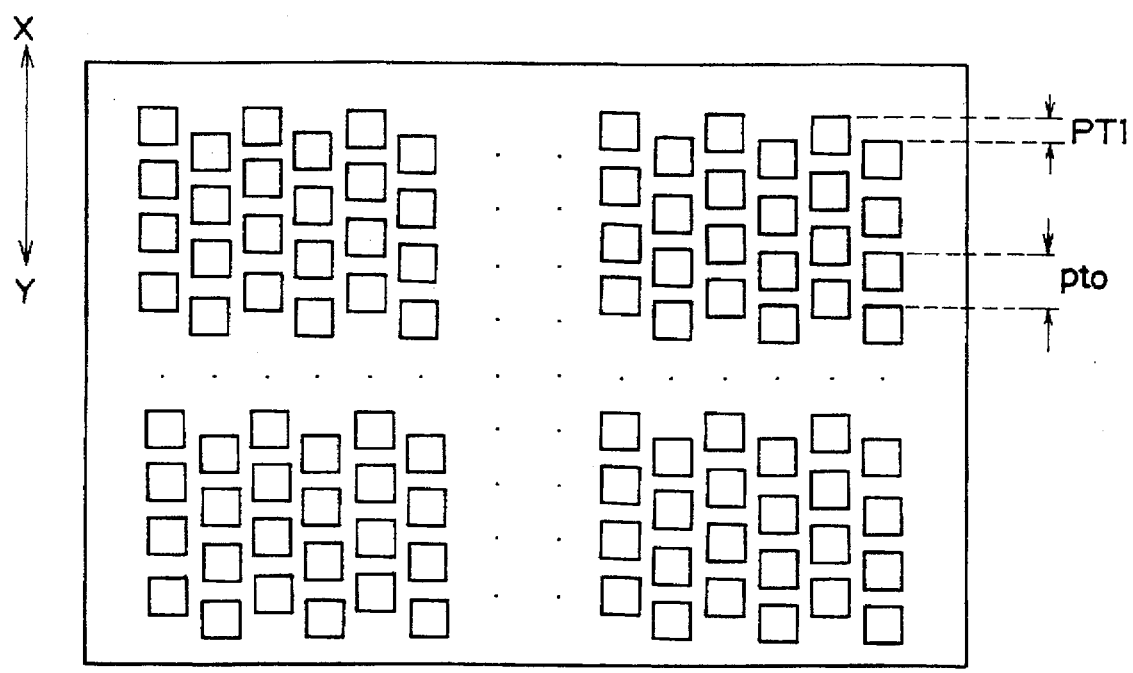
FIG. 35 is a diagram illustrating the layout of the liquid-crystal cells of another liquid-crystal optical shutter array.

In the liquid-crystal optical shutter array (see FIG. 30) in the above-described embodiment, the liquid-crystal cells are arrayed such that the pitch PT0 between the pixel rows when the photosensitive material is transported for each line and the interval between the liquid-crystal cells (liquid-crystal cell pitch) pt0 in a direction substantially perpendicular to the transporting direction (X-Y direction) of the photosensitive material coincide with each other. However, the present invention is not limited to the same, and, for example, an arrangement may be provided such that, as shown in FIG. 35, rows of optical shutter elements are arrayed in a direction substantially perpendicular to the direction of one line on the photosensitive material 16 at intervals corresponding to those between adjacent pixels in the row, such that adjacent ones of the rows of the optical shutter elements are offset from each other by a predetermined pitch. Incidentally, this predetermined pitch is set to be shorter than the pitch by which the optical shutter elements in the row of optical shutter elements are arrayed in the direction of one line on the photosensitive material 16. Namely, it is possible to use a liquid-crystal optical shutter array in which the liquid-crystal cells are arrayed such that the pixel pitch PT1 is ½ of the liquid-crystal cell pitch pt0, for example.

Thus, even if the liquid-crystal cell pitch remains the same, the setting of the pixel pitch can be made small by changing the arrangement of the liquid-crystal cells, so that the interval between the lines to be exposed on the photosensitive material can be made small, permitting the expression of high-density gradations.

In the above-described embodiment. an optical shutter array in which liquid-crystal cells are arrayed as the optical shutter elements is used, the present invention is not limited to the same. For example, as described in the first embodiment, it is possible to use an optical shutter array which is comprised of a polarizer, an analyzer whose plane of polarization is arranged at an angle of 90° with respect to the plane of polarization of the polarizer, and a plumbum-lanthanum-zirconium-titanium oxide (PLZT) substrate disposed between the polarizer and the analyzer. A plurality of electrodes are arrayed at equal intervals on the PLZT substrate.

Thus, since the intervals between adjacent electrodes on the PLZT substrate where a plurality of electrodes are arrayed at equal intervals act as the optical shutter elements, the intervals between adjacent electrodes, as a whole, demonstrate action similar to that of the above-described liquid-crystal optical shutter array on which a plurality of liquid-crystal cells are arrayed, thereby making it possible to achieve the above-described advantages.

In the above-described various embodiments, a description has been given of an example in which after one line on the photosensitive material 16 has been exposed, the photosensitive material 16 is transported intermittently for each line, and an ensuing line is exposed. However, the present invention is not limited to the same, and the photosensitive material 16 may be transported continuously. In this case, the photosensitive material 16 is irradiated with the R light not once but a plurality of times (e.g., two times, three times, four times, five times, . . . ), and in this embodiment it is irradiated two times for each light, as shown in FIG. 26A. Consequently, as shown in FIG. 26B, the pixels constituting one line on the photosensitive material 16 are subjected to multiple exposure with the quantity of the R light, the G light, and the B light applied thereto twice, respectively. In this case, if the photosensitive material 16 is transported continuously, there are cases where an exposed line on the photosensitive material 16 deviates from a line corresponding to one line of the color image data, thereby making it impossible to form a proper image. Therefore, as shown in FIG. 27, the liquid-crystal optical shutter array 136 is moved by the piezoelectric element 70 serving as a slit-beam moving member via the bar 72.

Thus, as the slit beam is moved for each line of the photosensitive material in substantially the same direction as the direction of continuously transporting the photosensitive material and at substantially the same speed as the transporting direction, the exposed line on the photosensitive material 16 by the slit beam can be constantly aligned with the line corresponding to one line of the color image data. Incidentally, although the liquid-crystal optical shutter array 136 is moved by using the piezoelectric element 70 so as to allow the exposed line on the photosensitive material 16 by the slit beam to be constantly aligned with the line corresponding to one line of the color image data, the present invention is not limited to the same, and the liquid-crystal optical shutter array 136 may be moved by using an eccentric cam. In addition, an arrangement may be provided such that the optical system is disposed between the liquid-crystal optical shutter array 136 and the SLA 138, and the optical system is moved, so as to allow the incident slit beam to move for each line on the photosensitive material in substantially the same direction as the direction of continuously transporting the photosensitive material and at substantially the same speed as the transporting speed.

Although, in the above-described embodiment, the photosensitive material is transported, the present invention is not limited to the same, and the light source system, the liquid-crystal optical shutter array, and the like may be moved, or the photosensitive material, the light source system, and the liquid-crystal cell may be relatively moved. In such arrangements as well, it is possible to obtain the above-described various advantages.

What is claimed is:

1. An exposure device comprising:

a light source system having an array of at least three light-emitting elements for respectively emitting light of different colors and adapted to form the light emitted from said light-emitting elements into a slit beam;

moving members for moving at least one of the slit beam and a photosensitive material in a direction substantially perpendicular to a cross-sectionally longitudinal direction of the slit beam;

an optical shutter array which is disposed between said light source system and the photosensitive material, said optical shutter array having a plurality of optical shutter elements for allowing the slit beam incident thereupon from said light source system to be transmitted therethrough or shut off as said optical shutter elements are opened or closed, said plurality of optical shutter elements being provided in a number corresponding to a number of pixels constituting a row of pixels in a scanning line of the photosensitive material along a direction corresponding to the cross-sectionally longitudinal direction of the slit beam; and a control member for controlling at least one of the array of said light-emitting elements and said optical shutter array such that an amount of exposure of the slit beam transmitted through said optical shutter array and applied to a predetermined pixel on the photosensitive material becomes substantially equal to an amount of exposure of a corresponding pixel of color image data.

2. An exposure device according to claim 1, wherein said optical shutter array has a plurality of rows of said optical shutter elements, each of said rows of said optical shutter elements being formed by said plurality of optical shutter elements, said rows of said optical shutter elements being arrayed in a direction substantially perpendicular to the cross-sectionally longitudinal direction of the slit beam.

3. An exposure device according to claim 2, wherein said light source system forms the light emitted from said light-emitting elements into the slit beam having a predetermined width so that the slit beam is applied to said plurality of rows of optical shutter elements as a whole.

4. An exposure device according to claim 1, wherein said at least three light-emitting elements are juxtaposed in proximity to each other so as to form a group of light-emitting elements, and a plurality of said groups of light-emitting elements are provided at a predetermined pitch.

5. An exposure device according to claim 1, wherein said control member controls at least one of said array of said light-emitting elements and said optical shutter array such that the slit beam of respective colors from said light source system is intermittently radiated a plurality of times.

6. An exposure device according to claim 1, wherein said light source system comprises an optical waveguide which is formed in an elongated shape and at an end of which said light-emitting elements are arrayed, so as to transmit the light emitted from said light-emitting elements; and a light emergent portion which is disposed in said optical waveguide so as to scatter the light after being transmitted through said optical waveguide, form the light into the slit beam, and make the slit beam emergent therefrom.

7. An exposure device according to claim 1, wherein said light source system has a cylindrical lens for forming the light emitted from said light-emitting elements into the slit beam.

8. An exposure device according to claim 1, further comprising:

an image-forming optical member for allowing the slit beam transmitted through said optical shutter array to form an image on the photosensitive material.

9. An exposure device according to claim 1, further comprising:

an exposure adjusting member disposed in a vicinity of the photosensitive material on a light source system side thereof so as to adjust a quantity of light applied to the photosensitive material such that integral values over time of illuminance of the light applied to the photosensitive material become uniform over respective cross-sectionally longitudinal portions of the slit beam.

10. An exposure device according to claim 9, wherein said exposure adjusting member is an exposure correcting plate provided with an aperture having a configuration corresponding to an array pitch by which said at least three light-emitting elements are arrayed.

11. An exposure device according to claim 1, further comprising:

a diffusing member disposed in a vicinity of said optical shutter array on a light source system side thereof so as to diffuse the slit beam emitted from said light source system.

12. An exposure device comprising:

a light source having an array of at least three light-emitting elements for respectively emitting light of different colors and adapted to form the light emitted from said light-emitting elements into a slit beam, wherein said at least three light-emitting elements are juxtaposed in proximity to each other so as to form a group of light-emitting elements, and a plurality of said groups of light-emitting elements are provided at a predetermined pitch;

moving members for moving at least one of the slit beam and a photosensitive material in a direction substantially perpendicular to a cross-sectionally longitudinal direction of the slit beam;

a liquid-crystal optical shutter array which is disposed between said light source system and the photosensitive material, said liquid-crystal optical shutter array having a plurality of liquid-crystal cells for allowing the slit beam incident thereupon from said light source system to be transmitted therethrough or shut off as said liquid-crystal cells are opened or closed, said plurality of liquid-crystal cells being provided in a number corresponding to a number of pixels constituting a row of pixels in a scanning line of the photosensitive material along a direction corresponding to the cross-sectionally longitudinal direction of the slit beam, said liquid-crystal optical shutter array having one row of said plurality of liquid-crystal cells; and a control member for controlling at least one of the array of said light-emitting elements and said liquid-crystal optical shutter array such that an amount of exposure of the slit beam transmitted through said liquid-crystal optical shutter array and applied to a predetermined pixel on the photosensitive material becomes substantially equal to an amount of exposure of a corresponding pixel of color image data.

13. An exposure device according to claim 12, wherein said control member controls at least one of said array of said light-emitting elements and said liquid-crystal optical shutter array such that the slit beam of respective colors from said light source system is intermittently radiated a plurality of times.

14. An exposure device according to claim 12, wherein said light source system comprises an optical waveguide which is formed in an elongated shape, has said light-emitting elements arrayed at an end thereof, and has a reflecting surface, so as to reflect and transmit the light emitted from said light-emitting elements; and a light emergent portion which is disposed in said optical waveguide so as to scatter the light after being transmitted through said optical waveguide, form the light into the slit beam, and make the slit beam emergent therefrom.

15. An exposure device according to claim 12, wherein said light source system has a cylindrical lens for forming the light emitted from said light-emitting elements into the slit beam.

16. An exposure device according to claim 12, further comprising:
a self-focusing fiber array for allowing the slit beam transmitted through said liquid-crystal optical shutter array to form an image on the photosensitive material.

17. An exposure device according to claim 12, further comprising:
an exposure correcting plate disposed in a vicinity of the photosensitive material on a light source system side thereof and provided with an aperture having a configuration corresponding to an array pitch by which said at least three light-emitting elements are arrayed, so as to adjust a quantity of light applied to the photosensitive material such that integral values over time of illuminance of the light applied to the photosensitive material become uniform over respective cross-sectionally longitudinal portions of the slit beam.

18. An exposure device comprising:
a light source system having at least three light-emitting elements for respectively emitting light of different colors and adapted to form the light emitted from said light-emitting elements into a slit beam, wherein said at least three light-emitting elements are juxtaposed in proximity to each other so as to form a group of light-emitting elements, and a plurality of said groups of light-emitting elements are provided at a predetermined pitch;
moving members for moving at least one of the slit beam and a photosensitive material in a direction substantially perpendicular to a cross-sectionally longitudinal direction of the slit beam;
a liquid-crystal optical shutter array which is disposed between said light source system and the photosensitive material, said liquid-crystal optical shutter array having a plurality of liquid-crystal cells for allowing the slit beam incident thereupon from said light source system to be transmitted therethrough or shut off as said liquid-crystal cells are opened or closed, said plurality of liquid-crystal cells being provided in a number corresponding to a number of pixels constituting a row of pixels in a scanning line of the photosensitive material along a direction corresponding to the cross-sectionally longitudinal direction of the slit beam, wherein said liquid-crystal optical shutter array has a plurality of rows of liquid-crystal cells, each of said rows of liquid-crystal cells being formed by said plurality of liquid-crystal cells, said rows of said liquid-crystal cells being arrayed in a direction substantially perpendicular to the cross-sectionally longitudinal direction of the slit beam; and
a control member for controlling the array of said light-emitting elements and said liquid-crystal optical shutter array such that an amount of exposure of the slit beam transmitted through said liquid-crystal optical shutter array and applied to a predetermined pixel on the photosensitive material becomes substantially equal to an amount of exposure of a corresponding pixel of color image data,
wherein said light source system forms the light emitted from said light-emitting elements into the slit beam having a predetermined width so that the slit beam is applied to said plurality of rows of liquid-crystal cells as a whole.

19. An exposure device according to claim 18, wherein said control member controls at least one of said array of light-emitting elements and said liquid-crystal optical shutter array such that, when the photosensitive material is transported in the direction substantially perpendicular to the cross-sectionally longitudinal direction of the slit beam, a pattern of transmittance and shutting off of the light in said plurality of rows of liquid-crystal cells is moved in an identical direction, and the slit beam of the respective colors from said light source system is intermittently radiated a plurality of times.

20. An exposure device according to claim 18, wherein said light source system comprises an optical waveguide which is formed in an elongated shape, has said light-emitting elements arrayed at an end thereof, and has a reflecting surface, so as to reflect and transmit the light emitted from said light-emitting elements; and a light emergent portion which is disposed in said optical waveguide so as to scatter the light after being transmitted through said optical waveguide, form the light into the slit beam, and make the slit beam emergent therefrom.

21. An exposure device according to claim 18, wherein said light source system has a cylindrical lens for forming the light emitted from said light-emitting elements into the slit beam.

22. An exposure device according to claim 18, further comprising:
a self-focusing fiber array for allowing the slit beam transmitted through said liquid-crystal optical shutter array to form an image on the photosensitive material.

23. An exposure device according to claim 18, further comprising:
an exposure correcting plate disposed in a vicinity of the photosensitive material on a light source system side thereof and provided with an aperture having a configuration corresponding to an array pitch by which said at least three light-emitting elements are arrayed, so as to adjust a quantity of light applied to the photosensitive material such that integral values over time of illuminance of the light applied to the photosensitive material become uniform over respective cross-sectionally longitudinal portions of the slit beam.

* * * * *